US010922643B2

(12) United States Patent
Fallah

(10) Patent No.: US 10,922,643 B2
(45) Date of Patent: Feb. 16, 2021

(54) SYSTEM AND METHOD OF OPTIMIZING THE ROUTING AND DELIVERY OF SERVICES AND GOODS, AND NOTIFICATIONS RELATED TO SAME

(71) Applicant: Konnekti, Inc., Seattle, WA (US)

(72) Inventor: Shawn Fallah, Seattle, WA (US)

(73) Assignee: KONNEKTI, INC., Seattle, WA (US)

( * ) Notice: Subject to any disclaimer, the term of this patent is extended or adjusted under 35 U.S.C. 154(b) by 416 days.

(21) Appl. No.: 15/920,314

(22) Filed: Mar. 13, 2018

(65) Prior Publication Data

US 2018/0268370 A1 Sep. 20, 2018

Related U.S. Application Data

(60) Provisional application No. 62/471,242, filed on Mar. 14, 2017, provisional application No. 62/555,283, filed on Sep. 7, 2017.

(51) Int. Cl.
*G06Q 10/08* (2012.01)
*H04L 29/06* (2006.01)
(Continued)

(52) U.S. Cl.
CPC ..... *G06Q 10/08355* (2013.01); *G01C 21/343* (2013.01); *G01C 21/3407* (2013.01);
(Continued)

(58) Field of Classification Search
CPC ............. G06Q 10/08355; G06Q 50/30; G01C 21/3407; G01C 21/343; G01C 21/3438;
(Continued)

(56) References Cited

U.S. PATENT DOCUMENTS

| 6,948,062 B1 * | 9/2005 | Clapper | H04L 9/0872 713/162 |
| 8,812,373 B2 * | 8/2014 | Johnson | G06Q 10/08 705/26.1 |

(Continued)

FOREIGN PATENT DOCUMENTS

KR 10-2016-0004320 A 1/2016

OTHER PUBLICATIONS

Modica et al., A Geofencing Algorithm Fit for Supply Chain Management, 2018, Federated Conference on Computer Science and Information Systems, vol. 15, pp. 737-746 (Year: 2018).*

(Continued)

*Primary Examiner* — Rupangini Singh
*Assistant Examiner* — Jessie James Shafer
(74) *Attorney, Agent, or Firm* — Cozen O'Connor

(57) ABSTRACT

A system and method that provides for the routing and delivery of services to consumers by providers is disclosed. The system enables providers to advertise and list the products and services they provide, and customers to solicit bids or to otherwise seek to engage a provider to perform a service or from whom to purchase a good. The system may store customer and provider information in databases to be searched to identify a match between customer and provider. The system transmits navigation information to the provider's device to travel to the final destination. The navigation information includes an intermediary destination the provider must reach before being presented with the final destination. The system may include a notification feature to notify a customer or third party regarding the location of the provider or the status of a requested service or delivery.

14 Claims, 27 Drawing Sheets

(51) Int. Cl.
*G01C 21/34* (2006.01)
*H04W 4/021* (2018.01)
*H04W 4/02* (2018.01)
*G01C 21/36* (2006.01)

(52) U.S. Cl.
CPC ...... *G01C 21/3655* (2013.01); *H04L 63/0428* (2013.01); *H04W 4/021* (2013.01); *H04W 4/023* (2013.01)

(58) Field of Classification Search
CPC ............ G01C 21/3655; H04L 63/0428; H04L 63/107; H04L 9/0872; H04W 4/021; H04W 4/023; G07B 15/00; G07B 15/02; G07C 9/29; G06F 21/30; G06F 3/048; G08G 1/20; G08G 1/202; G08G 1/207
USPC .......................................................... 705/338
See application file for complete search history.

(56) References Cited

U.S. PATENT DOCUMENTS

| | | | | |
|---|---|---|---|---|
| 9,443,219 | B1* | 9/2016 | Griffith | G06Q 30/0203 |
| 9,788,156 | B1* | 10/2017 | Anderson | H04W 4/029 |
| 10,176,717 | B2* | 1/2019 | Mazzola | B60W 40/00 |
| 2002/0016726 | A1* | 2/2002 | Ross | G06Q 10/08 |
| | | | | 705/339 |
| 2003/0040947 | A1 | 2/2003 | Alie et al. | |
| 2006/0178994 | A1* | 8/2006 | Stolfo | G06Q 10/08 |
| | | | | 705/50 |
| 2008/0080712 | A1* | 4/2008 | Huang | G01S 5/0027 |
| | | | | 380/258 |
| 2014/0098060 | A1* | 4/2014 | McQuade | G07C 5/0858 |
| | | | | 345/174 |
| 2014/0280510 | A1 | 9/2014 | Putnam et al. | |
| 2014/0317005 | A1* | 10/2014 | Balwani | G06Q 10/0832 |
| | | | | 705/317 |
| 2016/0027306 | A1* | 1/2016 | Lambert | G08G 1/202 |
| | | | | 701/117 |
| 2016/0210591 | A1 | 7/2016 | Lafrance | |
| 2016/0232719 | A1* | 8/2016 | Brinig | G07B 15/02 |
| 2016/0345176 | A1* | 11/2016 | DeWitt | H04W 4/12 |
| 2018/0025461 | A1* | 1/2018 | Kadali | G06Q 90/20 |
| | | | | 705/323 |

OTHER PUBLICATIONS

International Search Report and the Written Opinion of the International Searching Authority, dated Jun. 29, 2018, for International Application No. PCT/US2018/022260, 12 pages.

* cited by examiner

SYSTEM AND METHOD OF OPTIMIZING THE ROUTING AND DELIVERY OF SERVICES AND GOODS, AND NOTIFICATIONS RELATED TO SAME

TECHNICAL FIELD

The present disclosure generally relates to optimizing the routing and delivery of services and/or the delivery of goods between a provider and a customer and, in particular, to providing such optimization to maintain privacy and safety of the customer and/or provider.

BACKGROUND

Description of the Related Art

In the present economy, many individuals take on short term jobs, in some instances to supplement their regular income, by providing services or goods to other individuals or customers on a short-term or one-off basis. Some individuals or customers, though, may have concerns about sharing personal information with services and goods providers with whom they have no pre-existing relationship. Providers may, likewise, have concerns with having their information shared with unknown individuals or customers.

BRIEF SUMMARY

Conventional technology limits the ability of these customers or providers to engage in transactions with each other. For example, conventional technology typically does not provide a way for potential customers to maintain anonymity in contacting potential providers to request or seek information about the services or goods the providers offer. In these situations, the customer's name and/or contact information may be forwarded to unknown providers even before the customer has engaged a specific provider for services or goods. For example, ride services such as Uber® and Lyft® may provide a physical address (e.g., home) of a potential customer to several potential service providers (e.g., drivers) in soliciting the service providers to accept a job (e.g., transport from one location to another location). This disclosure of contact information may dissuade potential customers from seeking providers for short term services or for delivering goods.

A method of routing providers to destinations may be summarized as including causing presentation, by a provider mobile electronic device operated by a first provider, of navigation information to an intermediary destination without identification of a final destination, the final destination which is a location at which at least one of services are to be performed or goods delivered; in response to a signal indicative of the provider mobile electronic device reaching the intermediary destination, causing presentation, by the provider mobile electronic device, of navigation information to the final destination; and in response to a signal indicative of the provider mobile electronic device reaching the final destination, causing a notification to be provided to at least one electronic device logically associated with an entity that is not the first provider. The intermediary destination may be a specific intermediary destination identified by a specific address or specific set of coordinates, and causing presentation of navigation information to an intermediary destination without identification of a final destination may include causing presentation of navigation information toward the specific intermediary destination. The intermediary destination may be a first geofenced area that is larger than and encompasses the final destination, and causing presentation of navigation information to an intermediary destination without identification of a final destination may include causing presentation of navigation information toward the first geofenced area. The intermediary destination may be a first geofenced area that may be larger than and encompasses the final destination and may further include determining the intermediary destination based on the first geofenced area that is larger than and encompasses the final destination. Determining the intermediary destination based on the first geofenced area may include determining the first geofenced area based on a distance from the final destination; and determining a specific location on a boundary of the determined geofenced area that is closest to a starting destination. Causing presentation, by a provider mobile electronic device operated by a first provider, of navigation information to an intermediary destination without identification of a final destination, may include receiving encrypted location information via a first application executing on the provider mobile electronic device, the encrypted location information which specifies the final destination but not the intermediary destination; and determining the intermediary destination via the first application executing on the provider mobile electronic device based at least on part on the received encrypted location information.

Causing presentation, by a provider mobile electronic device operated by a first provider, of navigation information to an intermediary destination without identification of a final destination, may further include decrypting the received encrypted location information via the first application executing on the provider mobile electronic device, the decrypted location information only accessible to the provider on reaching the intermediary destination. Causing presentation, by a provider mobile electronic device operated by a first provider, of navigation information to an intermediary destination without identification of a final destination, may include receiving encrypted location information via a first application executing on the provider mobile electronic device at a first time, the encrypted location information that specifies both the intermediary destination and the final destination; at a first time, decrypting the encrypted location information that identifies the intermediary destination; and at a second time, decrypting the encrypted location information that identifies the final destination, the first time occurring before the second time, and the second time occurring at or after the provider reaches the intermediary destination.

Causing presentation, by a provider mobile electronic device operated by a first provider, of navigation information to an intermediary destination without identification of a final destination, may further include tracking a current location of the provider mobile electronic device via the first application.

Causing presentation, by a provider mobile electronic device operated by a first provider, of navigation information to an intermediary destination without identification of a final destination, may further include determining whether the current location of the provider mobile electronic device has reached the intermediary destination; and in response to determining that the current location of the provider mobile electronic device has reached the intermediary destination, causing decryption of the encrypted location information that identifies the final destination by the first application. Causing presentation, by a provider mobile electronic device operated by a first provider, of navigation information to an intermediary destination without identification of a final destination, may include at a first time, receiving location information via a first application executing on the provider mobile electronic device, the location information specifying only the intermediary destination and not the final destination; and at a second time, receiving location information via the first application executing on the provider mobile electronic device, the location information specifying the final destination, the first time occurring before the second time, and the second time occurring at or after the provider on reaching the intermediary destination.

Causing presentation, by a provider mobile electronic device operated by a first provider, of navigation information to an intermediary destination without identification of a final destination, may further include tracking a current location of the provider mobile electronic device via the first application.

Causing presentation, by a provider mobile electronic device operated by a first provider, of navigation information to an intermediary destination without identification of a final destination, may further include determining whether the current location of the provider mobile electronic device has reached the intermediary destination; and in response to determining that the current location of the provider mobile electronic device has reached the intermediary destination, causing a notification to be sent to a server that triggers sending of the location information specifying the final destination to the provider mobile electronic device.

Causing presentation, by a provider mobile electronic device operated by a first provider, of navigation information to an intermediary destination without identification of a final destination, may further include at a first time, providing the intermediary destination in an unencrypted form by the first application to a second application executing on the provider mobile electronic device, the second application separate and distinct from the first application; and at a second time, providing the final destination in an unencrypted form by the first application to the second application executing on the provider mobile electronic device, the first time occurring before the second time, and the second time occurring at or after the provider reaches the intermediary destination. The second application may be a navigation application executable by at least one of a smartphone, tablet computer, or head unit of a vehicle, and the first application may make a series of application programming interface (API) calls to the second application.

Causing presentation, by a provider mobile electronic device operated by a first provider, of navigation information to an intermediary destination without identification of a final destination, may further include at a first time, providing the intermediary destination from at least one server to at least one application executing on the provider mobile electronic device; and at a second time, providing the final destination from at least one server to at least one application executing on the provider mobile electronic device, the first time occurring before the second time, and the second time occurring at or after the provider on reaching the intermediary destination. Causing presentation of navigation information to an intermediary destination without identification of a final destination may include at least one of causing a visual presentation of a first map with routing information to the intermediary destination without identification of a final destination or causing presentation of turn-by-turn routing information to the intermediary destination without identification of a final destination. Causing a notification to be provided to at least one electronic device logically associated with an entity that is not the first provider may include causing an electronic notification to be provided to at least one electronic device logically associated with an entity that requested the services or goods.

Causing a notification to be provided to at least one electronic device logically associated with an entity that is not the first provider may include causing an electronic notification to be provided to at least one electronic device logically associated with an entity identified by an entity that requested the services or goods and different from the entity that requested the services or goods.

The method of routing providers to destinations may further include, in response to a signal indicative of the provider mobile electronic device being within a specified proximity of an electronic device logically associated with an entity that requested the services or goods, causing a notification to be provided to at least one of the provider mobile electronic device and the electronic device logically associated with the entity that requested the services or goods.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn, are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, structures associated with computing systems including client and server computing systems, networks including packet switching networks or cellular networks and related infrastructure (e.g., base stations, home resource locator system, visitor resource locator system, SS7 systems), as well as networks and other communications channels, have not been shown or described in detail to avoid unnecessarily obscuring descriptions of the implementations. In addition, techniques for using and processing geolocation data, and providing tracking, mapping, and turn-by-turn navigation, including techniques for providing directions or specifying geolocation boundaries such as geofences, have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one implementation," "one implementation," "an implementation," or "an implementation" means that a particular feature, structure or characteristic described in connection with the implementation or implementation is included in at least one implementation or implementation. Thus, the appearances of the phrases "in one implementation," "in one implementation," "in an implementation," or "in an implementation" in various places throughout this specification are not necessarily all referring to the same implementation or implementation. Furthermore, the particular features, structures, or characteristics may be combined in any suitable manner in one or more implementations or implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the implementations.

Figure 1A:
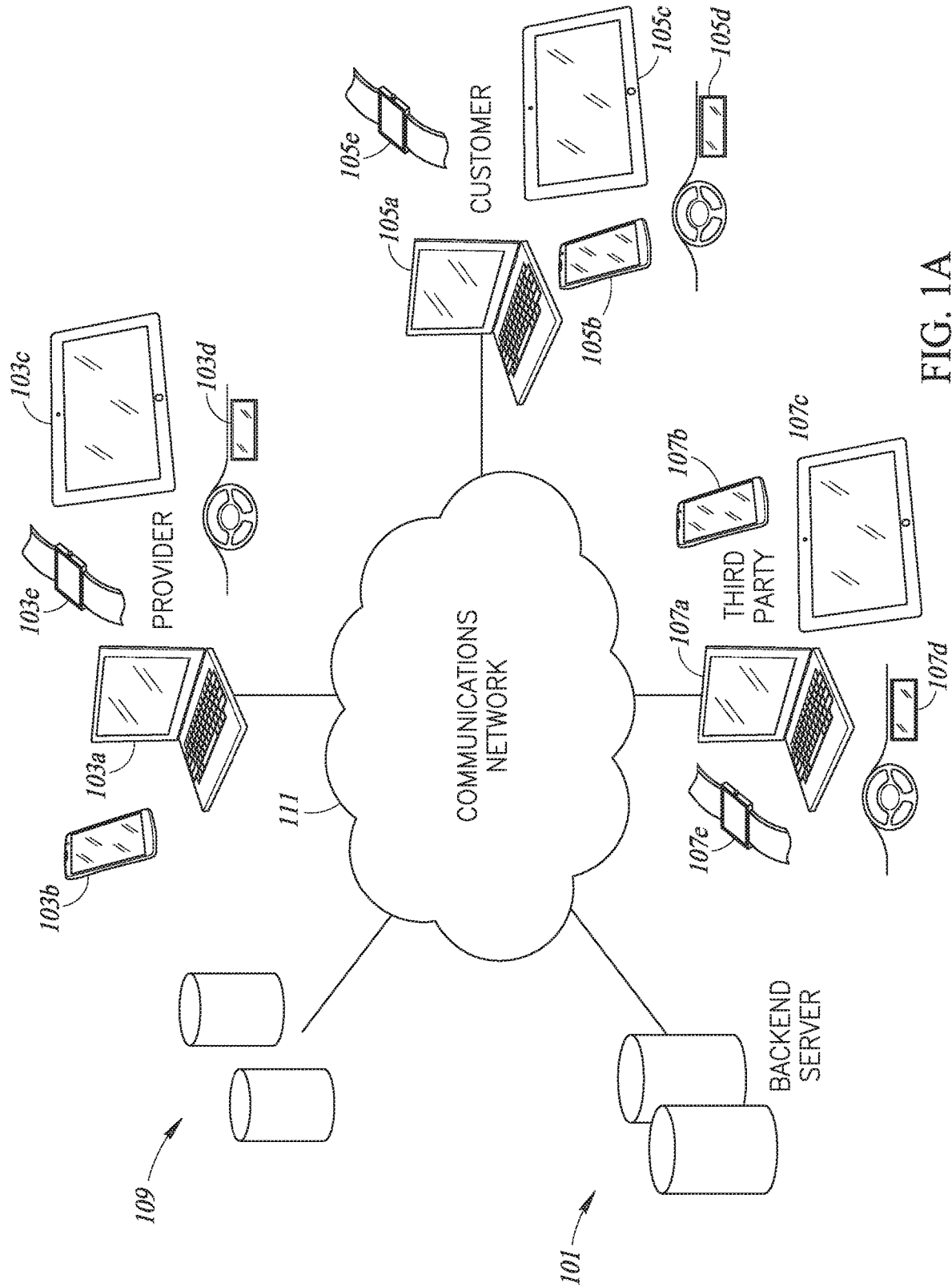
FIG. 1A is a schematic diagram of routing and delivery technology in which customers and/or providers enter relevant information for such information to be searched and result in a match of services to be rendered or goods to be delivered, according to at least one illustrated implementation.

FIG. 1A is a schematic diagram of routing and delivery technology in which customers and/or providers enter relevant information, for such information to be searched and result in a match of services to be rendered or goods to be delivered, according to at least one illustrated implementation. Technology used may include one or more of: one or more backend servers 101, one or more processor-based devices 103 (e.g., computer 103*a*, smart phone 103*b*, tablet 103*c*, vehicle head unit 103*d*, watch 103*e*, etc.) associated with one or more providers, one or more processor-based devices 105 (e.g., computer 105*a*, smart phone 105*b*, tablet 105*c*, vehicle head unit 105*d*, watch 105*e*, etc.) associated with one or more customers, and one or more processor-based devices 107 (e.g., computer 107*a*, smart phone 107*b*, tablet 107*c*, vehicle head unit 107*d*, watch 107*e*, etc.) associated with third parties other than the provider and customer. In some implementations, one or more of the backend servers 101, the provider's processor-based devices 103, the customer's processor-based devices 105, and the third party's processor-based devices 107 may access features or functionality provided by one or more third party servers 109, such as, for example, third party servers 109 that provide mapping or navigation information. In addition, one more of the backend servers 101, the provider's processor-based devices 103, the customer's processor-based devices 105, the third party's processor-based devices 107, and the third party servers 109 may be communicatively coupled via a communications and/or data network(s) 111.

In some implementations, one or more of the backend servers 101 execute software that enable providers to advertise and list the products and services or goods that they provide, and that enable customers to solicit bids or otherwise seek to engage a provider to perform a service or to purchase a good. The backend server(s) 101 may include database software that, when executed, cause one or more databases to be formed; such databases may be used, for example, to store and access data related to providers (e.g., a provider database) and/or customers (e.g., a customer database). In some implementations, the functions provided by the backend servers 101 may be executed on, and provided by, multiple servers (e.g., entering data, storing the provider database, and storing the customer database may be performed on different physical servers).

In some implementations, the provider's processor-based device 103 is communicatively coupled to the backend server(s) 101 via the communications network 111. A provider can enter information to be stored by the backend server(s) 101 through the provider's processor-based device 103. Such information may include, for example, the provider's name, address, types of services or goods provided, price list, contact information, service area, and a short narrative description, for example, of the provider's background or experience. The backend server(s) 101 may enable the provider to enter additional data, such as, for example, data related to state licensing, bonding, or other regulatory or insurance information. In some implementations, the backend server may transmit one or more forms to be displayed on the provider's processor-based device 103 that contain prompts and fields to facilitate the entry of the provider's information. The backend server(s) 101 may store the information related to each of the providers in one or more database structures. Once the provider has entered the requested information, the backend server(s) 101 may register the provider as part of the provider's database, and publish some or all of the requested information to be accessed, searched, and reviewed by potential customers.

In some implementations, the customer's processor-based device 105 is communicatively coupled to the backend server(s) 101 via the communications network 111. The customer may use the customer's processor-based device 105 to provide information to the backend server(s) 101. For example, customers may provide their name, address, and types of services or goods that they would be interested in obtaining. Upon receiving this data, the backend server(s) 101 may store it in one or more database structures (e.g., the customer database). In some implementations, the backend server(s) 101 may transmit one or more forms to be displayed on the customer's processor-based device 105 containing prompts and fields to facilitate the entry of the customer's information.

The backend server(s) 101 may provide one or more options for a customer to submit requests for services or goods. For example, the backend server(s) 101 may provide the customer with the ability to submit a request containing key word searches for services or goods, the results of which the backend server(s) 101 may transmit for display on the customer's processor-based device 105. The customer may then review the options provided by the various providers and select the provider they would like to hire. In some implementations, the backend server(s) 101 may provide the customer with the ability to submit requests to solicit bids from multiple providers to perform a service or provide a good. The backend server(s) 101 may transmit the bids received from responding providers for display on the customer's processor-based device 105, enabling a customer to review and select between the received bids.

In some implementations, the backend server(s) 101 provides scheduling and other support once the customer has selected the provider to use. For example, the backend server(s) 101 may have access to the provider's scheduling calendar such that the backend server(s) 101 can provide the customer with the provider's available time slots. In some implementations, for example, the backend server(s) 101 may transmit a calendar to be displayed on the customer's processor-based device 105 indicating the provider's availability, such as, for example, availability by day or even specific time periods within each day. Once the customer has selected a time period, the backend server(s) 101 may transmit an appointment notification to the provider's processor-based device 103 and block off the time period on the provider's calendar. In addition, the backend server(s) 101 may transmit an appointment notification to the customer's processor-based device 105, giving the customer the option of placing the appointment on the customer's electronic calendar. Once a customer and provider have agreed upon a task to be provided (e.g., a service rendered or good provided), one or more of the location information and the navigation information for intermediary or the final destinations may be made available to the provider via the provider's processor-based device 103, as discussed below.

Figure 1B:
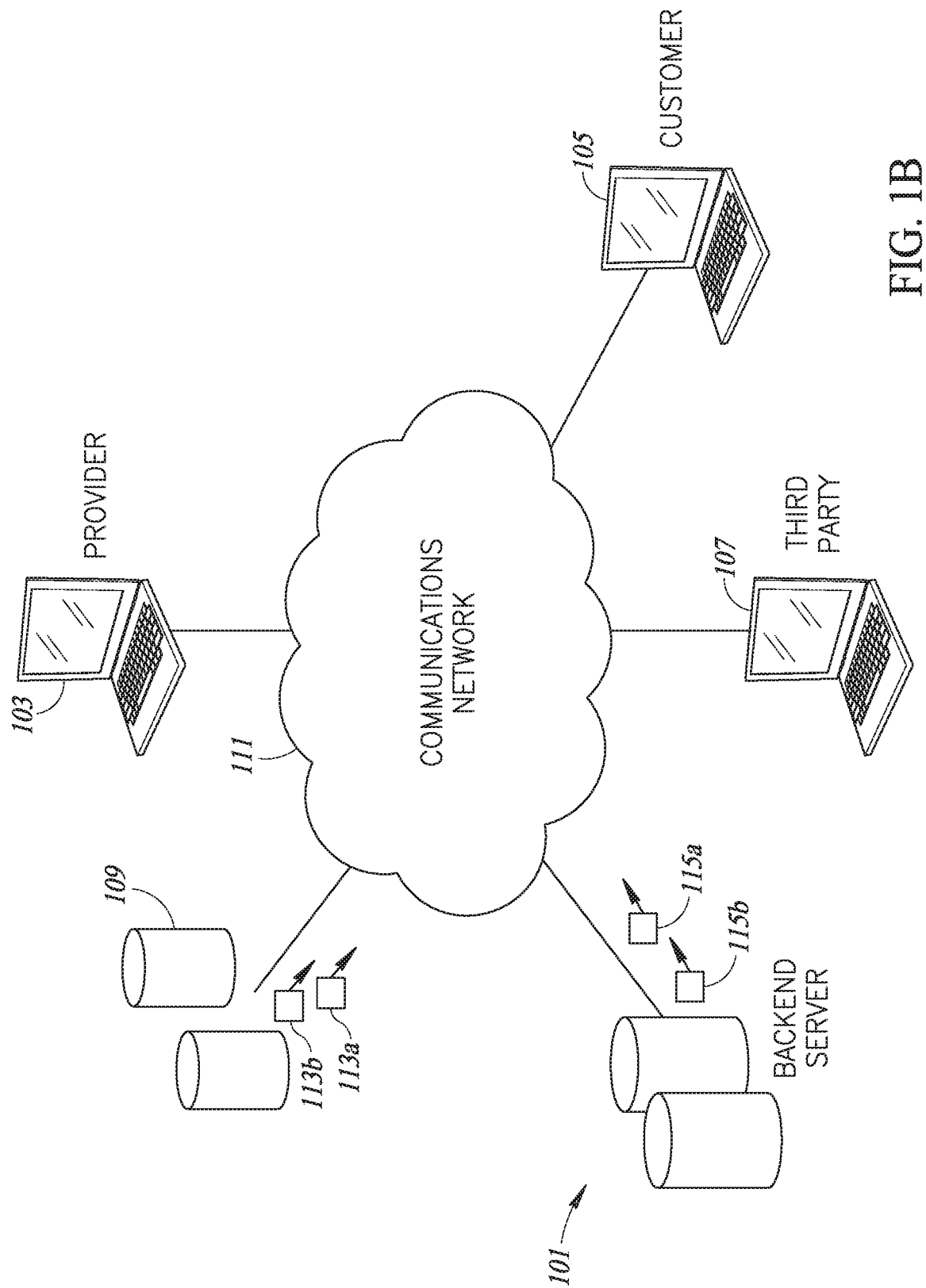
FIG. 1B is a schematic diagram of routing and delivery technology in which one or more backend servers transmit a first and a second set of location information to the provider's processor-based device in different communications separated by a period of time, according to at least one illustrated implementation.

FIG. 1B is a schematic diagram of the backend server(s) 101 that transmits a first and a second set of location information (115a, 115b) to the provider's processor-based device 103 in different communications, according to at least one illustrated implementation. In some implementations, the first set of location information 115a may include one or more intermediary destinations the provider's processor-based device 103 must reach before the backend server(s) 101 will transmit the second set of location information 115b identifying the final destination at which the service is to be provided or good delivered. The location information 115a, 115b may be received by one or more of the provider's processor-based devices 103 (e.g., the provider's computer 103a, cell phone 103b, tablet computer 103c, and/or vehicle head unit 103d), and cause the provider's processor-based devices 103 to retrieve data for, and present navigation information to, an intermediary destination.

The location information 115b identifying the final destination may be made accessible to the provider when the provider indicates that it has reached an intermediary destination. In some implementations, the location of the provider is associated with the provider's processor-based device 103, which is tracked using mapping and GPS capabilities of the provider's processor-based device 103. In this situation, the provider may be required to load an application ("app") onto its processor-based device 103. In some implementations, the app may access the GPS data on the provider's processor-based device 103, and compare the current location to the intermediary destination. When the app determines the provider's processor-based device has reached the intermediary destination, it may transmit a notification message to the backend server(s) 101. In some implementations, the app may periodically retrieve the location information from the provider's processor-based device 103 and transmit the location information to the backend server(s) 101, which will determine when the provider's processor-based device 103 has reached an appropriate intermediary destination.

Upon determining that the provider's processor-based device 103 has reached the intermediary destination, the backend server(s) 101 may transmit additional location information 115b to the provider's processor-based device 103 (e.g., via email or text message) for the final, precise destination. The location of the final, precise destination may be displayed on a second map on the provider's processor-based device 103.

In some implementations, the intermediary destination is represented by a geofence boundary surrounding the final address. For example, the geofence boundary may be formed by a circle of a certain radius (e.g., one mile) that is larger than and encompasses the final destination. In some implementations, the geofence boundary may be based on other criteria, such as the road distance or travel time (current or estimated) to the final destination, which might result in a geofence boundary that is irregularly shaped. To further obfuscate the final destination, the backend server(s) 101 may further choose a secondary point within a certain distance of the final destination (e.g., within one-eighth of a mile), and use this secondary point to form the geofence boundary. Such obfuscation may be particularly useful, for example, when a circle forms the geofence boundary; otherwise, the final destination may be determined by identifying the center of the circle that forms the geofence boundary. In some implementations, the backend server(s) 101 may divide a city or region up into static areas or neighborhoods, such that the location information used to display by the first map indicates the neighborhood of the final destination.

The provider's processor-based device 103 may present navigation information 113 to the provider in the form of, for example, a map and/or turn-by-turn directions. Data for such navigation information 113 may be requested from, and provided by, one or more third party servers 109 (e.g., servers that provide the data and functionality for Google Maps and/or Apple Maps). In some implementations, for example, the provider's processor-based device 103 may receive the location information 115a for the intermediary destination from the backend server(s) 101, and then transmit this location information 115a to the third party servers 109 with a request for mapping and directions to the intermediary destination. The provider's processor-based device 103 may receive, in response, navigation information 113a in the form of data for a map or turn-by-turn directions from the third party servers 109. The provider's processor-based device 103 may then present on its display the navigation information 113a for the intermediary destination. Similarly, upon receiving the location information 115b for the final destination from the backend server(s) 101, the provider's processor-based device 103 may transmit this location information 115b to the third party servers 109 with a request for mapping and direction functionality for the final destination. The provider's processor-based device 103 may receive, in response, navigation information 113b in the form of data for a map or turn-by-turn directions from the third party servers 109. The provider's processor-based device 103 may then present on its display the navigation information 113b for the final destination.

Figure 1C:
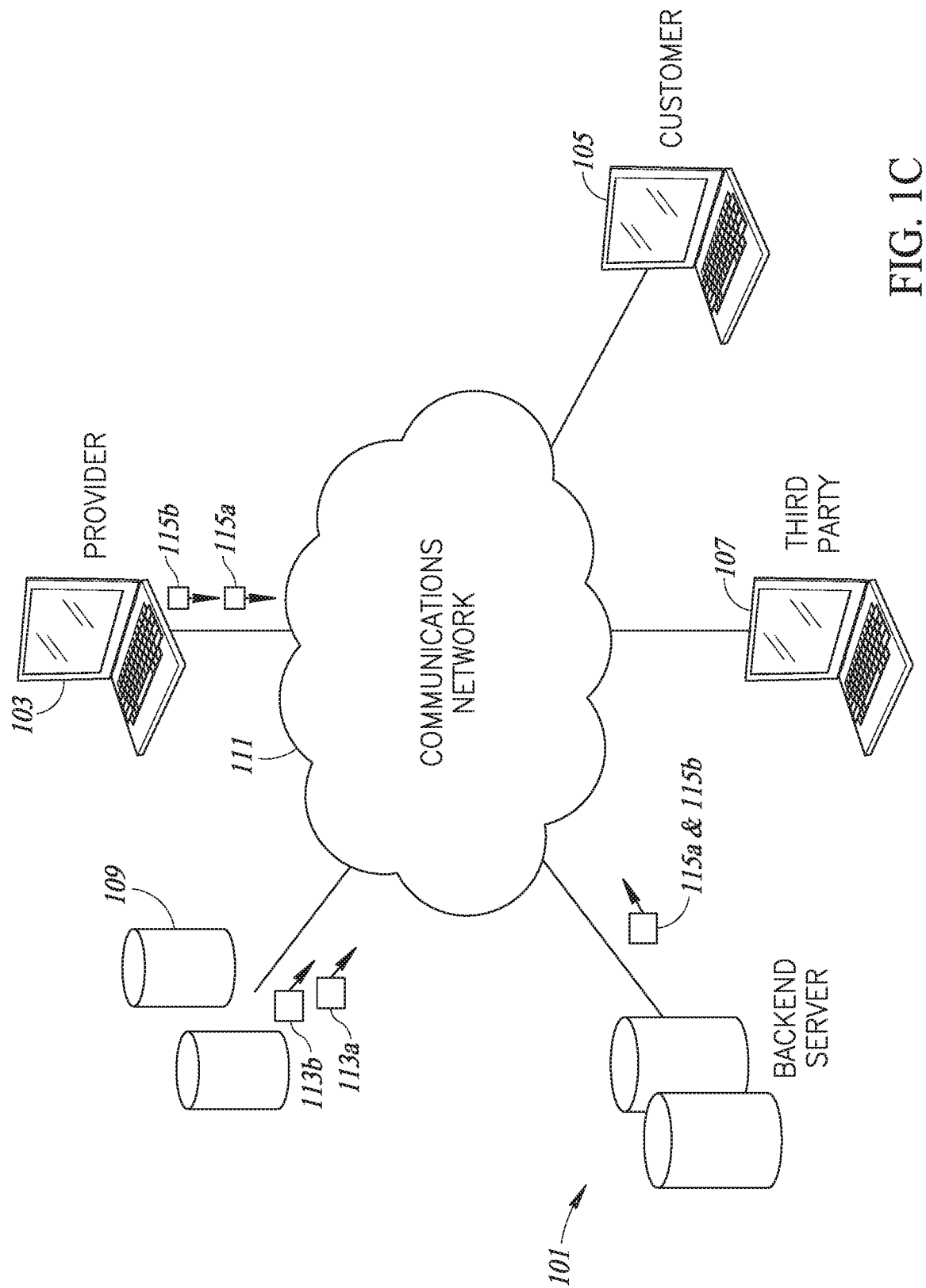
FIG. 1C is a schematic diagram of routing and delivery technology in which one or more backend servers transmit location information identifying an intermediary destination and a final destination to a provider's processor-based device in the same communication, according to at least one illustrated implementation.

FIG. 1C is a schematic diagram of the backend server(s) 101 that transmits the location information 115 identifying the intermediary destination and the final destination to the provider's processor-based device 103 in the same communication, according to at least one illustrated implementation. In such an implementation, the location information 115 indicating the final destination may be hashed or otherwise secured against unauthorized access by the provider. The key to the hash may be stored on and accessible only by the provider's processor-based device 103. When the provider's processor-based device 103 determines that it has reached the specified intermediary point, the provider's processor-based device 103 may execute code to access the location information 115 for the final destination. Transmitting location information 115 for both the intermediary destination and the final destination in the same communication potentially reduces the number of communications and messages being transmitted between the backend server(s) 101 and the provider's processor-based device 103. Such further enables location information 115 and navigation information 113 for the final destination to be accessed by and/or displayed on the provider's processor-based device 103 even when the processor-based device 103 loses its connection with the backend server(s) 101 upon or after reaching the intermediary destination.

The provider's processor-based device 103 may present navigation information 113 to the provider in the form, for example, of a map and/or turn-by-turn directions, as previously noted. Such navigation information 113 may be requested from, and provided by, one or more third party servers 109 (e.g., servers that provide the data and functionality for Google Maps and/or Apple Maps). In some implementations, for example, the provider's processor-based device 103 may transmit the location information 115a for the intermediary destination to the third party servers 109 with a request for mapping and directions to the intermediary destination. The provider's processor-based device 103 may receive, in response, navigation information 113a in the form of data for a map or turn-by-turn directions from the third party servers 109. The provider's processor-based device 103 may then present on its display the navigation information 113a for the intermediary destination. Similarly, upon accessing and decrypting the location information 115b for the final destination, the provider's processor-based device 103 may transmit this location information 115b to the third party servers 109 with a request for mapping and direction functionality for the final destination. The provider's processor-based device 103 may receive, in response, navigation information 113b in the form of data for a map or turn by turn directions from the third party servers 109. The provider's processor-based device 103 may then present on its display the navigation information 113b for the final destination.

Figure 1D:
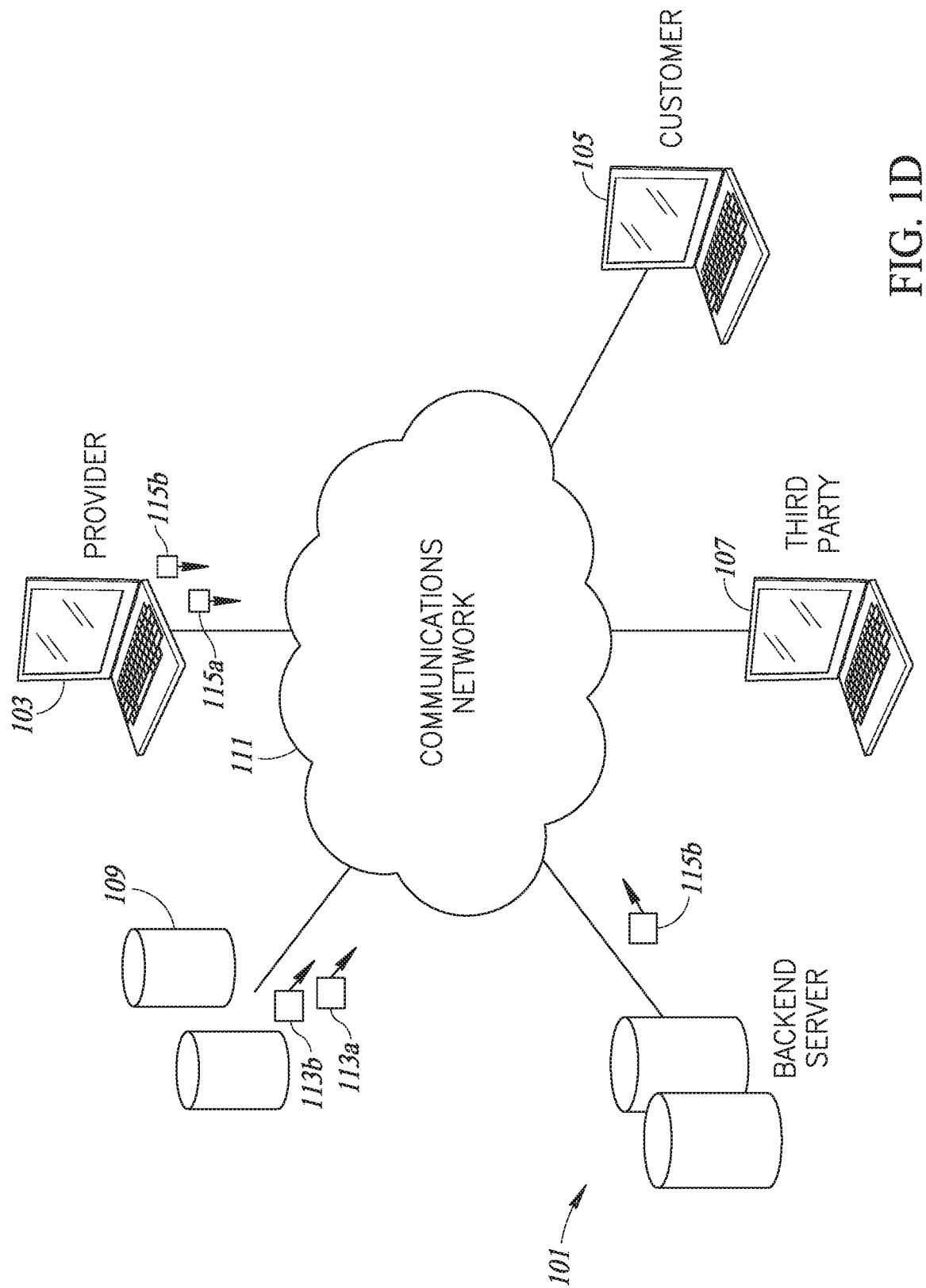
FIG. 1D is a schematic diagram of routing and delivery technology in which one or more backend servers transmit location information identifying only a final destination to a provider's processor-based device, according to at least one illustrated implementation.

FIG. 1D is a schematic diagram of the backend server(s) 101 that transmits the location information 115b identifying only the final destination to the provider's processor-based device 103, according to at least one illustrated implementation. In such an implementation, the provider's processor-based device 103 may determine the location for the intermediary destination based upon the location information 115b for the final destination. As noted before, the location information 115b for the final destination may be hashed. In such an implementation, the provider's processor-based device 103 may decrypt and access the hashed location information 115b for the final destination as needed. Once the provider's processor-based device 103 has determined the location information 115a for the intermediary destination, it may transmit a request for navigation information 113a to the intermediary destination, such as for example, from one or more third party servers 109. The provider's processor-based device 103 may present the received navigation information 113a to the provider in the form of, for example, a map and/or turn-by-turn directions received from one or more third party servers 109 (e.g., servers that provide the data and functionality for Google Maps and/or Apple Maps). After the provider's processor-based device 103 has reached the intermediary destination, the provider's processor-based device 103 may request and receive navigation information 113b for the final destination, as noted before.

Figure 1E:
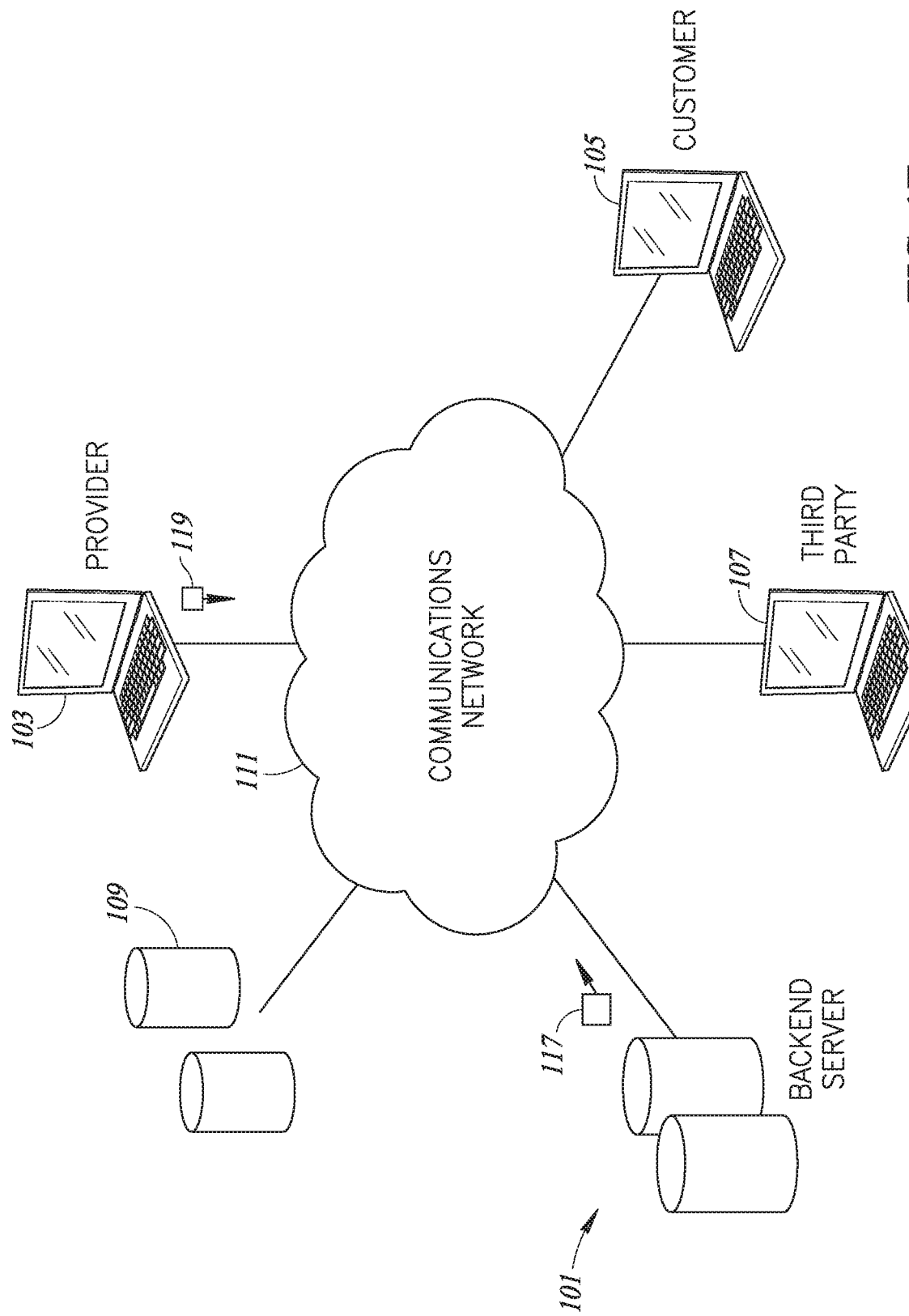
FIG. 1E is a schematic diagram of routing and delivery technology in which one or more backend servers provide one or more notification services related to a requested service or goods, according to at least one illustrated implementation.

FIG. 1E is a schematic diagram in which the backend server(s) 101 provides one or more notification services related to the requested service or goods, according to at least one illustrated implementation. In such an implementation, the customer may request that the backend server(s) 101 transmit a notification 117 to the customer's processor-based device 105 via, for example, email, text message, or like communications, when the provider's processor-based device 103 reaches the intermediary destination. In addition, the customer may request that a notification 117 be sent to one or more processor-based devices 107 associated with third parties, such as a spouse, a trusted neighbor, or a security guard (e.g., at a gated community), when the provider's processor-based device 103 reaches the intermediary point.

The backend server(s) 101 may transmit a notification 117 to the customer's processor-based device 105 upon receiving an alert message or notification 119 that the provider has completed the requested service or delivered the requested good. In such an implementation, the provider may use the provider's processor-based device 103 to transmit to the back end server 101 an alert message 119 signifying completion of the requested service or delivery of the requested good. The backend server(s) 101 may then transmit a notification 117 to the customer's processor-based device 105 regarding completion of the service or delivery of the request good. The customer may further request that such a notification 117 be transmitted to one or more third party's processor-based device(s) 107. In some implementations, the backend server(s) 101 may continue to receive updates regarding the location of the provider's processor-based device 103, and transmit a notification 117 to the customer's processor-based device 105 and/or a third party's processor-based device 107 when such updates indicate that the provider's processor-based device 103 has traveled a certain distance away from the final destination after the provider has completed the requested service or delivered the requested good. For example, in some implementations, the backend server(s) 101 may transmit a notification 117 to the customer's processor-based device 105 and/or an indicated third party's processor-based device 107, via email or text message, for example, upon receiving an alert message 119 from the provider's processor-based device 103 that it has reached the original intermediary destination or geofence boundary after the requested service has been completed or good delivered.

Figure 1F:
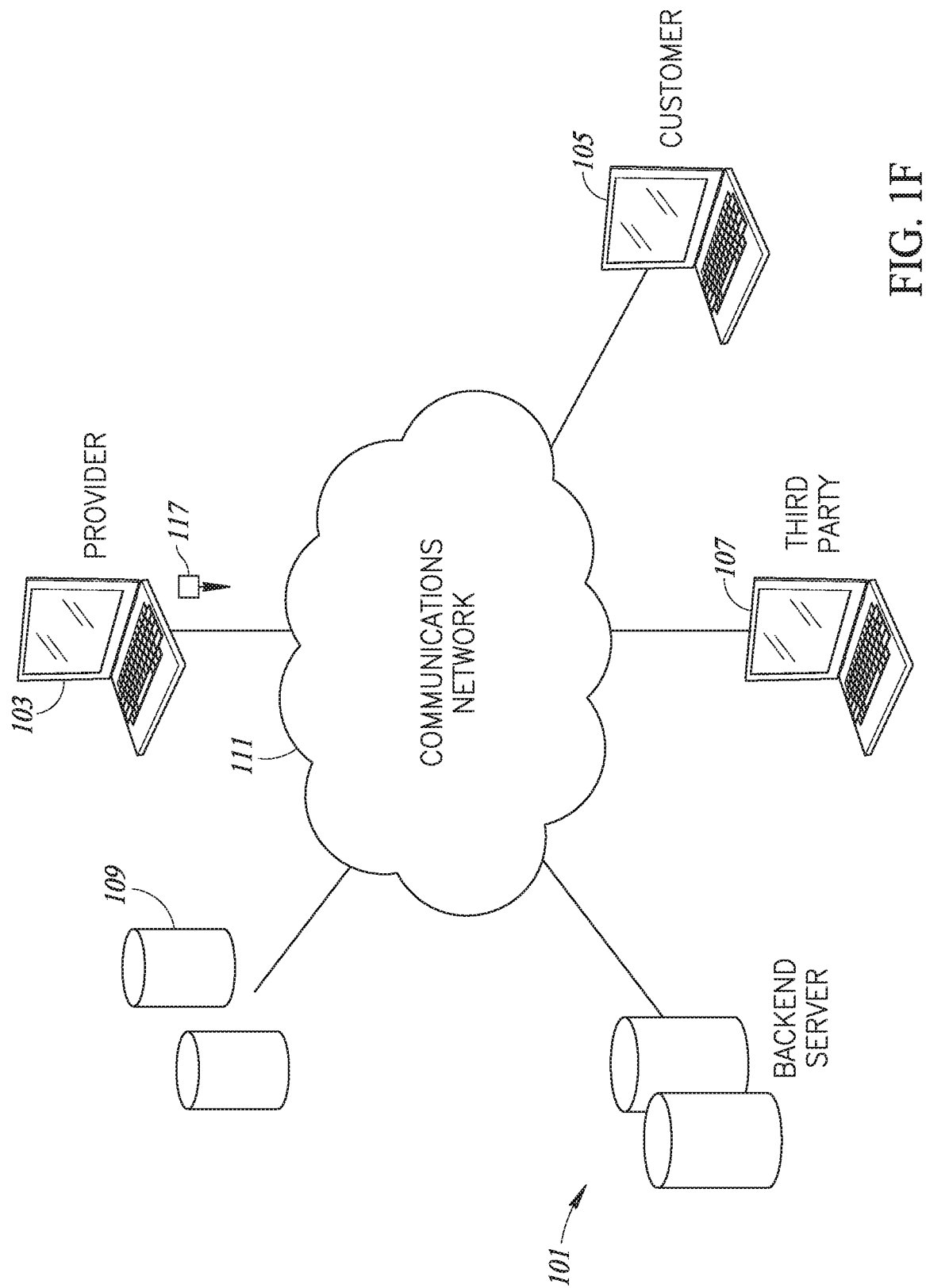
FIG. 1F is a schematic diagram in which a provider's processor-based device provides one or more notification services related to a requested service or goods, according to at least one illustrated implementation.

FIG. 1F is a schematic diagram in which the provider's processor-based device 103 provides one or more notification services related to the requested service or goods, according to at least one illustrated implementation. In such an implementation, the customer may request that such notifications 117 be transmitted to the customer's processor-based device 105 via, for example, email, text message, or like communications, when the provider's processor-based device 103 reaches the intermediary destination. In addition, the customer may request that such a notification 117 be sent to one or more processor-based devices 107 associated with third parties, such as a spouse, a trusted neighbor, or a security guard (e.g., at a gated community), when the provider's processor-based device 103 reaches the intermediary point. Such enables the notifications 117 to be transmitted directly from the provider's processor-based device 103 without requiring involvement by the backend server(s) 101.

Figure 2:
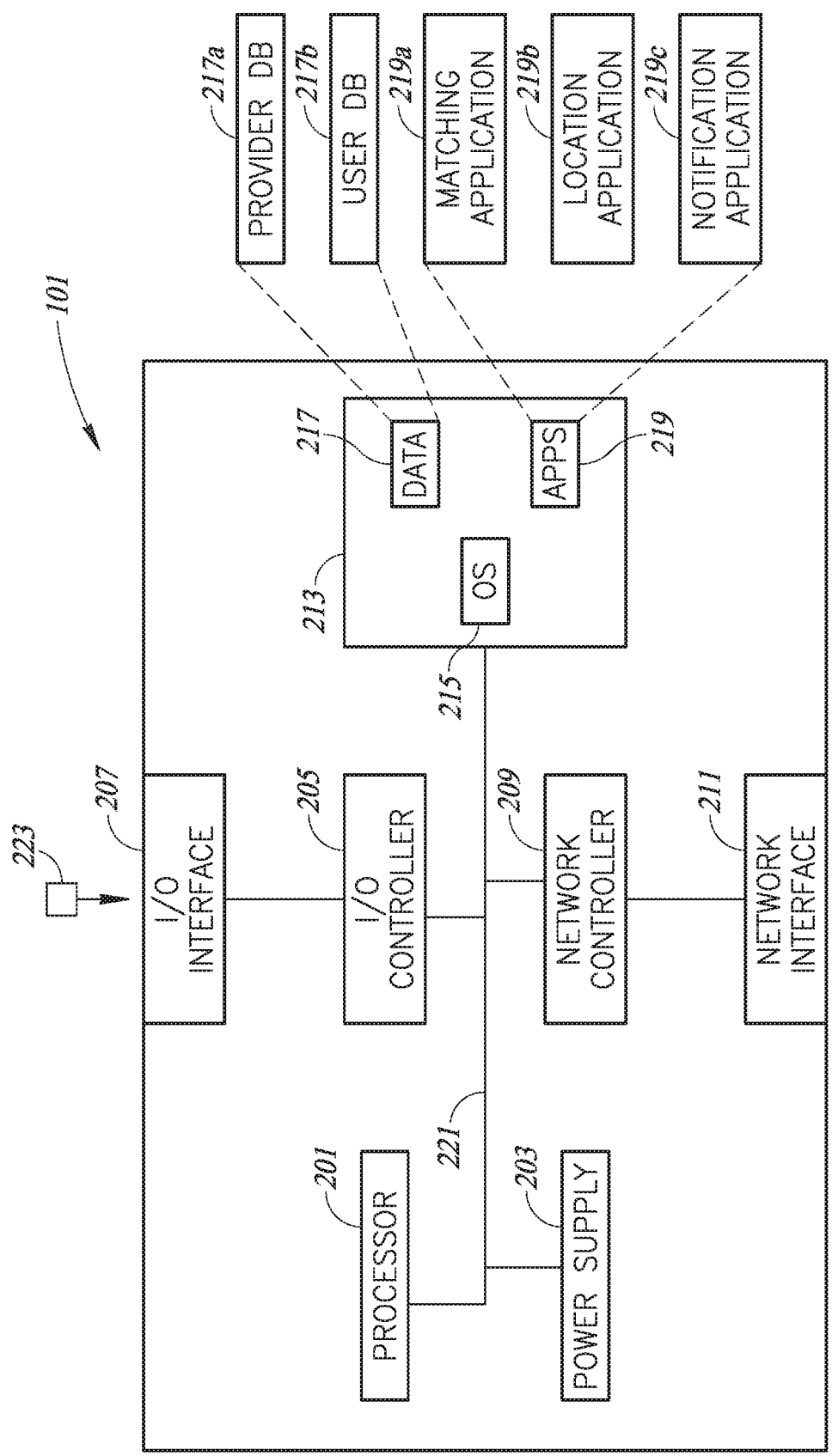
FIG. 2 is a block diagram of a backend server that provides matching and scheduling for services and/or the delivery of goods by the provider to the customer, according to at least one illustrated implementation.

FIG. 2 is a block diagram of the backend server(s) 101 that provides matching and scheduling for services and/or the delivery of goods by the provider to the customer, according to at least one illustrated implementation. Each of the one or more backend server(s) 101 may include one or more processors 201, a power supply 203, an input/output ("I/O") controller 205 and associated interface(s) 207, a network controller 209 and associated interface(s) 211, and one or more computer memories 213 that store an operating system 215, data 217, and one or more applications 219. The data may be configured to store a provider database 217a and a customer database 217*b*. In some implementations, each database may be stored on one or more computers. The applications 219 may include a matching application 219*a*, a location application 219*b*, and a notification application 219*c*. In some implementations, each of the applications may be stored on and executed by one or more separate databases. Each of these components may be communicatively connected by bus(es) 221, which can provide bidirectional communication between the various components of the backend server(s) 101. The bus(es) 221 may take, for example, the form of a plurality of buses (e.g., data buses, instruction buses, power buses, and the like) included in at least one body.

The processor 201 may be any logic processing unit, such as one or more central processing units (CPUs), digital signal processors (DSPs), application-specific integrated circuits (ASICs), field programmable gate arrays (FPGAs), etc. The power supply 203 may include one or more power supplies 203, which provide electrical power to the various components of the backend server(s) 101 via power connections. The power supply 203 may be an internal power supply, such as battery, energy source, fuel cell, or the like.

The I/O controller 205 and associated I/O interface(s) 207 enable an operator of the backend server(s) 101 to enter commands and information through input devices such as a touch screen, keyboard, and/or a pointing device, such as a mouse, using, for example, a graphical customer interface. Other input devices can include a microphone, joystick, game pad, tablet, scanner, etc. These and other input devices are connected to the processor 201 through the I/O interface 207, such as a serial port interface, that couples to the bus(es) 221, although other interfaces such as a parallel port, game port, or a wireless interface or a universal serial bus ("USB") can be used. A monitor or other display device may be coupled to the bus(es) 221 via the I/O interface 207, which may include a video adapter. The backend server(s) 101 can be communicatively connected to other output devices, such as printers, etc.

The network controller 209 and associated network interface(s) 211 enable the backend server(s) 101 to communicate with one or more electronic communications devices via communications or data networks 111. The network controller 209 may include one more communications stacks to facilitate such network communication. Communications may be via a wired and/or a wireless network architecture, for instance, wired and wireless enterprise-wide computer networks, intranets, extranets, and/or the Internet. Other implementations may include other types of communications networks including telecommunications networks, cellular networks, paging networks, and other communications and/or data networks 111. There may be any variety of computers, switching devices, routers, bridges, firewalls and other devices in telecommunications paths between the backend server(s) 101 and the one or more electronic communications devices that are also communicatively coupled via the communications and/or data network(s) 111.

The computer memories 213 may include read-only memory ("ROM") and random access memory ("RAM"). The computer memories 213 may comprise a hard disk drive for reading from and writing to a hard disk, an optical disk drive for reading from and writing to removable optical disks, and/or a magnetic disk drive for reading from and writing to removable optical disks, and/or a magnetic disk drive for reading from and writing to magnetic disks. The optical disk can be a CD-ROM, while the magnetic disk can be a magnetic floppy disk or diskette. The hard disk drive, optical disk drive, and magnet disk drive may communicate with the processor 201 via the system bus 221. Those skilled in the relevant art will appreciate that other types of computer-readable media that can store data accessible by a computer may be employed, such as WORM drives, RAID drives, magnetic cassettes, flash memory cards, digital video disks ("DVD), Bernoulli cartridges, RAMs, ROMs, smart cards, etc.

The computer memories 213 can be used to store an operating system 215, data 217, and applications 219. Although illustrated as a single non-transitory computer- or processor-readable computer memory 213, in some implementations, the non-transitory computer- or processor-readable computer memories 213 may constitute a plurality of non-transitory storage media. The plurality of non-transitory storage media may be commonly located at a single location, or distributed at a variety of remote locations.

The data 217 may include one or more database structures that are used to store data related to providers in the provider database 217*a* and customers in the customer database 217*b*. Such databases may be stored separately from one another on separate computer memories or may be stored on the same computer memory 213. The data structures within the provider database 217*a* and the customer database 217*b* may take a variety of forms, such as, for example, records associated with relational databases, a database itself, lookup tables, and the like.

The provider database 217*a* may include a plurality of records, with each record being associated with a different provider. In addition, the record for each provider may include a plurality of fields that store information related to the provider. The provider-related fields may store information such as, for example, the provider's name, contact information, services or goods provided, a price list, a service or delivery area, a short narrative or description of the provider and its services or goods, resume, certificates and accreditations, driver's license information, country of citizenship, work authorization(s), and a contractor's or business's license number. In some implementations, the backend server(s) 101 may cause an electronic form to be sent to the provider to facilitate the entry of such information. In such an implementation, for example, the electronic form sent to the provider may have fields that correspond to the fields in the associated provider-record stored in the provider database 217*a*. The record for each provider may include additional information obtained from other, third-party sources. For example, the database record may include ratings and other information for the provider obtained from third-party Websites (e.g., www.yelp.com or www.tripadvisor.com) or from other third parties such as the Better Business Bureau® or from state health agencies. In some implementations, the information obtained from third parties may be collected and verified by the entity that controls the provider database 217*a*. The provider's record may, thus, serve as a clearinghouse of information related to the provider. In some implementations, the backend server(s) 101 may enable the provider to enact privacy settings that restrict the ability of other parties to access some or all of the information and data stored within the provider's record.

The customer database 217*b* may include a plurality of records, with each record being associated with a different customer. In addition, each customer record may include a plurality of fields that store information related to the customer. The customer-related fields may store information such as, for example, the customer's name, address, contact information such as email and/or cell phone number, employer, and/or credit card information. In some implementations, the backend server(s) 101 may cause an electronic form to be sent to the customer to facilitate the entry of such information. In such an implementation, for example, the electronic form sent to the customer may have fields that correspond to the fields in the associated customer-record stored in the customer database 217*b*. The record for each customer may include additional information that may be obtained from other, third-party sources, such as, for example, credit score information received from one or more credit scoring bureaus (e.g., Equifax®, Experian®, and/or TransUnion®). In some implementations, the information obtained from third parties may be collected and verified by the entity that controls the customer database 217*b*. The customer's record may, thus, serve as a clearing-house of information related to the customer. In some implementations, the backend server(s) 101 may enable the customer to enact privacy settings that restrict the ability of other parties using the routing and delivery technology to access some or all of the information and data stored within the customer's record.

The applications 219 stored in the computer memories 213 may include the matching application 219*a*, the location application 219*b*, and the notification application 219*c*. Such applications 219 may be stored separately from one another on separate computer memories 213 or may be stored on the same computer memory 213.

The matching application 219*a* includes processor-executable computer code that enables the backend server(s) 101 to match the services or goods being requested by an individual customer to the services and goods being offered by the various providers. In some implementations, for example, the matching application 219*a* may enable a customer to submit a request for goods or services to the backend server(s) 101. Such a request may include information, such as, for example, the type of goods or services sought, the price that the customer is willing to pay for the goods or services, as well as the final destination at which the goods are to be delivered or the services are to be rendered. In such an implementation, the matching application 219*a* may cause the backend server(s) 101 to transmit information related to the request to some or all of the providers that have records stored in the provider database 217*a*. In some implementations, for example, the matching application 219*a* may cause the backend server(s) 101 to transmit the customer's request for goods or services to a subset of the providers based on various criteria, such as, for example, whether a provider provides the type of service or good sought, whether the final destination is within the provider's delivery area, and other like criteria. In such an implementation, the matching application 219*a* may make a match with the first provider that responds to the backend server(s) 101 indicating that it will provide the requested good or service to the customer. The matching application 219*a* may then cause the backend server(s) 101 to transmit confirmation messages via, for example, text message or email, to both the customer and the provider, confirming the appointment. The matching application 219*a* may also cause the backend server(s) 101 to transmit a calendar event or appointment to either or both of the customer's processor-based device 105 and the provider's processor-based device 103. As will be discussed below, the provider will not have access at this point to the location information of the final destination where the services are to be rendered or the goods delivered.

In some implementations, the matching application 219*a* may enable the customer to place a request for services or goods out for bid to the providers. In such an implementation, the matching application 219*a* may cause the backend server(s) 101 to transmit some or all of the provider's information related to a type of service or good sought to the customer's processor-based device 105. As noted above, the matching application 219*a* may cause the backend server(s) 101 to transmit the customer's request for goods or services to a subset of the providers based on various criteria, such as, for example, whether a service provider provides the type of service or good sought, whether the final destination is within the provider's delivery area, and other like criteria. Upon receiving the request, the provider may submit bids via the provider's processor-based device 103 to provide the requested service or good, including the price that it will charge for the service or good. The matching applications 219*a* may cause the backend server(s) 101 to transmit information related to the various bids to the customer's processor-based device 105 for review. When the backend server(s) 101 receives an acceptance of one of the bids from the customer's processor-based device 105, the matching application 219*a* may then cause the backend server(s) 101 to transmit confirmation messages via, for example, text message or email, to both the customer's processor-based device 105 and the provider's processor-based device 103 confirming the appointment. The matching application 219*a* may also cause the backend server(s) 101 to transmit a calendar event or appointment to either or both of the customer's processor-based device 105 and the provider's processor-based device 103. As noted above, the provider will not have access at this point to the location of the final destination where the services are to be rendered or the goods delivered.

In some implementations, the matching application 219*a* may enable the customer to search and review various providers to provide a service or good. In such an implementation, the matching application 219*a* may receive search criteria from the customer's processor-based device 105 indicating the type of good or service sought by the customer, the final destination that the service is to be provided or the good rendered, as well as additional criteria, such as, for example, a minimum rating from one or more third parties. The matching application 219*a* may then cause the backend server(s) 101 to search the provider records stored on the provider database 217*a*, identify the providers that match the identified criteria, and return information regarding the identified providers to the customer's processor-based device 105. Such information may include, for example, the types of services or goods offered by each provider, a price list, and service areas. In some implementations, the information returned by the backend server(s) 101 to the customer's processor-based device 105 may not include the name or contact information of the identified providers, to prevent the customer from circumventing the matching application in contacting the provider. The customer may then peruse information related to the various providers identified by the backend server(s) 101, and send a request to the backend server(s) 101 to initiate contact with one or more of the identified providers and/or to confirm an appointment for a service or good. When the backend server(s) 101 receives a confirmation for a service or good, the matching application 219*a* may cause the backend server(s) 101 to transmit confirmation messages via, for example, text message or email, to both the customer's processor-based device 105 and the provider's processor-based device 103 confirming the appointment. The matching application 219*a* may also cause the backend server(s) 101 to transmit a calendar event or appointment to either or both of the customer's processor-based device 105 and provider's processor-based device 103. As noted above, the provider will not have access at this point to the location of the final destination where the services are to be rendered or the goods delivered.

After an appointment has been scheduled and confirmed, the location application 219b causes navigation information and/or location information 115 to be transmitted to the provider's processor-based device 103 to enable the provider to travel to the final destination. The location information 115 may include information identifying an intermediary destination that may be, for example, located between the provider's current location and the final destination. The location information 115 may include information for the final destination at which the service requested by the customer is to be rendered or the good requested by the customer delivered. In some implementations, the location application 219b may not cause the backend server(s) 101 to provide the location information 115 for either or both of the intermediary destination and the final destination until some set time period (e.g., one hour) before a scheduled appointment time. In some implementations, the location application 219b may require the provider to send via the provider's processor-based device 103 an indication that the provider is ready to travel towards an appointment before causing the backend server(s) 101 to provide some or all of the location information 115. In some implementations, the location application 219b may cause the backend server(s) 101 to encrypt the location information 115 for either or both of the intermediary destination and the final destination before transmitting them to the provider's processor-based device 103.

The location application 219b may provide the location information 115 to the provider's processor-based device 103 in multiple communications that occur at different times. The location application 219b may cause the backend server(s) 101 to transmit initial location information 115 that identifies the intermediary destination; such initial location information 115 may be transmitted, for example, when the customer and the provider confirm an appointment, and may be used by the provider to travel to the intermediary destination. The location application 219b may cause the backend server to transmit second location information 115 when the location application 219b receives confirmation, such as from the signal 223 received from the provider's processor-based device 103, that the provider has reached the intermediary destination. The second location information 115 may identify the final destination and be used by the provider to request directions to travel from the intermediary destination to the final destination.

In some implementations, the location application 219b may provide the location information 115 to the provider's processor-based device 103 in one communication. In such an implementation, the location application 219b may cause the backend server(s) 101 to transmit location information 115 that identifies both the intermediary destination and the final destination as part of the same communication. Such a communication may be made, for example, when the customer and the provider confirm an appointment. In such an implementation, the location information 115 for either or both of the intermediary destination and the final destination may be hashed or otherwise secured to prevent unauthorized access by the provider or any third party. An application running on the provider's processor-based device 103 may decrypt the location information 115 for either or both of the intermediary and final destinations when certain criteria are met. For example, the provider's processor-based device 103 may decrypt the location information 115 identifying the intermediary destination a certain time period before a scheduled appointment, or upon receiving an indication by the provider via the provider's processor-based device 103 that the provider is responding to the requested service or delivery for a good. The provider's processor-based device 103 may decrypt the location information 115 identifying the final destination upon receiving notification that the provider's processor-based device 103 has reached the intermediary destination, using, for example, its location-positioning capabilities. Such an implementation may advantageously still function even when the provider's processor-based device 103 is no longer communicatively coupled to the backend server(s) 101 at the intermediary destination. In some implementations, the location application 219b may transmit just the location information for the final destination to the provider's processor-based device 103. The location application 219b on the provider's processor-based device 103 may calculate the location information 115 for the intermediary destination based upon the received location information 115 identifying the final destination.

In some implementations, as discussed below, the location information 115 for the intermediary destination may be a geofence boundary that surrounds the location of the final destination. In such an implementation, the geofence boundary may indicate multiple intermediary destinations that the provider can reach to receive the location information 115 identifying the final destination. In some implementations, the geofence boundary may be formed by a circle of a certain radius (e.g., one mile) that surrounds the location of the final destination. In some implementations, the geofence boundary may be determined according to current or expected travel times by the provider to the final destination. For example, the geofence boundary may include locations that are within 15 minutes' travel time of the final destination. Such an implementation may result in an irregularly shaped geofenced boundary. In some implementations, the location of the final destination may be further obfuscated by placing the location of the final destination at some alternate location other than the center of the geofenced area defined by a geofence boundary. Thus, for example, the alternate location may be located within a certain distance (e.g., within one-eighth of a mile or 5 minutes' travel time) from the location of the final destination, but the alternate location is used to calculate the geofence boundary. In some implementations, the alternate location may be randomly selected based on the location of the final destination. In some implementations, the geofence boundaries may be static, such as, for example, geofence boundaries that are based on existing city neighborhoods.

The notification application 219c may transmit one or more notifications 117 from the backend server(s) 101. In some implementations, for example, the notification application 219c may cause the backend server(s) 101 to transmit a notification 117 to the customer's processor-based device 105 when the provider's processor-based device 103 has reached the intermediary destination, thus providing the customer with notice to expect the provider to arrive at the final destination within a short period of time. As another example, the notification application 219c may cause the backend server(s) 101 to transmit a notification 117 to the customer's processor-based device 105 when the provider has indicated via, for example, the provider's processor-based device 103 that the requested service has been completed or the requested good delivered. In some implementations, the notification application 219c may cause the backend server(s) 101 to transmit a notification 117 to the customer's processor-based device 105 when the provider has indicated, via the provider's processor-based device 103, for example, that the provider has completed a service or delivered a good, and traveled a certain distance from the final destination (e.g., to the original intermediary destination, such as the geofence boundary). Such notifications 117 may be useful to the customer to indicate that the customer can return to the final destination. In each of these implementations, the notification application 219*c* may cause the backend server(s) 101 to transmit notifications 117 in addition, or instead, to processor-based devices 107 associated with third parties other than the provider and the customer, such as, for example, the customer's neighbor or relative. The notifications 117 may be transmitted in any number of formats, such as, for example, through email, text message, SMS message, a page, or any like message.

Figure 3:
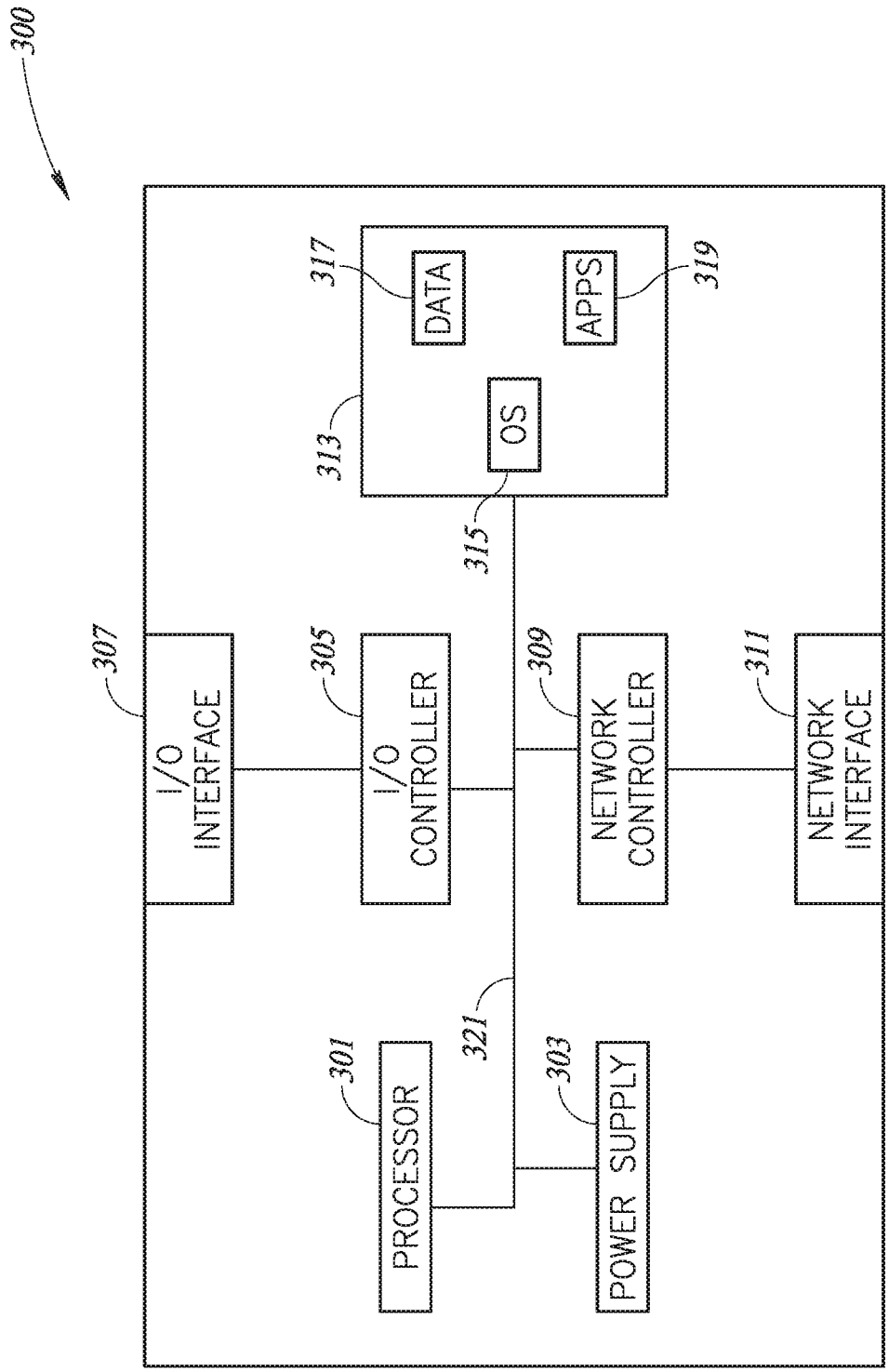
FIG. 3 is a block diagram of a computer that may be used by a customer, a provider, and/or a third party for the routing and/or delivery of services or goods, according to at least one illustrated implementation.

FIG. 3 is a block diagram of a computer 300, such as may be used as a customer's processor-based device 105 (e.g., customer computer 105*a*) and/or a third party's processor-based device 107 (e.g., third party computer 107*a*) for the routing and/or delivery of services or goods, according to at least one illustrated implementation. The computer 300 may include as a non-exhaustive list one or more of a personal computer (PC), a portable email device, a personal digital assistant, a cell phone, a smart phone, a satellite phone, a palmtop computing device, a laptop, a tablet computing device, a game console, a media player, a vehicular head unit, or another device with communications capabilities. The computer 300 may include at least one processor 301, a power supply 303, an I/O controller 305 and associated I/O interface 307, a network controller 309 and an associated network interface 311, and one or more computer memories 313 that store an operating system 315, data 317, and one or more applications 319. Each of these components may be communicatively connected by bus(es) 321, which can provide bidirectional communication between the various components of the computer 300. The customer may use the computer 300 to enter information via the communications and/or data network(s) 111 into the one or more data forms stored as part of the customer database 217*b* on the backend server(s) 101.

The at least one processor 301 may be any logic processing unit, such as one or more central processing units (CPUs), digital signal processors (DSPs), application-specific integrated circuits (ASICs), field programmable gate arrays (FPGAs), etc. The power supply 303 may include one or more power supplies 303, which provide electrical power to the various components of the provider's processor-based device 103 via power connections. The power supplies 303 may be an internal power supply, such as a battery, energy source, fuel cell, or the like.

The I/O controller 305 and associated I/O interface(s) 307 enable an operator of the computer 300 to enter commands and information through input devices such as a touch screen, keyboard, and/or a pointing device, such as a mouse, using for example a graphical customer interface. Other input devices can include a microphone, joystick, game pad, tablet, scanner, etc. These and other input devices are connected to the processor 301 through the I/O interface 307, such as a serial port interface, that couples to the bus(es) 321, although other interfaces such as a parallel port, game port, or a wireless interface or a universal serial bus ("USB") can be used. A monitor or other display device may be coupled to the bus(es) 321 via the I/O interface 207, which may include a video adapter. The computer can include other output devices, such as speakers, printers, etc.

The network controller 309 and associated network interface(s) 311 enable the computer 300 to communicate with one or more electronic communications devices, such as the backend server(s) 101, via communications or data networks 111. The network controller 309 may include one more communications stacks to facilitate such network communication. Communications may be via a wired and/or a wireless network architecture, for instance, wired and wireless enterprise-wide computer networks, intranets, extranets, and/or the Internet. Other implementations may include other types of communications networks including telecommunications networks, cellular networks, paging networks, and other communications and/or data networks 111. There may be any variety of computers, switching devices, routers, bridges, firewalls and other devices in telecommunications paths between the computer 300 and the one or more electronic communications devices (e.g., the backend server(s) 101).

The computer memories 313 include read-only memory ("ROM") and random access memory ("RAM"). The computer memories 313 may comprise a hard disk drive for reading from and writing to a hard disk, an optical disk drive for reading from and writing to removable optical disks, and/or a magnetic disk drive for reading from and writing to magnetic disks. The optical disk can be a CD-ROM, while the magnetic disk can be a magnetic floppy disk or diskette. The hard disk drive, optical disk drive, and magnet disk drive may communicate with the processor 301 via the system bus 321. Those skilled in the relevant art will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

The computer memories 313 can be used to store an operating system 315, data 317, and one or more applications 319. Although illustrated as a single non-transitory computer- or processor-readable computer memory 313, in many implementations, the non-transitory computer- or processor-readable computer memories 313 may constitute a plurality of non-transitory storage media. The plurality of non-transitory storage media may be commonly located at a common location, or distributed at a variety of remote locations. Exemplary operating systems for operating system 315 include ANDROID™, LINUX®, macOS™, and WINDOWS®.

The one or more applications 319 may include applications to facilitate entry of data into the one or more databases stored on the backend server(s) 101. For example, the applications 319 may include one or more Web browsers that can display HTML-based forms. Such HTML-based forms may be used to facilitate the entry of data into database records, such as the records stored as part of the customer database 217*b*. Customers may also use the Web browsers to submit search requests regarding services or goods being offered from the various providers; the Web browsers display the search results that are provided in response to the submitted search requests.

Figure 4:
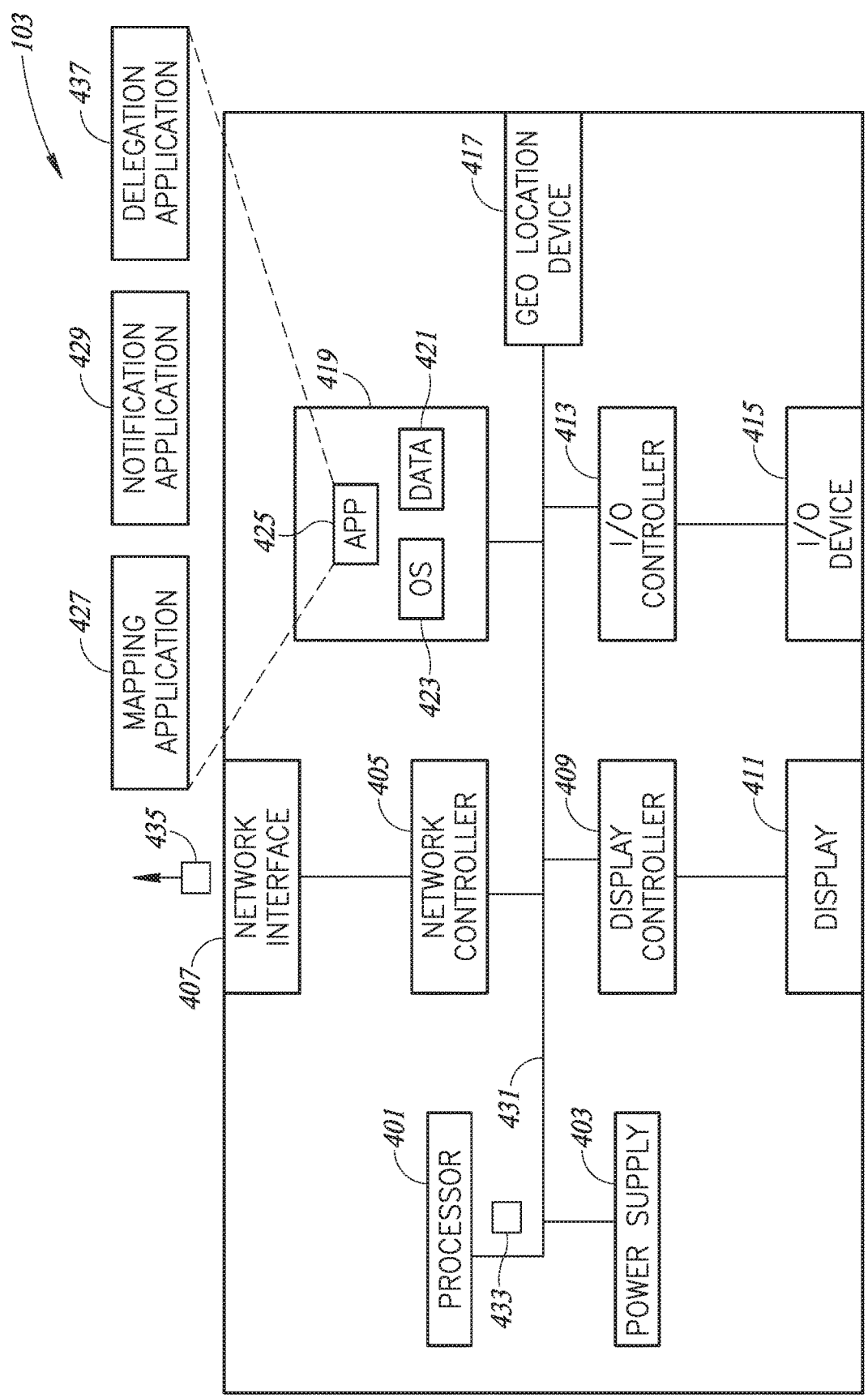
FIG. 4 is a block diagram of a provider's processor-based device, according to at least one illustrated implementation.

FIG. 4 is a block diagram of a provider's processor-based device 103, according to at least one illustrated implementation. The provider's processor-based device 103 includes at least one processor 401, a power supply 403, a network and/or wireless controller 405 and associated interface 407, a display controller or driver 409 and associated display 411, an I/O controller 413 and associated I/O interface for one or more I/O devices 415, and one or more processor-readable memories 419 that store data 421, an operating system 423, and one or more applications 425. Such applications 425 may include, for example, a mapping application 427 that may cause navigation information 113 to be presented on the display 411 of the provider's processor-based device 103, a notification application 429 that may enable the provider's processor-based device 103 to transmit and receive notifications with other devices on the communications and/or data network 111, and a delegation application 437 that enables a provider to delegate tasks, for example, to one or more employees or contractors. Each of the components within the provider's processor-based device 103 may be communicatively connected by bus(es) 431, which can provide bidirectional communication between the various components of the provider's processor-based device 103. Bus(es) 431 may take, for example, the form of a plurality of buses (e.g., data buses, instruction buses, power buses) included in at least one body. Such a processor-based device 103 may be, as a non-exclusive list of examples, a portable email device, personal digital assistant, cell phone, smart phone, satellite phone, palmtop computing device, laptop, tablet computing device, game console, media player, vehicular head unit, or other device with wireless communications capabilities and that includes or combines capabilities of any or all of these.

The processor(s) 401 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The processor 401 may be referred to in the singular, but may be two or more processors.

The power supply 403 provides electrical power to the various components of the provider's processor-based device 103 via power connections. The power supply 403 may include one power supply or multiple power supplies. The power supply 403 may be an internal power supply, such as a secondary battery, ultra-capacitor, fuel cell, or the like.

The provider's processor-based device 103 may include a wireless and/or network controller 405 that enables the provider's processor-based device 103 to communicate with one or more communications or data networks 111. The network controller 405, for example, may include one or more wireless carrier network stacks that enable the provider's processor-based device 103 to transmit data through the communications and/or data network(s) 111. Suitable communications protocols include FTP, HTTP, Web Services, SOAP with XML, WI-FI™ compliant, BLUETOOTH™ compliant, cellular (e.g., GSM, CDMA), Near Field Communication (NFC) standards, and the like. Suitable transportation protocols include TCIP/IP, UDP, SCTP, DCCP, and the like.

The network interface 407 may include any device capable of transmitting and receiving communications via electromagnetic energy. The network interface 407 may enable communications over a cellular network, and may include a CDMA transceiver, a GSM transceiver, a 3G transceiver, a 4G transceiver, an LTE transceiver, and any similar current or future developed computing device transceiver having at least one of a voice telephony capability or a data exchange capability. In at least some instances, the network interface 407 can include more than one interface. For example, in some instances, the network interface 407 can include at least one dedicated, full- or half-duplex, voice call interface and at least one dedicated data interface. In other instances, the network interface 407 can include at least one integrated interface capable of contemporaneously accommodating both full- or half-duplex voice calls and data transfer. The network interface 407 may enable communications over other types of wireless or wired networks, such as local area networks (LANs) or wide area networks (WANs), and may include packet switched communications networks such as the Internet, Worldwide Web, extranets, and or intranets.

The display controller 409 and associated display 411 may be used to render visual or optical presentations of the navigation information 113 received from the backend server(s) 101 and/or the third party servers 109 via the communications and/or data network(s) 111. The navigation information 113 may be presented on the display 411 in the form of an ordered list of turn-by-turn directions to enable the provider to travel to an intermediary destination and/or a final destination. Alternatively, or in addition, the navigation information 113 may be presented on the display 411 in the form of a map that enables the provider to travel to the intermediary destination and/or the final destination. The display 411 may include a touchscreen or a touch sensitive display device, such as a resistive touchscreen or a capacitive touchscreen. In such implementations, the provider may interact with the display 411 to provide an indication that the requested service has been completed or the requested good has been delivered. The provider's processor-based device 103 may transmit such an indication to other components, such as the backend server(s) 101, the customer's processor-based device 105, and/or the third party's processor-based device 107, that are communicatively coupled to the communications and/or data network(s) 111.

The provider's processor-based device 103 may include one or more I/O controllers 413 that facilitate and process inputs received from and outputs provided to one or more input/output devices 415. The input device 415 may include a keyboard, a pointing device such as a mouse, and/or a graphical user interface. Other input devices 415 can include a microphone, joystick, game pad, tablet, scanner, etc. These and other input devices 415 are communicatively coupled to the provider's processor-based device 103 through one or more interfaces, such as a serial port interface, a parallel port, or a universal serial bus (USB). In some implementations, the I/O controller 413 and input interfaces may be included in a combined integrated circuit, or chip, and include a transceiver that enables wireless communications between the provider's processor-based device 103 and peripheral input device 415 through one or more radios and antennae compliant with one or more wireless protocols. Such wireless protocols may include, for example, Bluetooth™, IEEE 802.11b (or other WI-FI™ standards), infrared data association (IrDA), radiofrequency identification (RFID), or other such protocols that enable input devices 415 to communicate with the provider's processor-based device 103.

The I/O controller 413 may include an audio driver that controls associated audio output devices 415. The audio output devices 415 may include, for example, one or more speakers that provide an audible output for customers of the provider's processor-based device 103. The audio output devices 415 may include one or more peripheral components that are separate from the provider's processor-based device 103, such as headphones or stand-alone speakers. In such implementations, the peripheral audio output device 415 may be connected to the provider's processor-based device 103 via a wired connection or via a wireless connection using one or more wireless protocols, such as Bluetooth™, IEEE 802.11b (or other WI-FI™ standards), infrared data association (IrDA), radiofrequency identification (RFID), or other such protocols.

The provider's processor-based device 103 may include one or more geolocation components 417, for example a Global Positioning System (GPS) or a Global Navigation Satellite System (GNSS) receiver, that may be communicably coupled to the processor 401 via the bus 431 to provide geolocation data to the processor 401.

The one or more processor-readable memories 419 may include one or more non-transitory storage media; for example, one or more non-volatile and/or volatile non-transitory storage media such as one or more read only memories (ROM), random access memories (RAM), registers, Flash memory, spinning magnetic media and drive, spinning optical media and drive, etc. The processor readable memories 419 may be used store data 421, such as, for example, data 421 related to the operation of the provider's processor-based device 103 or communications with network 111.

The processor-readable memories 419 may store one or more operating systems 423, such as the iOS® operating system provide by Apple Inc., the Android® operating system provided by Google Inc., the Windows® Phone operating system provided by Microsoft Corp., or other similar operating systems. The processor-readable memories 419 may store one or more applications 425 that comprise logic or machine executable instructions that, when executed by the processor 401, provide functionality to the provider's processor-based device 103. In at least some implementations, the applications 425 may be downloaded or otherwise acquired using an online marketplace such as the Apple App Store, Amazon Marketplace, or Google Play marketplace. In some implementations, such applications 425 may start up in response to selection of a corresponding customer selectable icon by the end customer of the provider's processor-based device 103.

The processor-readable memories 419 may store one or more applications 425. One such application 425 may facilitate the entry of data by the provider into the one or more databases stored on the backend server(s) 101. For example, the applications 425 may include one or more Web browsers that can display HTML-based forms that may be used to facilitate the entry of data into database records, such as the records stored as part of the provider database 217a. Providers may also use the Web browser to submit to the backend server(s) 101 information and details regarding their services, and to respond to search requests from users regarding services or goods. In some implementations, the Web browser may display one or more forms regarding tasks (e.g., services or goods) that the provider has agreed to provide. For example, the Web browser may be used to present a form to the provider that the provider can use to indicate that a task is complete. Such an indication may be received, for example, using a check box or other type of user interface. Such an indication may further result in a notification being transmitted to the customer and/or one or more third parties regarding the status of the desired service or delivery, as discussed below.

The processor-readable memories 419 may store a mapping application 427 that enables the provider's processor-based device 103 to present navigation information 113 to the provider. For example, the mapping application 427 may present such navigation information 113 in the form of one or more maps or sets of turn-by-turn directions that enable the provider to reach the intermediary and/or final destinations. In such an implementation, the mapping application 427 may receive the first location information 115a for the intermediary destination in the form of specific coordinates (e.g., latitude and longitude) or a specific address on the map; the mapping application 427 may transmit the first location information 115a to a server that provides mapping and direction functionality, such as the third party servers 109, with a request to provide directions from the current location of the service provider's processor-based device 103 to the intermediary destination. The mapping application 427 may receive in response from the third party server 109 first navigation information 113a, in the form of data for a map and/or turn-by-turn directions to travel to the intermediary destination. In some implementations, the location information 115a of the intermediary destination may be represented by a geofence boundary that defines a geofenced area, in which lies the location of the final destination. In such, the map that is rendered by the display 411 may depict the geofence boundary.

The mapping application 427 may monitor the location of the provider's processor-based device 103 using the geolocation data determined by the geolocation component 417 as the provider's processor-based device 103 moves towards the intermediary destination. By monitoring the geolocation data, the mapping application 427 can determine when the provider's processor-based device 103 reaches the intermediary destination or passes the geofence boundary. The monitoring of the location of the provider's processor-based device 103 may alternatively be performed by another application. When the provider's processor-based device 103 reaches the intermediary destination, the instructions from the mapping application 427 may cause the processor 401 to generate a signal 433 indicating that the intermediary destination has been reached or passed. In some implementations, the signal 433 may be sent to the computer memories 419 to request the location information 115b for the final destination. In some implementations, the signal 433 may be transmitted via the network interface 407 to the backend server(s) 101 to request the location information 115b for the final destination.

Once the second location information 115b for the final destination has been accessed, the instructions from the mapping application 427 may result in data for the second navigation information 113b to the final destination being presented on the display 411. The mapping application 427 may transmit the second location information 115b to a server that provides mapping and direction functionality, such as the third party servers 109, with a request to provide directions from the current location of the service provider's processor-based device 103 to the final destination. The mapping application 427 may receive in response from the third party server 109 second navigation information 113b, in the form of data for a map and/or turn-by-turn directions, to travel to the final destination. The mapping application 427 may then cause the second navigation data 113b to be presented on display 411.

The mapping application 427 may use commands available from one or more application programming interfaces (APIs) to provide some of the mapping functionality. For example, the mapping application 427 may execute commands available from the CoreLocation framework in iOS or the LocationServices class in Android to specify geofence boundaries and to set alarms when a boundary has been crossed. The mapping application 427 may execute commands available from the Map Kit framework in iOS or the Google Maps Directions API to render on the display 411 maps with directions from the current location of the provider's processor-based device 103 to an intermediary destination or to a final destination.

The mapping application 427 may receive location information 115 for the intermediary destination and/or the final destination from the backend server(s) 101 in various ways. In one implementation, the mapping application 427 may receive all of the location information 115, including the location information 115a for the intermediary destination and the location information 115b for the final destination, in the same communication. In such an implementation, the location information 115b for the final destination may be hashed or otherwise encrypted to prevent unauthorized access by the provider before the intermediary destination is reached. The key for decrypting the location information 115 for the final destination may be stored only on the provider's processor-based device 103. Once the provider's processor-based device 103 reaches the intermediary destination or crosses the geofenced boundary, the mapping application 427 may decrypt the location information 115b related to the final destination in order to request the navigation information 113b related to the final destination and present such navigation information 113b via the display 411. In this type of implementation, the mapping application 427 may still present the navigation information 113 to the provider via the display 411 even when the provider's processor-based device 103 loses communication with the backend server(s) 101 upon or after reaching the intermediary destination.

In some implementations, the mapping application 427 may receive the location information 115a related to the intermediary destination and the location information 115b related to the final destination at different times. In such an implementation, the mapping application 427 may first receive location information 115a related to the intermediary destination or to a geofence boundary. The mapping application 427 may use the geolocation data from the geolocation component 417 to determine when the provider's processor-based device 103 has reached the intermediary destination or crossed the geofence boundary, at which point the mapping application 427 may cause the provider's processor-based device 103 to transmit the notification signal 433 to the backend server(s) 101. In response, the backend server(s) 101 may transmit the location information 115b for the final destination. The mapping application 427 may use the location information 115b to request navigation information 113b for the final destination to be rendered as a map or a set of turn-by-turn directions on the display 411.

In some implementations, the location information 115 received from the backend server(s) 101 may identify just the final destination. In such an implementation, the mapping application 427 may calculate the location information 115a for the intermediary destination and/or a geofence boundary based on the location information 115b of the final destination. The mapping application 427 may then request and present first navigation information 113a via the display 411 in the form of a map or turn-by-turn directions to reach the intermediary destination or the geofence boundary. At that point, the mapping application 427 may access the location information 115b for the final destination, and use the location information 115b for the final destination to request and render navigation information 113b related to the final destination.

The processor-readable memories 419 may store a notification application 429 that enables the provider's processor-based device 103 to transmit and/or receive one or more notifications related to the routing and delivery of services and/or goods. For example, the notification application 429 may provide a graphical user interface (GUI) via display 411 that a provider can use to indicate that a requested service has been completed or that a requested good has been delivered. At that point, the notification application 429 may cause the mobile provider's processor-based device 103 to transmit an alert message or signal 435 to the backend server(s) 101 indicating that the provider has completed the requested service or delivered the requested good. In response, the backend server(s) 101 may transmit one or more notifications 117 regarding the completion of the requested service or delivery of the requested good. Such notifications 117 may be transmitted, for example, to the customer who requested the service or good; alternatively, or in addition, such notification 117 may be transmitted to processor-based devices 107 associated with third parties, such as the customer's neighbors or relatives, to provide notifications via these third party processor-based devices 107 regarding the completion of the requested service or delivery of the requested good.

In some implementations, a notification 117 may be transmitted when the provider's processor-based device 103 is in transit to or moving away from the final destination. For example, the notification application 429 may use the geolocation data from the geolocation component 417 to track the location of the provider's processor-based device 103 as the provider is traveling towards the intermediary destination. When the geolocation data indicates that the provider's processor-based device 103 has reached the intermediary destination and/or the final destination, the notification application 429 may cause the provider's processor-based device 103 to transmit the alert signal 435 to the backend server(s) 101. In response, the backend server(s) 101 may transmit notifications 117 to one or more of the customer processor-based devices 105 and any specified third party processor-based devices 107. After the provider has indicated that it has completed a service or delivered a good, the notification application 429 may use the geolocation data from the geolocation component 417 to track the location of the provider's processor-based device 103 as the provider travels away from the final destination. The notification application 429 may cause the provider's processor-based device 103 to transmit the alert signal 435 to the backend server(s) 101 when the provider has traveled a specified distance from the final destination, such as when the provider has reached the original intermediary point or geofence boundary. In response to receiving the alert message, the backend server(s) 101 may transmit notifications 117 to one or more of the customer's processor-based device 105 and any specified third party processor-based devices 107.

In some implementations, the customer may specify that certain processor-based devices 107 associated with third parties always receive a notification 117 anytime the customer arranges through the backend server(s) 101 to receive a service or good. In such implementations, the customer's record within the customer database 217b may include a field listing the email addresses or phone numbers (for receiving text messages, for example) for these third parties. In some implementations, the customer may associate third party information for receiving such a notification 117 for only specific services or goods. In such an implementation, the customer may specify the email addresses or phone numbers (for receiving text messages, for example) for these third parties as part of the process of searching for and scheduling the specific services or goods.

In some implementations, the notifications 117 are transmitted directly from the provider's processor-based device 103, bypassing the backend server(s) 101. In such implementations, the backend server(s) 101 may provide to the provider's processor-based device 103 the necessary email addresses and/or phone numbers to receive the notifications 117. The notification application 429 can store these email addresses and/or phone numbers as part of the data 421. When the notification application 429 determines that a notification 117 is to be sent, such as, for example, when the provider's processor-based device 103 has reached the intermediary and/or final destination, instructions from the notification application 429 may cause the processor 401 to produce a signal on bus 431 requesting the stored email addresses and/or phone numbers; the instructions from the notification application 429 may further cause the provider's processor-based device 103 to transmit the requested notifications 117 via network interface 407.

In some implementations, notifications may be transmitted between the provider's processor-based device 103 and the customer's processor based device 105 based on the proximity of the two devices 103, 105. Such a notification may be transmitted using, for example, short-range communication protocols (e.g., Bluetooth) when the devices are in close proximity to each other. In such an implementation, each of the processor based devices 103, 105 may be provided with identifying information for the other device. Such identifying information may include, for example, a media access control (MAC) address, an internet protocol (IP) address, a Bluetooth identifier, or other such identifier such as those that may be used for mobile communications. In some implementations, such identifying information may be exchanged when the provider and customer reach an agreement regarding a task to be performed or a service to be provided. In some implementations, such identifying information may be exchanged when the provider reaches a particular location, such as, for example, either or both of the intermediary destination and the final destination. Transmitting such proximity notifications may be useful, for example, when the customer has requested to meet a provider in a crowded public location (e.g., requesting a pick up from a ride share service from a crowded hotel lobby or public side walk). In some implementations, such proximity notifications may be transmitted to the provider's processor based device 103 to alert the provider that the customer's processor based device 105 (and presumably the customer) is present or close to the requested final destination when the provider arrives at the final destination.

In some implementations, the provider's processor-based device 103 may include a delegation application 437 that enables the provider to delegate tasks (e.g., providing services or delivering goods) to one or more employees, subcontractors, or other entities. In such an implementation, the provider may use the delegation application 437 to identify to the backend server(s) 101 those tasks or jobs to be delegated, and to submit to the backend server(s) 101 the contact information of a second provider processor-based device 103 associated with the other entity to which the task is delegated. After a task or job has been delegated, the backend server(s) 101 may transmit the location information 115 to multiple ones of the provider's processor-based devices 103 (e.g., to those processor-based devices 103 associated with the provider and its delegate). In some implementations, the provider may monitor the location and progress of the delegate performing a task via; for example, the backend server(s) 101. Thus, for example, as the backend server(s) 101 receives alert messages 119 from the processor-based device associated with the delegate, the backend server(s) 101 may transmit updates based on such alert message 119 to the provider's processor-based device 103. In some implementations, the delegate's processor-based device may provide the backend server(s) 101 with geolocation information that the backend server(s) 101 may transmit to the provider's processor-based device 103. Any one or more of the provider's processor-based devices 103 (e.g., the provider's cell phone 103*b*, tablet computer 103*c*, and/or vehicle head unit 103*d*) may have the delegation application 437.

Figure 5:
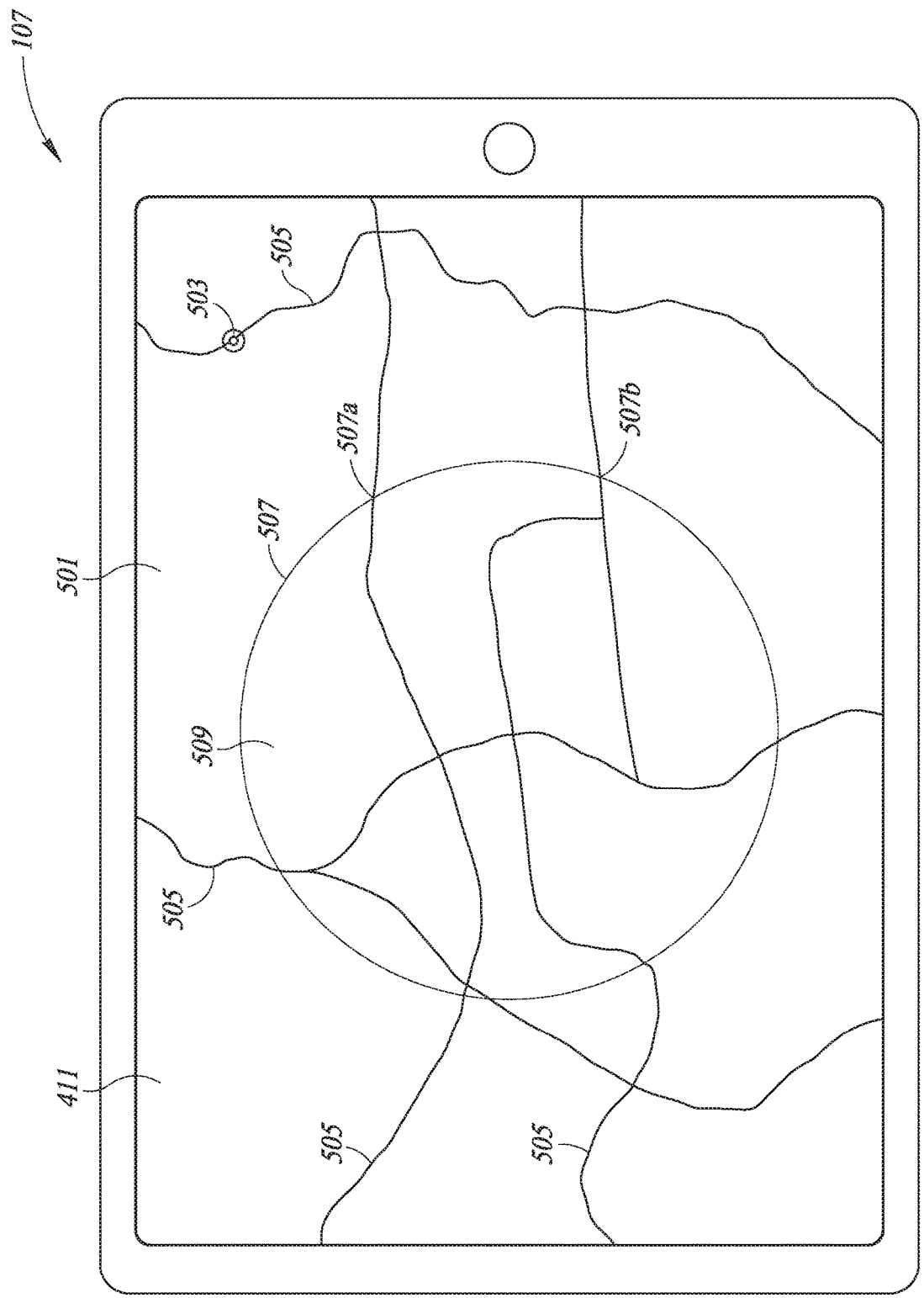
FIG. 5 is a plan view of an electronic device having a display on which navigation information is presented in the form of a first map in which an intermediary destination is indicated by a geofenced boundary, according to at least one illustrated implementation.
Figure 6:
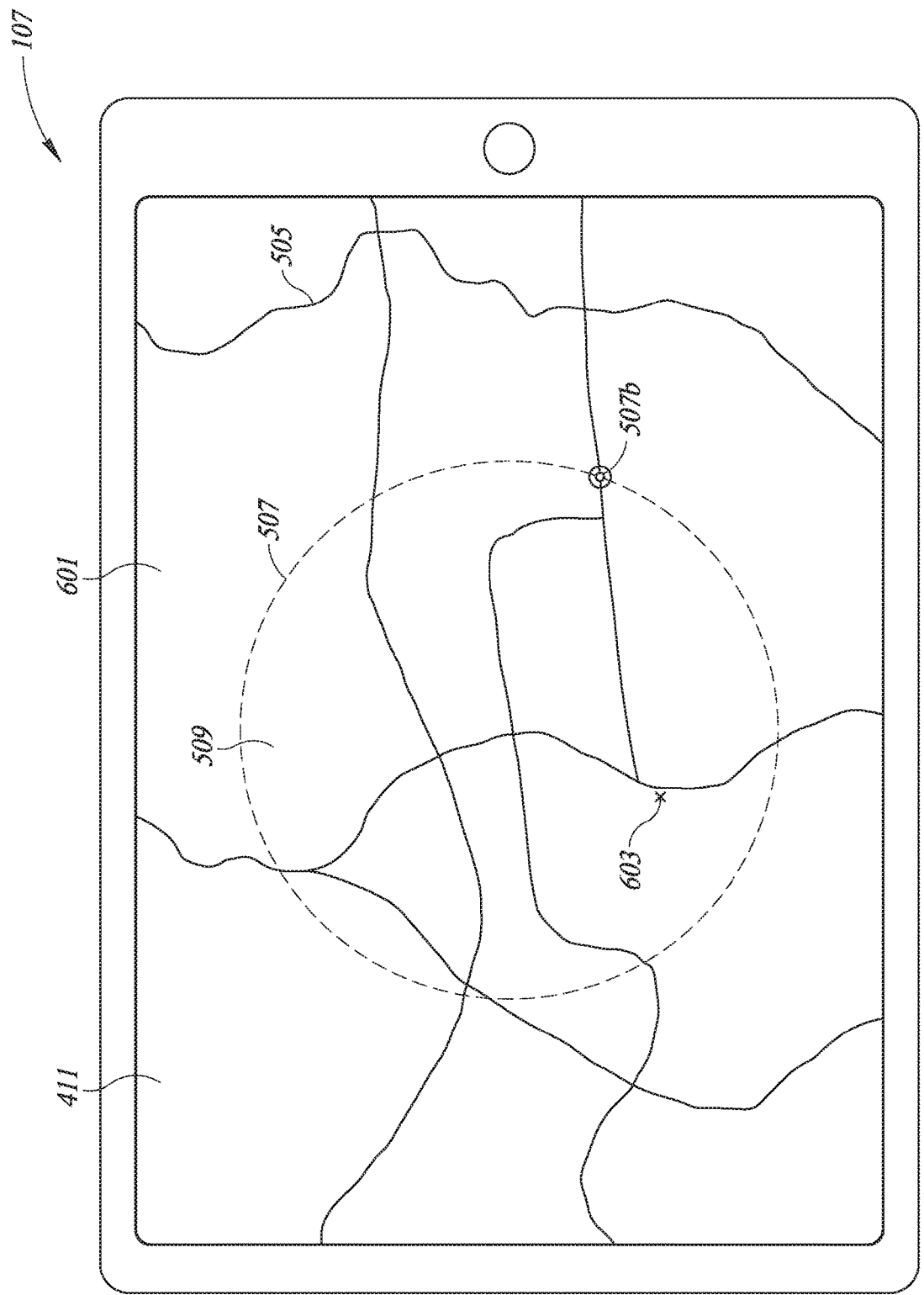
FIG. 6 is a plan view of an electronic device having a display on which navigation information is presented in the form of a second map in which a location for a final destination is presented after the provider has reached the intermediary destination shown in FIG. 5.

FIGS. 5-6 are plan views of a provider's processor-based device 103 having a display 411 on which navigation information 113 is presented, according to at least one illustrated implementation. FIG. 5 illustrates navigation information 113*a* to an intermediary destination being presented via display 411 as a first map 501. The first map 501 includes a current location icon 503 that indicates the current location of the provider's processor-based device 103 along with a plurality of roads 505 within the area presented on the first map 501. The first map 501 further presents the location information 115*a* for an intermediary destination in the form of a geofence boundary 507. As discussed earlier, the geofenced area 509 enclosed by the geofence boundary 507 is larger than and encompasses the location 115*b* of the final destination. As previously discussed, the first map 501 may be presented to the provider via the display 411 when the provider is initially in transit to provide a service or deliver a good. To receive the location information 115*b* identifying the final destination, the provider's processor-based device 103 may need to pass through the geofence boundary, such as, for example, by traveling pass locations 507*a* or 507*b* along the geofence boundary and into the geofenced area 509.

FIG. 6 is a plan view of the provider's processor-based device 103 having a display 411 on which navigation information 113*b* is presented in the form of a second map 601 that is presented via the display 411 to the provider after the provider's processor-based device 103 passed through the geofence boundary 507 at point 507*b* from FIG. 5. As shown in FIG. 6, the location information 115 presented in the second map 601 includes the location information 115*b* for the final destination 603 at which a requested service is to be rendered or a requested good is to be delivered. The location of the final destination 603 may be at some location other than the center of the geofenced area 509 defined by the geofence boundary 507; otherwise, the provider may be able to easily determine the location of the final destination by identifying the center of the geofenced area 509. As previously noted, the notification application 429 may cause a notification 117 to be sent to one or more of the customer and identified third parties when the provider's mobile electronic device has passed through point 507*b* en route to the final destination 603.

Figure 7:
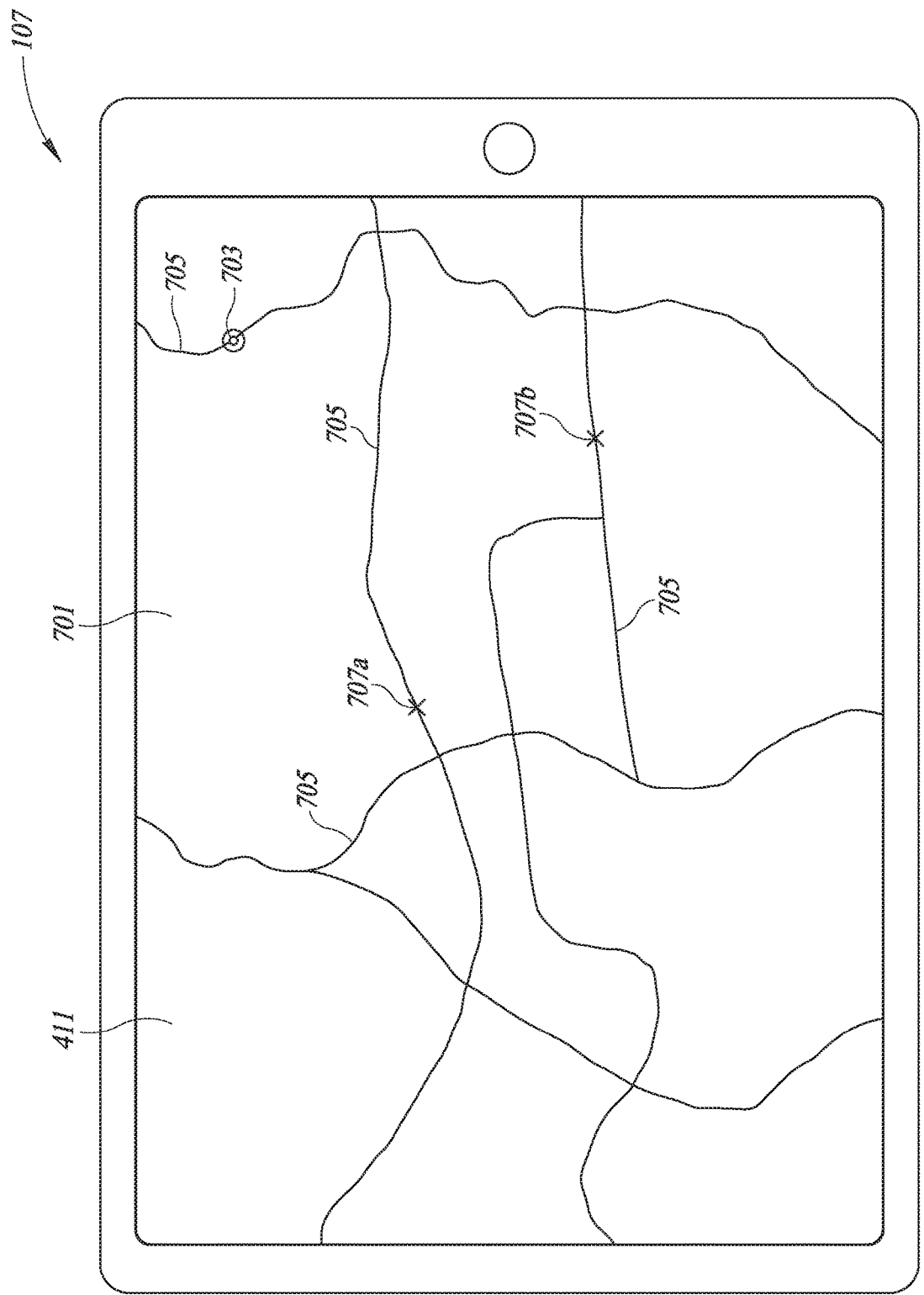
FIG. 7 is a plan view of an electronic device having a display on which navigation information is presented in the form of a first map in which two intermediary destinations are indicated, according to at least one illustrated implementation.

FIGS. 7-10 are plan views of a provider's processor-based device 103 having a display 411 that presents other example of navigation information 113 to the provider. FIG. 7 is a plan view of a provider's processor-based device 103 having a display 411 that presents navigation information 113*a* in the form of a first map 701. The first map 701 includes the current location 703 of the provider's processor-based device 103 along with a plurality of roads 705. As shown in FIG. 7, the first map 701 presents location information 115*a* for a first intermediary destination 707*a* and second intermediary destination 707*b*. The location information 115*a* for the first intermediary destination 707*a* and the second intermediary destination 707*b* may be identified using a specific address or a specific set of coordinates (e.g., latitude and longitude). The first map 701 may be presented to the provider via the display 411 when the provider is initially in transit to provide a service or deliver a good. To receive location information 115 identifying the final destination, the provider's processor-based device 103 may need to reach either the first intermediary destination 707a or the second intermediary destination 707b.

In some implementations, the locations of the intermediary points 707a and/or 707b may be calculated based on one or more geofence boundaries that are not presented to the provider. In such an implementation, the specific location for intermediary point 707a may represent, for example, the closest navigable point on a geofence boundary formed by a circle of a certain radius that is centered on the location for the final destination. The specific location for intermediary point 707b, by contrast, may represent the closest navigable point on a geofence boundary formed according to travel time to the final destination. The determination of the point on one or more geofence boundaries closest to the location of the final destination (e.g., geofence boundaries based on absolute distance, travel time, etc.) may be performed by the backend server(s) 101 or by the mapping application 427 on the provider's processor-based device 103.

Figure 8:
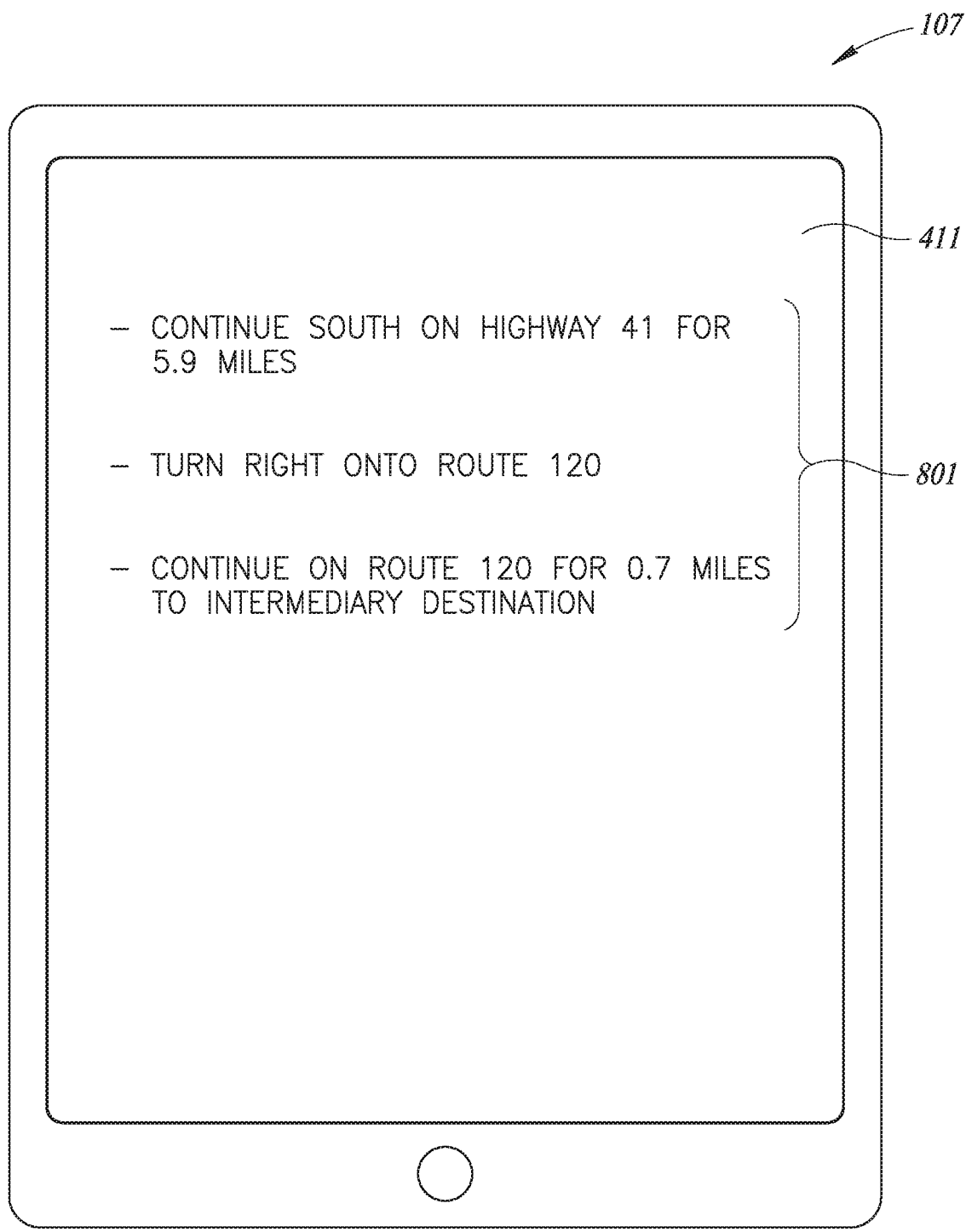
FIG. 8 is a plan view of an electronic device having a display on which navigation information is presented in the form of a set of turn-by-turn directions to one of the intermediary destinations shown in FIG. 7.

FIG. 8 is a plan view of a provider's processor-based device 103 having a display 411 that presents navigation information 113 in the form of a set of turn-by-turn directions 801 from the current location of the provider's processor-based device 103 to the second intermediary destination 707b. The set of turn-by-turn directions 801 is presented on the display 411 of the provider's processor-based device 103.

Figure 9:
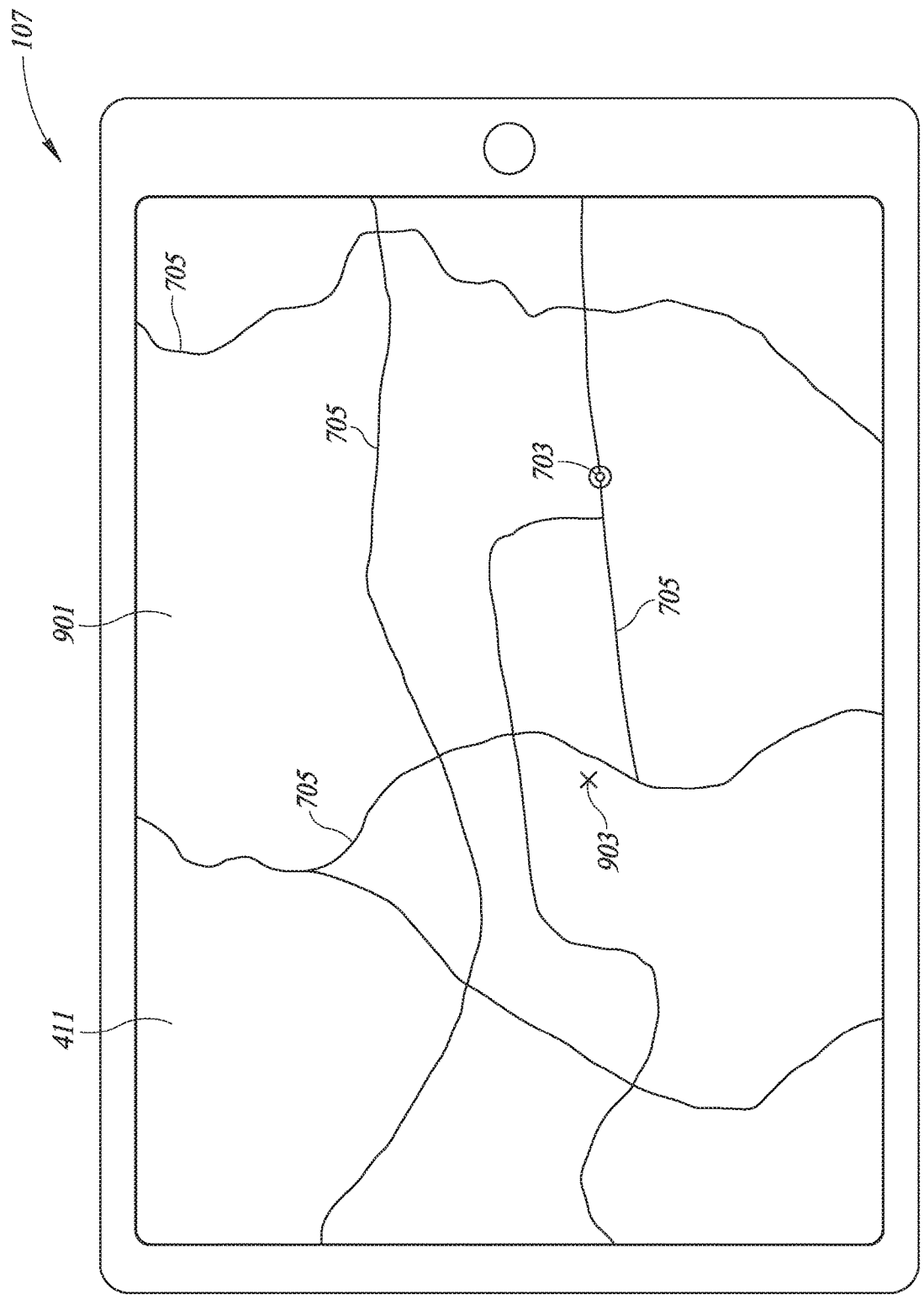
FIG. 9 is a plan view of an electronic device having a display on which navigation information is presented in the form of a second map in which a location for a final destination is presented after the provider has reached one of the intermediary destinations shown in FIG. 7.

FIG. 9 is a plan view of a provider's processor-based device 103 having a display 411 that presents navigation information 113 in the form of a second map 901 after the provider's processor-based device 103 reached the second intermediary destination 707b from FIG. 7. As shown in FIG. 9, the navigation information 113b presented in the second map 901 includes the location information 115b for the final destination 903 at which a requested service is to be rendered or a requested good is to be delivered. As previously noted, the notification application 429 may cause a notification 117 to be sent to one or more processor-based devices 105 associated with the customer and/or one or more processor-based devices 107 associated with identified third parties when the provider's mobile electronic device has passed through point 707b en route to the final destination 903.

Figure 10:
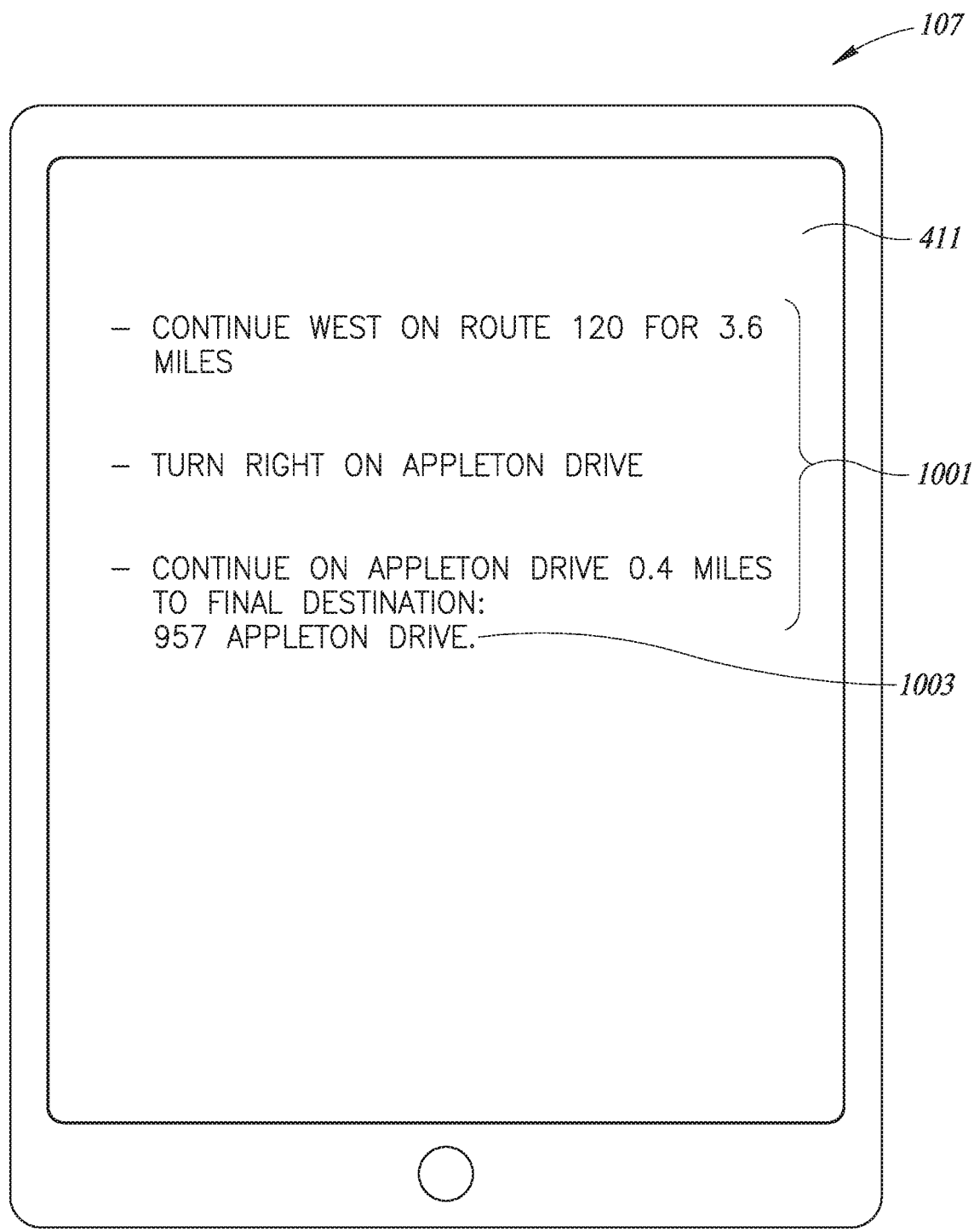
FIG. 10 is a plan view of an electronic device having a display on which navigation information is presented in the form of a set of turn-by-turn directions to the final destination shown in FIG. 9.

FIG. 10 is a plan view of a provider's processor-based device 103 having a display 411 that presents navigation information 113 in the form of a set of turn-by-turn directions 1001 from the current location of the provider's processor-based device 103 to the final destination, and includes the location information for the final destination 903. The set of turn-by-turn directions 1001 is presented on the display 411 of the provider's processor-based device 103. The address 1003 of the final destination may be presented on the display 411 along with the set of turn-by-turn directions 1001.

Figure 11:
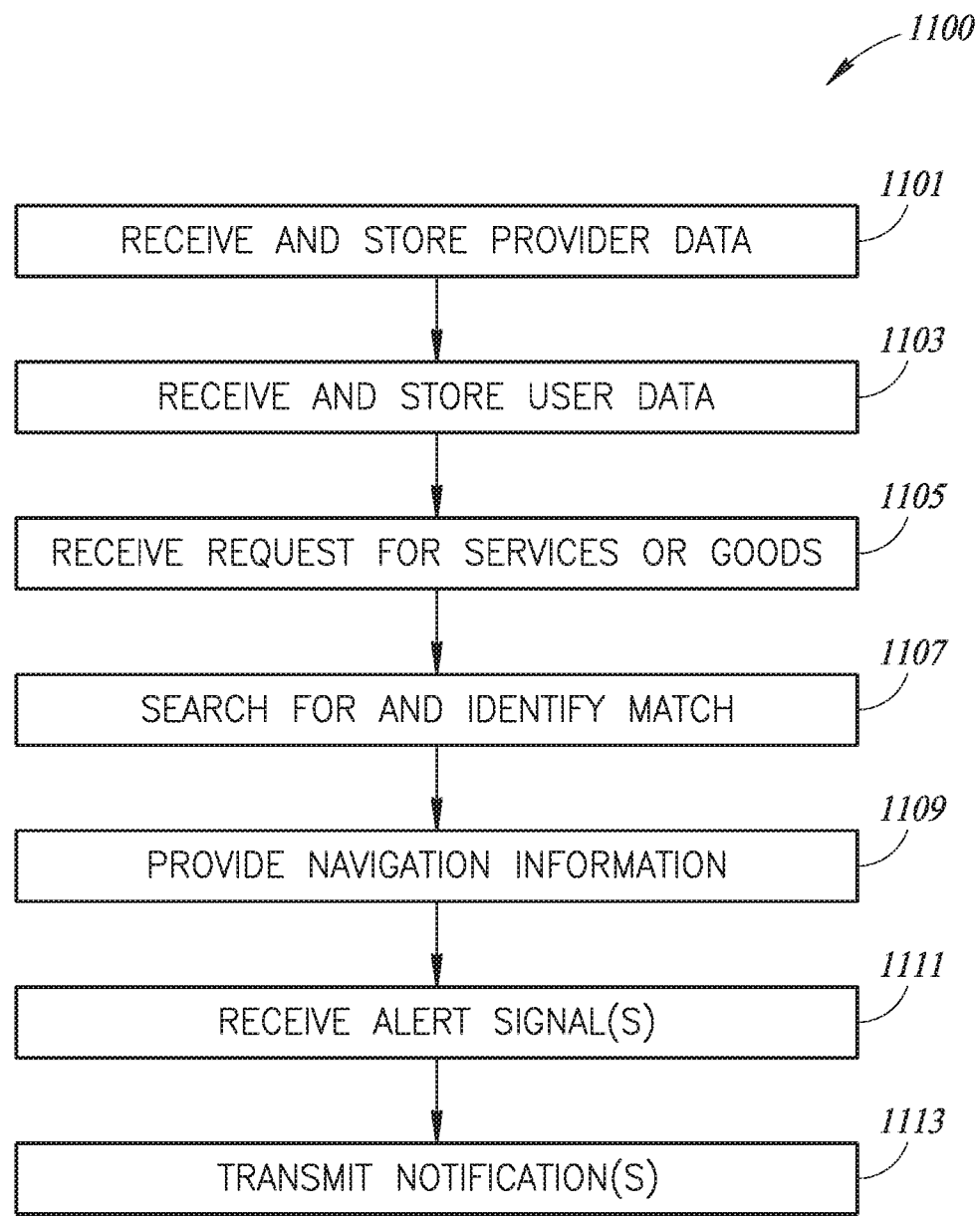
FIG. 11 is a flow diagram that illustrates receiving information related to various providers and customers, matching a request for services or goods, and providing location information to a provider's mobile electronic device, which can use the location information to request and present navigation information via the display of the provider's mobile electronic device, according to at least one illustrated implementation.

FIG. 11 is a flow diagram 1100 that illustrates receiving information related to various providers and customers, matching a request for services or goods, and providing location information 115 to a provider's processor-based device 103, which can use the location information 115 to request and present navigation information 113 via the display 411 of the provider's processor-based device 103, according to at least one illustrated implementation.

At 1101, the backend server(s) 101 receives data and information provided from one or more providers via one or more processor-based devices 103 and stores the received data and information in the provider database 217a. The data and information may be provided by the provider using one or more forms that are presented on the provider's processor-based device 103. Each of the providers may have a separate provider record within the provider database 217a, and the forms presented to the provider may have fields that correspond to the fields within the provider's database record, thus facilitating the entry of the provider's data and information into the provider database 217a.

At 1103, the backend server(s) 101 receives data and information provided from one or more customers via one or more processor-based devices 105 and stores the received data and information in the customer database 217b. The data and information may be provided by the customer using one or more forms that are presented on the customer's processor-based device 105. Each of the customers may have a separate customer record within the customer database 217b, and the forms presented to the customer may have fields that correspond to the fields within the customer's database record, thus facilitating the entry of the customer's data and information into the customer database 217b.

At 1105, the backend server(s) 101 receives a request from a customer via the customer's processor-based device 105 for services or for the delivery of a good.

At 1107, the backend server(s) 101 searches for a match to render the requested service or deliver the requested good to the customer. In some implementations, the backend server(s) 101 may perform a keyword search of the provider database 217a to find potential matches. The backend server(s) 101 may also use additional filters, based, for example, on location or pricing information, to filter the potential matches identified using the keyword search.

In some implementations, the backend server(s) 101 may transmit a list of potential providers based on the searching and filtering operations to the customer's processor-based device 105 for the customer to review. The customer may then choose a provider from the list and transmit, via the customer's processor-based device 105, this choice to the backend server(s) 101. The backend server(s) 101 may then transmit a request for services or goods to the indicated provider's processor-based devices 103. The provider may then accept or decline the request. If the provider accepts the request to provide a service or good, the backend server(s) 101 will consider that a match has been made.

In some implementations, the backend server may use the list of potential providers obtained through the keyword searching and the filtering functions to solicit bids from the identified providers. The backend server(s) 101 may transmit the bids back to the customer's processor-based device for consideration. In such an implementation, the backend server(s) 101 may consider a match to be made when the customer accepts one of the bids provided by the providers.

At 1109, the backend server(s) 101 provides location information 115 to the provider that will be providing the requested service or delivering the requested good. In some implementations, the location information 115 includes both an intermediary destination and a final destination. In some implementations, the location information 115b may include only the final destination. In such an implementation, the provider's processor-based device 103 may calculate the intermediary destination. In some implementations, the backend server(s) 101 may transmit the location information 115a for the intermediary destination to the provider's processor-based device 103 as part of a first communication. The backend server(s) 101 may transmit the location information 115b for the final destination to the provider's processor-based device 103 only after receiving an alert message that the provider's mobile electronic device has reached or passed the intermediary destination.

The provider's processor-based device 103 may use the location information 115 to request navigation information 113 in the form of a first map or first set of turn-by-turn directions that indicates the location 115a of the intermediary destination and in the form of a second map or second set of turn-by-turn directions that indicates the location 115b of the final destination. In some implementations, the intermediary destination may be part of a geofence boundary.

At 1111, the backend server(s) 101 receives one or more alert messages from the provider's processor-based device 103. In some implementations, the alert messages may be transmitted when the provider completes the requested service or delivers the requested good. In some implementations, the alert messages may be received when the provider reaches an intermediary destination, geofence boundary, or other location or boundary when in transit to the final destination. In some implementations, the backend server(s) 101 may receive alert messages after the provider has completed the requested task and traveled a certain distance away from the final destination, such as, for example, the original geofence boundary or intermediary destination.

At 1113, the backend server(s) 101 and/or the provider's processor-based device 103 transmit one or more notifications 117 in response to the alert messages. The notifications 117 may be received by a processor-based device 105 associated with the customer who requested the service or good. In addition, or alternatively, the notifications 117 may be received by one or more processor-based devices 107 associated with third parties identified by the customer, such as the customer's neighbors or relatives, or provider, such as the provider's dispatcher or boss.

Figure 12:
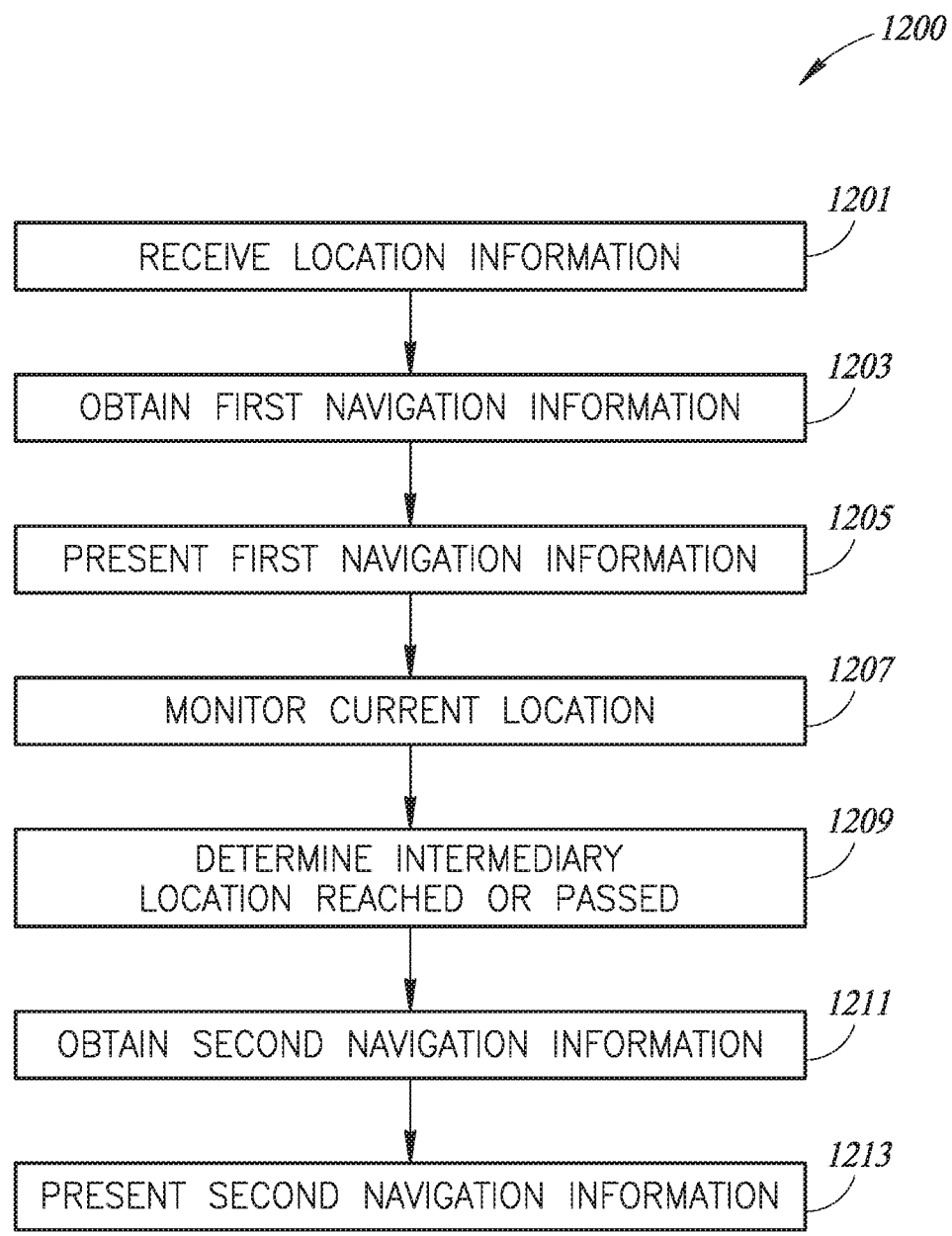
FIG. 12 is a flow diagram that illustrates presenting navigation information on a provider's processor-based device in which location information for an intermediary destination and a final destination are received by the provider's processor-based device concurrently (e.g., at the same time and/or as part of the same packet), according to at least one illustrated implementation.

FIG. 12 is a flow diagram 1200 that illustrates presenting navigation information 113 on a provider's processor-based device 103 in which location information for an intermediary destination and a final destination are received by the provider's processor-based device concurrently (e.g., at the same time, and/or as part of the same packet), according to at least one illustrated implementation.

At 1201, the provider's processor-based device 103 receives location information 115 from the backend server(s) 101 that includes the location information for both the intermediary destination (115a) and the final destination (115b). In some implementations, the location information 115a for the intermediary destination may be in the form of a geofence boundary. In some implementations, the location information 115a for the intermediary destination may be based on the route of the shortest distance or with the shortest travel time between the current location of the provider's processor-based device 103 and the location of the final destination. At least one of or both of the location information for the intermediary destination 115a and the final destination 115b may be transmitted to and stored on the provider's processor-based device 103 in an encrypted format.

At 1203, the provider's processor-based device 103 obtains the first navigation information 113a using the location information 115a of the intermediary destination. The first navigation information 113a may be in the form of a first map and/or a set of turn-by-turn directions. In some implementations, the provider's processor-based device 103 may receive the first navigation data from the backend server(s) 101. In some implementations, the provider's processor-based device 103 may transmit the location information 115a for the intermediary destination to a third party server 109 that provides mapping and directions functionality. The third party server 109 may return in response the first navigation information 113a in the form of data for a map with a highlighted route or a set of turn-by-turn directions from the current location of the provider's processing based device 103 to the intermediary destination.

At 1205, the provider's processor-based device 103 presents via the display 411 the first navigation information 113a in the form of a first map that indicates the location of the intermediary destination along with a highlighted route for traveling from the current location of the provider's processor-based device 103 to the intermediary destination. In addition to, or instead of, the first map, the first navigation information 113a may be presented as a set of directions, such as turn-by-turn directions, to travel from the current location of the provider's processor-based device 103 to the intermediary destination.

At 1207, the provider's processor-based device 103 monitors its current location. The provider's processor-based device 103 may monitor its current location using, for example, the geolocation data provided by the geolocation component 417.

At 1209, the provider's processor-based device 103 determines that it has reached or passed the intermediary destination.

At 1211, the provider's processor-based device 103 obtains the second navigation information 113b that identifies the location of the final destination. The second navigation information 113b may be in the form of a second map and/or set of turn-by-turn directions. In some implementations, the provider's processor-based device 103 may receive the second navigation data 113b from the backend server(s) 101. In some implementations, the provider's processor-based device 103 may transmit the location information 115b for the final destination to a third party server 109 that provides mapping and directions functionality. The third party server 109 may return in response the second navigation information 113b in the form of data for a map with a highlighted route or a set of turn-by-turn directions from the current location of the provider's processing based device 103 to the final destination.

At 1213, the provider's processor-based device 103 presents via the display 411 the second navigation information 113b in the form of a second map that indicates the location of the final destination along with a highlighted route for traveling from the current location of the provider's processor-based device 103 to the final destination. In addition to, or instead of, the second map, the navigation information 113a may be presented in the form of directions, such as turn-by-turn directions, to travel from the current location of the provider's processor-based device 103 to the final destination.

Figure 13:
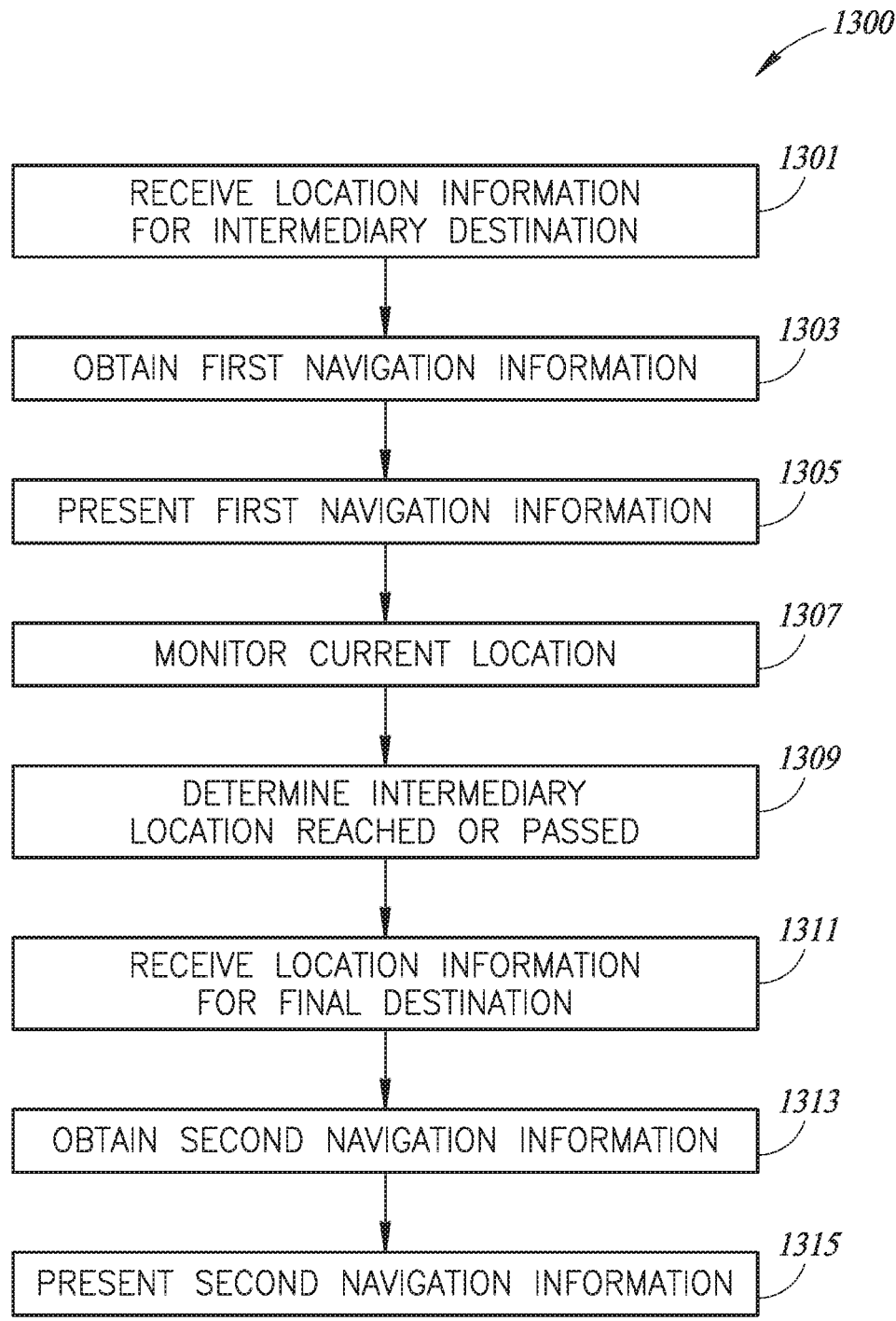
FIG. 13 is a flow diagram that illustrates presenting navigation information on a provider's processor-based device in which location information for an intermediary destination is received by the provider's processor-based device at a first time and location information for a final destination is received at a second time, according to at least one illustrated implementation.

FIG. 13 is a flow diagram 1300 that illustrates presenting navigation information 113 on a provider's processor-based device 103 in which location information for an intermediary destination is received by the provider's processor-based device at a first time, and location information for a final destination is received at a second time, according to at least one illustrated implementation.

At 1301, the provider's processor-based device 103 receives location information 115 from the backend server(s) 101 that includes the location information 115a for only the intermediary destination. In some implementations, the location information 115a for the intermediary destination may be in the form of a geofence boundary. In some implementations, the location information 115a for the intermediary destination may be based on the route of the short distance or with the shortest travel time between the current location of the provider's processor-based device 103 and the location of the final destination. The location information for the intermediary destination 115a may be transmitted to and stored on the provider's processor-based device 103 in an encrypted format.

At 1303, the provider's processor-based device 103 obtains the first navigation information 113a using the location information 115a of the intermediary destination. The first navigation information 113a may be in the form of a first map and/or a set of turn-by-turn directions. In some implementations, the provider's processor-based device 103 may receive the first navigation data from the backend server(s) 101. In some implementations, the provider's processor-based device 103 may transmit the location information 115a for the intermediary destination to a third party server 109 that provides mapping and directions functionality. The third party server 109 may return in response the first navigation information 113a in the form of data for a map with a highlighted route or a set of turn-by-turn directions from the current location of the provider's processing based device 103 to the intermediary destination.

At 1305, the provider's processor-based device 103 presents via the display 411 the first navigation information 113a in the form of a first map that indicates the location of the intermediary destination along with a highlighted route for traveling from the current location of the provider's processor-based device 103 to the intermediary destination. In addition to, or instead of, the first map, the first navigation information 113a may be presented as a set of directions, such as turn-by-turn directions, to travel from the current location of the provider's processor-based device 103 to the intermediary destination.

At 1307, the provider's processor-based device 103 monitors its current location. The provider's processor-based device 103 may monitor its current location using, for example, the geolocation data provided by the geolocation component 417.

At 1309, the provider's processor-based device 103 determines that it has reached or passed the intermediary destination.

At 1311, the provider's processor-based device 103 requests and receives the second location information 115b for the final destination from the backend server(s) 101. In some implementations, the second location information 115b may be transmitted in an encrypted format within the one or more processor-readable memories 419. In such an implementation, the provider's processor-based device 103 may decrypt the second location information 115b.

At 1313, the provider's processor-based device 103 obtains the second navigation information 113b that identifies the location of the final destination. The second navigation information 113b may be in the form of a second map and/or set of turn-by-turn directions. In some implementations, the provider's processor-based device 103 may receive the second navigation data 113b from the backend server(s) 101. In some implementations, the provider's processor-based device 103 may transmit the location information 115b for the final destination to a third party server 109 that provides mapping and directions functionality. The third party server 109 may return in response the second navigation information 113b in the form of data for a map with a highlighted route or a set of turn-by-turn directions from the current location of the provider's processing based device 103 to the final destination.

At 1315, the provider's processor-based device 103 presents via the display 411 the second navigation information 113b in the form of a second map that indicates the location of the final destination along with a highlighted route for traveling from the current location of the provider's processor-based device 103 to the final destination. In addition to, or instead of, the second map, the navigation information 113a may be presented in the form of directions, such as turn-by-turn directions, to travel from the current location of the provider's processor-based device 103 to the final destination.

Figure 14:
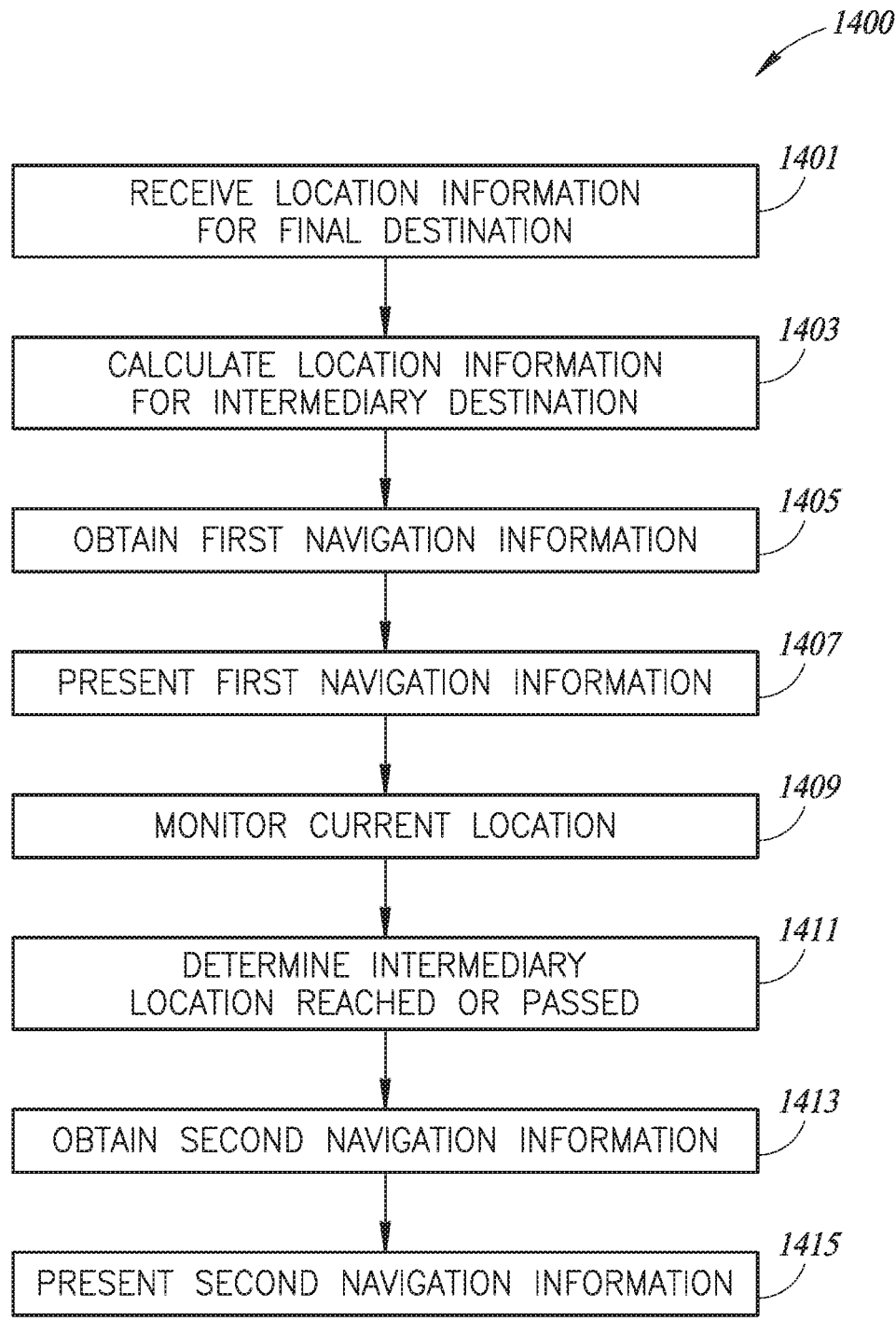
FIG. 14 is a flow diagram that illustrates presenting navigation information on a provider's processor-based device in which the provider's processor-based device determines location information for the intermediary destination based upon received location information for the final destination, according to at least one illustrated implementation.

FIG. 14 is a flow diagram 1400 that illustrates presenting navigation information 113 on a provider's processor-based device 103 in which the provider's processor-based device 103 determines location information 115a for the intermediary destination based upon received location information 115b for the final destination, according to at least one illustrated implementation.

At 1401, the provider's processor-based device 103 receives location information 115 from the backend server(s) 101 that includes only the location information 115b for the final destination.

At 1403, the provider's processor-based device 103 calculates the location information 115a for the intermediary destination based upon the received location information 115b for the final destination. In some implementations, the location information 115a for the intermediary destination may be in the form of a geofence boundary. In some implementations, the location information 115a for the intermediary destination may be based on the route of the short distance or with the shortest travel time between the current location of the provider's processor-based device 103 and the location of the final destination.

At 1405, the provider's processor-based device 103 obtains the first navigation information 113a using the location information 115a of the intermediary destination. The first navigation information 113a may be in the form of a first map and/or a set of turn-by-turn directions. In some implementations, the provider's processor-based device 103 may receive the first navigation data from the backend server(s) 101. In some implementations, the provider's processor-based device 103 may transmit the location information 115a for the intermediary destination to a third party server 109 that provides mapping and directions functionality. The third party server 109 may return in response the first navigation information 113a in the form of data for a map with a highlighted route or a set of turn-by-turn directions from the current location of the provider's processing based device 103 to the intermediary destination.

At 1407, the provider's processor-based device 103 presents via the display 411 the first navigation information 113a in the form of a first map that indicates the location of the intermediary destination along with a highlighted route for traveling from the current location of the provider's processor-based device 103 to the intermediary destination. In addition to, or instead of, the first map, the first navigation information 113a may be presented as a set of directions, such as turn-by-turn directions, to travel from the current location of the provider's processor-based device 103 to the intermediary destination.

At 1409, the provider's processor-based device 103 monitors its current location. The provider's processor-based device 103 may monitor its current location using, for example, the geolocation data provided by the geolocation component 417.

At 1411, the provider's processor-based device 103 determines that it has reached or passed the intermediary destination.

At 1413, the provider's processor-based device 103 obtains the second navigation information 113b that identifies the location of the final destination. The second navigation information 113b may be in the form of a second map and/or set of turn-by-turn directions. In some implementations, the provider's processor-based device 103 may receive the second navigation data 113b from the backend server(s) 101. In some implementations, the provider's processor-based device 103 may transmit the location information 115b for the final destination to a third party server 109 that provides mapping and directions functionality. The third party server 109 may return in response the second navigation information 113b in the form of data for a map with a highlighted route or a set of turn-by-turn directions from the current location of the provider's processing based device 103 to the final destination.

At 1415, the provider's processor-based device 103 presents via the display 411 the second navigation information 113b in the form of a second map that indicates the location of the final destination along with a highlighted route for traveling from the current location of the provider's processor-based device 103 to the final destination. In addition to, or instead of, the second map, the navigation information 113a may be presented in the form of directions, such as turn-by-turn directions, to travel from the current location of the provider's processor-based device 103 to the final destination.

Figure 15:
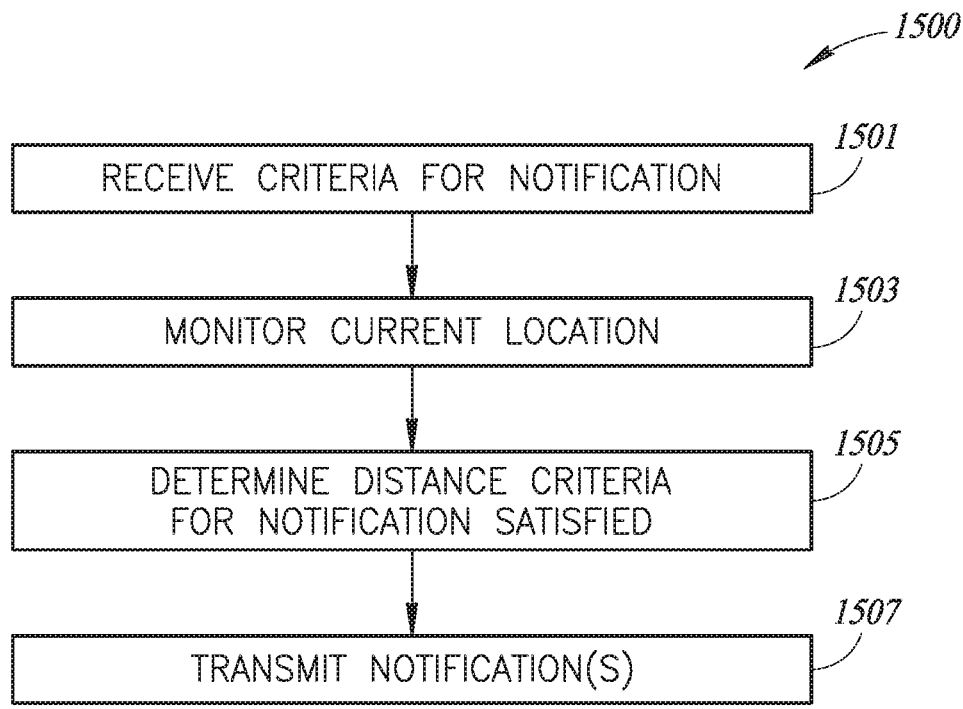
FIG. 15 is a flow diagram that illustrates transmitting one or more notifications from a provider's processor-based device when the provider's processor-based device is within a certain distance from a final destination, according to at least one illustrated implementation.

FIG. 15 is a flow diagram 1500 that illustrates transmitting notifications 117 from the provider's processor-based device 103 when the provider's processor-based device 103 is within a certain distance from the final destination, according to at least one illustrated implementation.

At 1501, the provider's processor-based device 103 receives the criteria for transmitting the notification. Such criteria may be entered, for example, by the customer when the customer submitted the request for the desired services or goods, and may specify the devices and/or addresses that are to receive the requested notification (e.g., the customer's processor-based device 105 and or a third party's processor-based device 107). Such criteria may specify that a notification is to be transmitted when the provider's processor-based device 103 is within a certain distance of the final destination. In some implementations, for example, the criteria may specify that a notification is to be transmitted when the provider's processor-based device 105 has reached or passed the intermediary destination in transit to the final destination. In some implementations, the criteria may specify that a notification is to be transmitted when the provider's processor-based device 105 has reached the final destination. In some implementations, the criteria may specify that a notification is to be transmitted when the provider's processor-based device 103 and the customer's processor-based device 105 are within a certain distance or proximity to each other (e.g., when the device 103, 105 can communicate using short-range communication protocols).

At 1503, the provider's processor-based device 103 monitors its current location. The provider's processor-based device 103 may monitor its current location using, for example, the geolocation data provided by the geolocation component 417.

At 1505, the provider's processor-based device 103 determines that it has reached or passed the specified destination.

At 1507, the provider's processor-based device 103 transmits one or more notifications 117 to the devices and/or addresses indicated by the received criteria.

Figure 16:
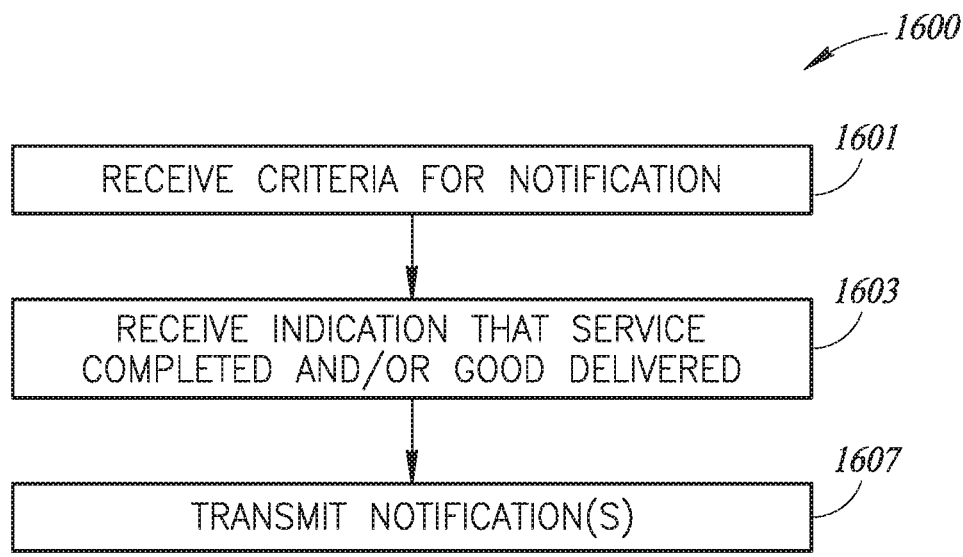
FIG. 16 is a flow diagram that illustrates transmitting one or more notifications from the provider's processor-based device when the provider's processor-based device receives an indication that the provider has completed a requested service or delivered a requested good, according to at least one illustrated implementation.

FIG. 16 is a flow diagram 1600 that illustrates transmitting notifications 117 from the provider's processor-based device 103 when the provider's processor-based device 103 receives an indication that the provider has completed a requested service or delivered a requested good, according to at least one illustrated implementation.

At 1601, the provider's processor-based device 103 receives the criteria for transmitting the notification. Such criteria may be entered, for example, by the customer when the customer submitted the request for the desired services or goods, and may specify the devices and/or addresses that are to receive the requested notification (e.g., the customer's processor-based device 105 and or a third party's processor-based device 107). Such criteria may specify that a notification is to be transmitted when the provider indicates, via the provider's processor-based device 103, that the provider has completed the requested service and/or delivered the requested good.

At 1603, the provider indicates, via the provider's processor-based device 103, that a requested service has been completed or a requested good delivered. Such indication may be provided, for example, via an HTML form in which the provider can check a box when a requested task has been completed.

At 1607, the provider's processor-based device 103 transmits one or more notification 117 to the devices and/or addresses indicated by the received criteria.

Figure 17:
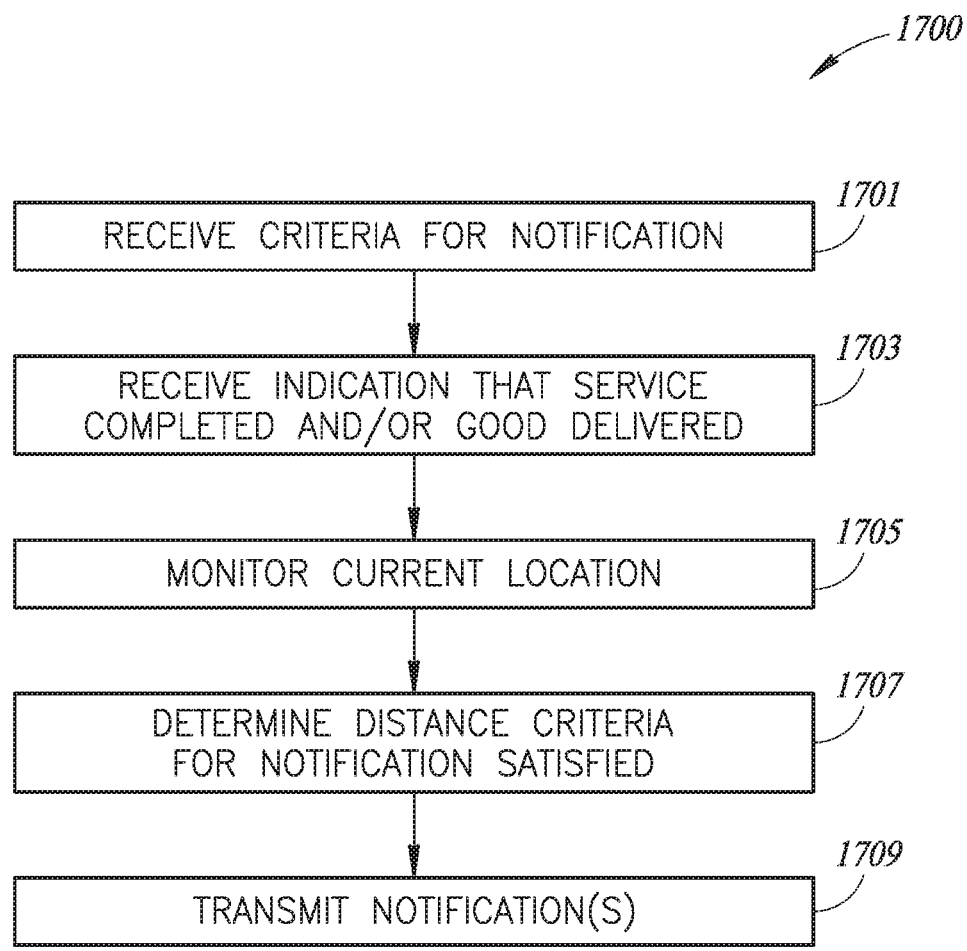
FIG. 17 is a flow diagram that illustrates transmitting one or more notifications from the provider's processor-based device when the provider's processor-based device receives a first indication that the provider has completed a requested service or delivered a requested good and a second indication that the provider's processor-based device has traveled a specified distance away from the final destination, according to at least one illustrated implementation.

FIG. 17 is a flow diagram 1700 that illustrates transmitting one or more notifications 117 from the provider's processor-based device 103 when the provider's processor-based device 103 receives a first indication that the provider has completed a requested service or delivered a requested good and a second indication that the provider's processor-based device 103 has traveled a specified distance away from the final destination, according to at least one illustrated implementation.

At 1701, the provider's processor-based device 103 receives the criteria for transmitting the notification. Such criteria may be entered, for example, by the customer when the customer submitted the request for the desired services or goods, and may specify the devices and/or addresses that are to receive the requested notification (e.g., the customer's processor-based device 105 and or a third party's processor-based device 107). Such criteria may specify that a notification is to be transmitted when the provider indicates, via the provider's processor-based device 103, both that the provider has completed the requested service and/or delivered the requested good, and the provider's processor-based device 103 has traveled a certain distance away from the final destination. In some implementations, for example, the criteria may specify that a notification is to be transmitted after receiving notifications that the provider has completed a requested task and that the provider's processor-based device has reached or passed the intermediary destination going away from the final destination.

At 1703, the provider indicates, via the provider's processor-based device 103, that a requested service has been completed or a requested good delivered. Such indication may be provided, for example, via an HTML form in which the provider can check a box when a requested task has been completed.

At 1705, the provider's processor-based device 103 monitors its current location. The provider's processor-based device 103 may monitor its current location using, for example, the geolocation data provided by the geolocation component 417.

At 1707, the provider's processor-based device 103 determines that it has reached or passed the specified location or distance away from the final destination.

At 1709, the provider's processor-based device 103 transmits one or more notification 117 to the devices and/or addresses indicated by the received criteria.

Figure 18:
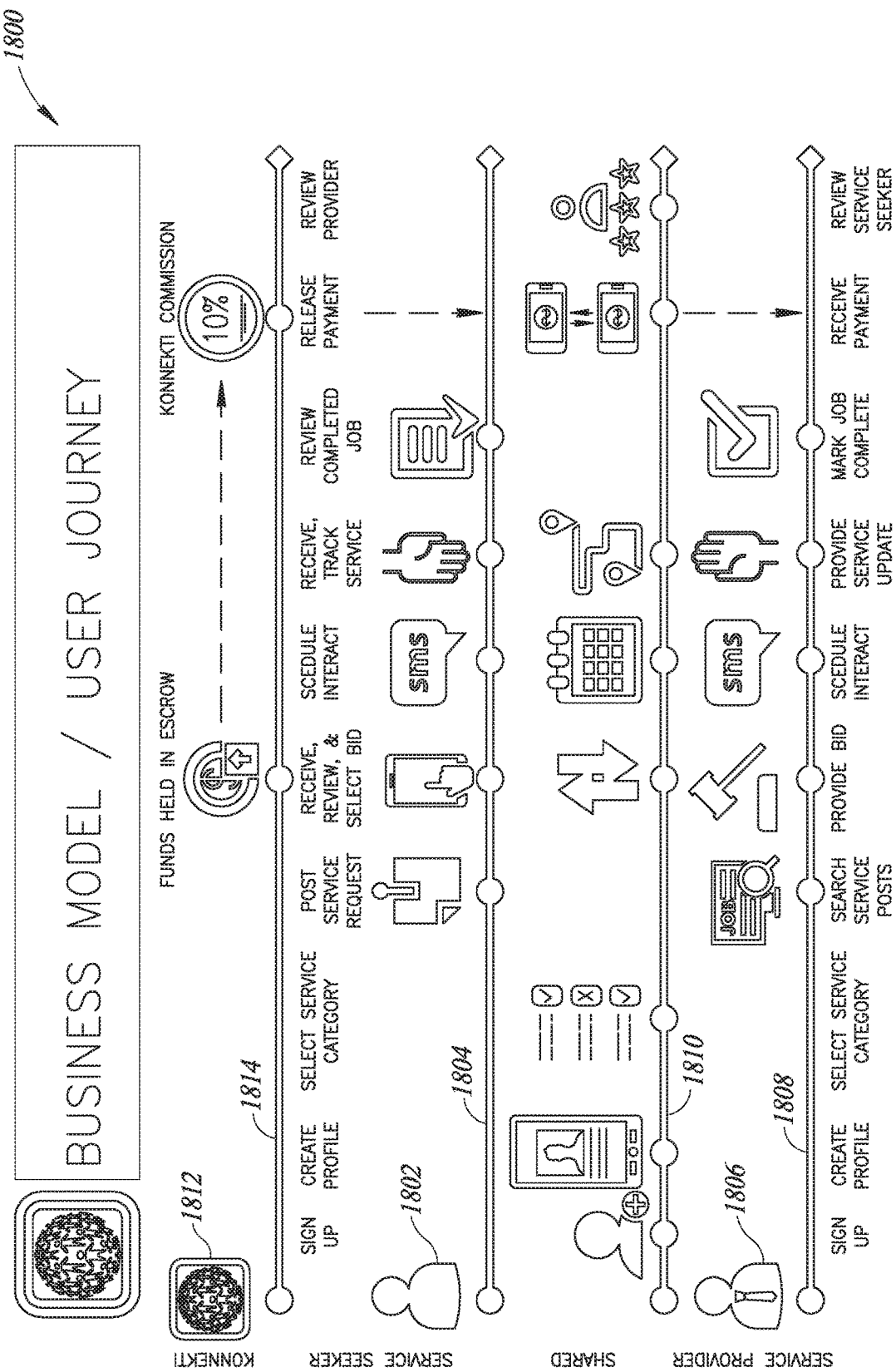
FIG. 18 is a flow diagram of a business model that can be implemented using the various structures and algorithms described herein.

FIG. 18 shows a business model 1800 that can be implemented using the various structures and algorithms described herein.

In particular, FIG. 18 shows a service seeker 1802 and an associated service seeker workflow 1804. FIG. 18 also shows a service provider 1806 and an associated service provider workflow 1808. FIG. 18 further shows a shared workflow 1810 that is shared between the service seeker(s) 1802 and service provider(s) 1806. FIG. 18 additionally shows a backend server 1812 which can be operated by, or on behalf of, an entity that provides the services that connect the service seekers with the service providers, along with an backend workflow 1814. The workflows 1804, 1808, 1810, 1814 can be implemented using various processor-based devices 103, 105, 107 (FIGS. 1A-1F), backend server 1812, 101 (FIGS. 1A-1F) and, or, third party server 109 (FIGS. 1A-1F) as described herein.

EXAMPLE USE CASE(S)

User's Story I:

As a consumer, I want to be able to have a provider agree to fulfill my requested service without me having to share all of my personal information.

As a consumer, I want to be able to have a provider agree to fulfill my requested service and I want to share only my approximate geographical information.

As a consumer, I want to be able to have a provider agree to fulfill my requested service and I want to be able to quickly create geofence boundaries around a specific area of the service address and or my mobile communications device.

As a consumer, I want to be able to receive notification once my provider crosses the geofence boundaries I set around my specific area of service address and or my mobile communications device.

As a consumer, I want to be able to create a network of contacts (e.g., friends and family) who will be notified simultaneously once my provider crosses the geofence boundaries I set around my specific area of service address and or my mobile communications device.

As a consumer, I want to be able to release the service location to the provider once the provider crosses the geofence boundaries I set around my specific area of service address and or my mobile communications device.

As a consumer, I want to be notified via an alert signal transmitted to my mobile communications device, for example transmitted from the provider's mobile communications device, once my provider arrives at the service site and uses their mobile application to indicate they have started providing the requested services.

As a consumer, I want to be notified via an alert signal transmitted from the provider's mobile communications device to my mobile communications device once my provider leaves the service site and uses their mobile communications device to indicate they have completed the requested services.

As a consumer, I want to be able to create a network of contacts (friends and family) who will be notified simultaneously once my provider leaves the service site and uses their mobile communications device to indicate they have completed the requested services.

Service Provider's Story:

As an independent/freelance provider, I want to have a clearinghouse, where I can provide all of my business information including my home address, phone number, resume, certificates and accreditation, driver's license, my country of citizenship, my work authorization, as a verification without having to share all of the said information with my customer.

As an independent/freelance provider, I want to have a platform that gives me the option of deciding what information I share and with whom I share that information, e.g., I want the option to share everything and the option to share nothing but my user name.

As an independent/freelance provider, I want to be able to fulfill a service request without having to share all of my personal information with the customer to include my home address, phone number, etc.

As a service provider, I want to be able to create a network of contacts (coworkers, friends and family) who will be notified simultaneously regarding my work to include service site address, username, my GPS location etc.

As a business owner, I want to bid and win a job and be able to delegate that job to a subordinate employee over a network using my mobile device. I want to be able to track that employee's activity/progress using the same device.

System and method of optimizing the scheduling of services within Web and mobile-based marketplace for consumer and commercial services:

When a consumer accepts a service provider's bid for a service to be completed at a designated geographical location, date, and time (remote services are outside of scope), both the consumer and the service provider receive an immediate prompt from the computer program (e.g., Konnekti application) to share details regarding the service with a network of contacts to promote transparency and safety. When a contact is selected from the network (contacts list), the contract receives a notification on their device (e.g., mobile communications device, such as a smartphone, tablet computer) stating, for example:

Jane would like to share a service with you! Feb. 6, 2017 @ 8 am 2621 2nd Ave., Seattle, Wash. 98121

Would you like to add it to your calendar?

When the contact selects yes to the above prompt, a calendar item is automatically added to the contact's calendar, with a reminder on the day of the service. The contact's calendar may be hosted on the contact's mobile communications device, a desktop computer, or even in a remote computer (e.g., "in the cloud"). To ensure safety, the consumer can mask service location so that the service provider is not able to view the address where the service is to be performed until the service provider is en route to the service address, and enters within a 1 mile radius of the service address. Various parameters, for example the radius or perimeter of the geofence, can be customized by the consumer. The service provider is able to use the same technology to make the same type of notification that could be shared with a network. For example:

John would like to share a service with you! Feb. 6, 2017 @ 8 am 2621 2nd Ave., Seattle, Wash. 98121

Would you like to add it to your calendar?

Once the service provider crosses within the geofence area, the system transmits a notification to the consumer and the selected network of contacts. Once the work has been completed, the combination of (1) the service provider marking the work complete in the application, and (2) the service provider crossing out of the geofenced area (e.g., 1 mile radius of the service address) will trigger the computer program (Konnekti application) to transmit another notification to the consumer and the selected network of contacts to notify them that the work has been completed and the provider has left the on-site location.

User's Story II—Security and Control:

As a facility administrator, I want to be able to be able to prepare a comprehensive staffing analysis and plan to meet supervision needs of, for example, prisoners, wards, patients, students. Such may be implemented on a mobile communications devices, tablet computer, laptop computer, desktop or personal computer, of via Web services provided by a remote computer system.

I want to be able to track staff movement in a facility, for example, via tracking the location of mobile communications devices associated with respective staff members. Such may be implemented locally on the respective mobile communications devices, or remotely from the mobile communications device, for example at a hub computer system that receives location specifying information from each of a plurality of mobile communications device, either via an dedicated application or Web services. The hub computer system may be located at the surveilled facility or remote from the surveilled facility.

I want to be able to use my mobile communications device (e.g., smartphone, tablet computer, wearable augmented reality headset) along with mobile communications devices issued to staff to continuously monitor staffing needs. Such can be used as, for example, a prison staff control center. Such may be implemented locally on the respective mobile communications devices, or remotely from the mobile communications device, for example at a hub computer system that receives information from each of a plurality of mobile communications device, either via a dedicated application or Web services. The hub computer system may be located at the surveilled facility or remote from the surveilled facility.

I want the information from the mobile communications device to be used to continually log movement, incidents, and be able to produce a post log shift report of all such movements. Such may be implemented locally on the respective mobile communications devices, or remotely from the mobile communications device, for example at a hub computer system that receives information from each of a plurality of mobile communications device, either via a dedicated application or Web services. The hub computer system may be located at the surveilled facility or remote from the surveilled facility.

To improve safety, security, and ensure good order, including the safety, health, and well/being of staff and detainees, or patients in a hospital setting, I want the mobile communications device to be used to log interactions and personal contact during routine rounds and bed checks. Such may be implemented locally on the respective mobile communications devices, or remotely from the mobile communications device, for example at a hub computer system that receives information from each of a plurality of mobile communications device, either via a dedicated application or Web services. The hub computer system may be located at the surveilled facility or remote from the surveilled facility.

I want to be able to use a mobile communications device to enhance and document occupied and unoccupied areas. Such may be implemented locally on the respective mobile communications devices, or remotely from the mobile communications device, for example at a hub computer system that receives information from each of a plurality of mobile communications device, either via a dedicated application or Web services. The hub computer system may be located at the surveilled facility or remote from the surveilled facility.

User's Story III—Re-Posting:

As a consumer, I want to be able to make the same or similar requests on a repeated basis. Such may be implemented locally on the respective mobile communications devices, or remotely from the mobile communications device, for example at a hub computer system that receives information from each of a plurality of mobile communications device, either via a dedicated application or Web services. The hub computer system may be located at the surveilled facility or remote from the surveilled facility. In particular, a defined number of previous requests may be stored or cached, and recalled, for example in response to a consumer searching for a provider of a particular type of service.

I want to be able to access previous posts. Such may be implemented locally on the respective mobile communications devices, or remotely from the mobile communications device, for example at a hub computer system that receives information from each of a plurality of mobile communications device, either via an dedicated application or Web services. The hub computer system may be located at the surveilled facility or remote from the surveilled facility. In particular, a defined number of previous requests may be stored or cached, and recalled, for example in response to a consumer searching for a provider of a particular type of service.

I want to be able to easily re-post a previous request. Such may be implemented locally on the respective mobile communications devices, for example saving previous requests in a file or cache, which can be selectively accessed, or automatically accessed, for instance when a consumer starts to type a request for services. Alternatively, such may be implemented remotely from the mobile communications device, for example at a hub computer system that receives information from each of a plurality of mobile communications device, either via a dedicated application or Web services. The hub computer system may be located at the surveilled facility or remote from the surveilled facility. In particular, a defined number of previous requests may be stored or cached, and recalled, for example in response to a consumer searching for a provider of a particular type of service.

I want to be able to edit a previous post, if needed, before submitting the post. Such may be implemented locally on the respective mobile communications devices, for example generating new requests based on previous requests saved in a file or cache, and allowing editing of the new requests prior to posting the same. As previously noted, the saved previous requests can be selectively accessed, or automatically accessed, for instance when a consumer starts to type a request for services. Alternatively, such may be implemented remotely from the mobile communications device, for example at a hub computer system that receives information from each of a plurality of mobile communications device, either via a dedicated application or Web services.

I want to be able to manage repeated posts (i.e. every other Monday; every month; etc.). Such may be implemented locally on the respective mobile communications devices, for example with a saved workflow or new request that is generated based on a saved workflow at a specified time (e.g., defined date, defined day and/or time of the week, defined period of time for instance daily, weekly, monthly, quarterly, yearly, every 3 days, every 14 days, every 90 days). For instance, a new request may be generated and ready to post based on previous requests which may be saved in a file or cache. The new request may be automatically generated in response of the occurrence of an event, for example occurrence of defined time or period. Such can include comparing a specified time to a real time (e.g., real world calendar) or by determining whether a specified period has passed since a previous such request. Alternatively, such may be implemented remotely from the mobile communications device, for example at a hub computer system that receives information from each of a plurality of mobile communications device, either via a dedicated application or Web services.

I want to be able to edit the cadence of a repeated post. Such may be implemented locally on the respective mobile communications devices, for example with a saved workflow or new request that is generated based on a saved workflow at a specified time (e.g., defined date, defined day and/or time of the week, defined period of time for instance daily, weekly, monthly, quarterly, yearly, every 3 days, every 14 days, every 90 days). For instance, a previously saved workflow or specified time may be modifiable by the consumer to specify a revised workflow or revised specified time based on workflows or times that were previously specified and saved in a file or cache. The new or revised workflows or times may be automatically saved, and used to trigger generation of new or repeated requests. Alternatively, such may be implemented remotely from the mobile communications device, for example at a hub computer system that receives information from each of a plurality of mobile communications device, either via an dedicated application or Web services.

User's Story IV—Favorite Providers:

As a consumer or service provider, I want to be able to designate another consumer or service provider listed on the system as a favorite. Such may be implemented locally on the respective mobile communications devices, or remotely from the mobile communications device, for example at a hub computer system that receives information from each of a plurality of mobile communications device, either via a dedicated application or Web services. The hub computer system may be located at the surveilled facility or remote from the surveilled facility. A corresponding record that represents a consumer or a service provider may have a field or flag that designates such as a favorite. The field or flag may be set in response to a consumer identifying a service provider as a favorite (e.g., service providers who are easy to work with, who are organized, who are prompt), for instance via a user input. The field or flag may be set in response to a service provider identifying a consumer as a favorite (e.g., consumers who are easy to work with, who are organized, who are prompt), for instance via a user input. The fields or flags may be saved with the corresponding records, for example in one or more nontransitory computer- or processor-readable media, for instance computer memory or computer storage (e.g., hard disks or HDDs, optical disk or CD-ROM, Flash memory, solid state storage devices or SSDs).

I want my favorite users to show up first in future searches. When preparing a request or receiving a request, the system may initially search for records identified as favorites. The search for records may be autonomous, as soon as the user starts to prepare a request or review requests. The system may, for example search fields or flags of records stored in memory, the records associated with respective consumers and/or service providers. The system may display information associated with only those records identified as favorites. Alternatively, the system may rank the identified consumers or service providers, placing those that have been identified as favorites higher in the ranking than those not identified as favorites. In this way, each consumer can initially access the information from that specific consumer's favorite service providers (e.g., service providers who are easy to work with, who are organized, who are prompt). Likewise, each service provider can initially access the information from that service provider's favorite consumers (e.g., consumers who are easy to work with, who are organized, who are prompt).

I want to be able to access my list of favorite users. In response to a user input, the system may search for all records for fields or flags that identify the corresponding consumer or service provider as a favorite of the user that is searching. Such may be implemented locally on the respective mobile communications devices, or remotely from the mobile communications device, for example at a hub computer system that receives information from each of a plurality of mobile communications device, either via a dedicated application or Web services.

I don't want the user to be notified that he or she was designated a favorite (i.e., "favorited"). The system may limit access to the information specifying whether any given consumer or service provider is a favorite of a user. For example, the system may limit queries for favorites to favorite information specified only by the particular user performing the query, for instance as specified by a user account, which is passcode protected.

FIGS. 19A through 19E show a display 1900 of an electronic device 1902 on which different information is rendered via a mobile auction management platform, according to at least one illustrated implementation. The mobile auction management platform may provide a virtual place for buyers and sellers of services to congregate and exchange bids for receiving and providing services. In some implementations, the electronic device 1902 may execute an in-app messaging capability as part of the mobile auction management platform in which the in-app messaging capability provides users and service providers with the ability to communicate with each other. The mobile auction management platform may be used for group communication between users and service providers, such as, for example, through postings of offerings, requests for proposals that solicit proposals, and through a bidding process, by an individual or business interested in procuring or providing a service or valuable asset, or to travel to potential customers.

The displays 1900 may be used as part of the mobile auction management platform to provide group communications, such as through postings of offerings (FIG. 19A), requests for proposals that solicit one or more proposals (FIG. 19B), and bidding on providing a service or valuable asset. The in-app messaging capability may enable group chat between users (e.g., service seekers) and service providers. The in-app messaging capability may be used to port in bids and proposals from a variety of service providers for variety of services, making it easier for users to request multiple proposals for multiple types of services simultaneously, review those proposals, and accept those bids and offers for services, and to have conversations regarding multiple services with multiple providers in a variety of categories of services.

Figure 19A:
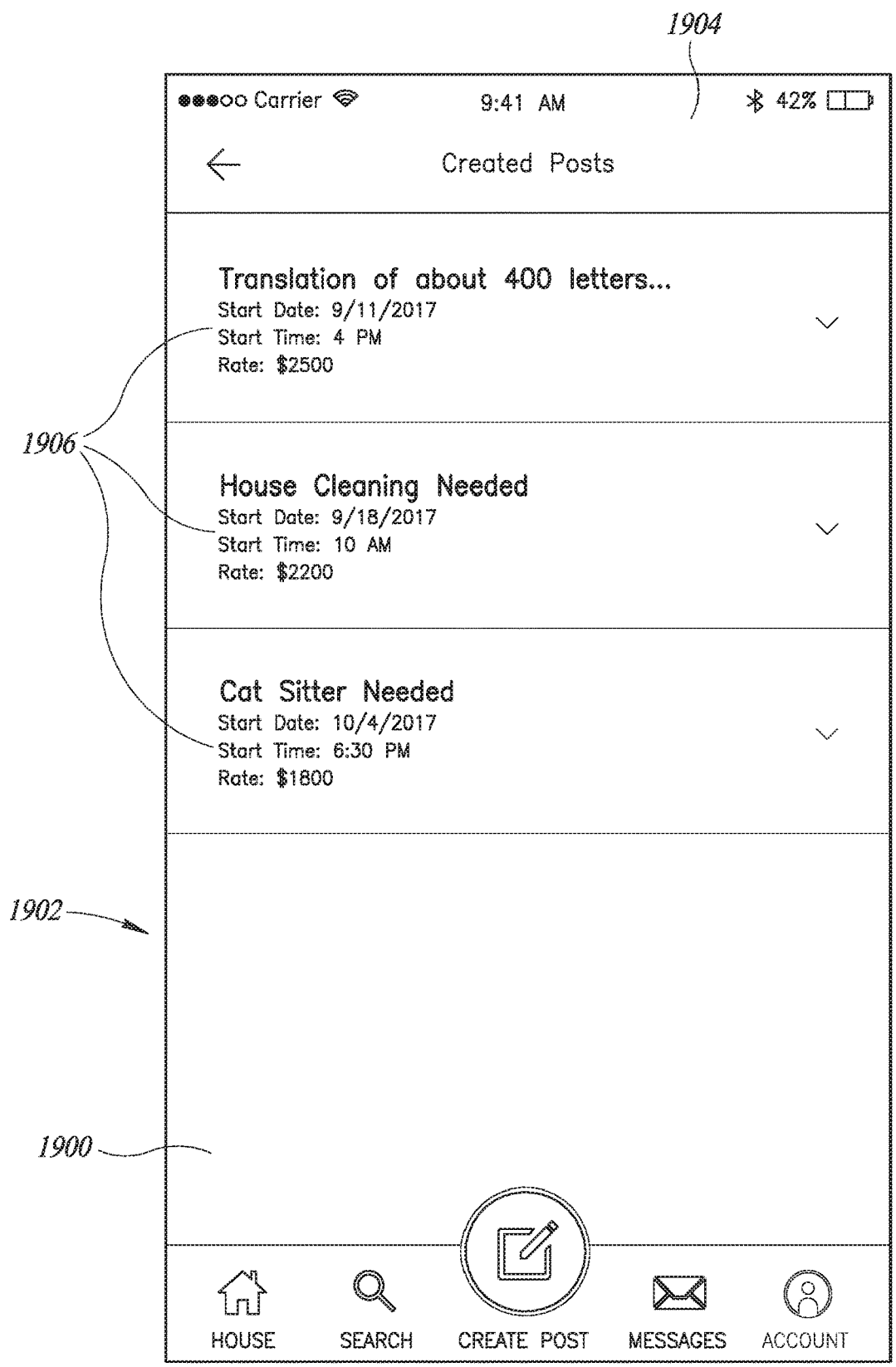
FIG. 19A is a plan view of an electronic device having a display on which a post page is rendered for a user, in which the post page lists the various posts that the user has placed for services, according to at least one illustrated implementation.

FIG. 19A shows a post page 1904 as rendered on the display 1900. From the post page 1904, the user may review services characteristics regarding post(s) 1906 that the user has placed for service and/or review services performed. As shown in FIG. 19A, the user has placed three posts 1906 of services to be provided, one post for a translation of letters, a second post for house cleaning, and a third post for a cat sitter. Such posts are exemplary, and the post page 1904 may be used to display information regarding any type of service that has been requested by the user. Such posts may be stored locally on the electronic device 1902 and/or on a remote device, such as a remote server. In some implementations, the posts 1906 may be associated with account information belonging to the user. In such an implementation, the posts 1906 may be retrieved from the remote device and stored on the electronic device 1902 when the user logs into an associated user account from the electronic device 1902. In some implementations, the user can view the chronology of the services performed or requested.

From the post page 1904, the user can enter information to create a post for a service for an auction using, for example, a fill form into which the user may provide the characteristics of the desired service. Once the auction post is accepted by the system, the post may be listed in the post page so that service providers may place a bid to complete those services.

Figure 19B:
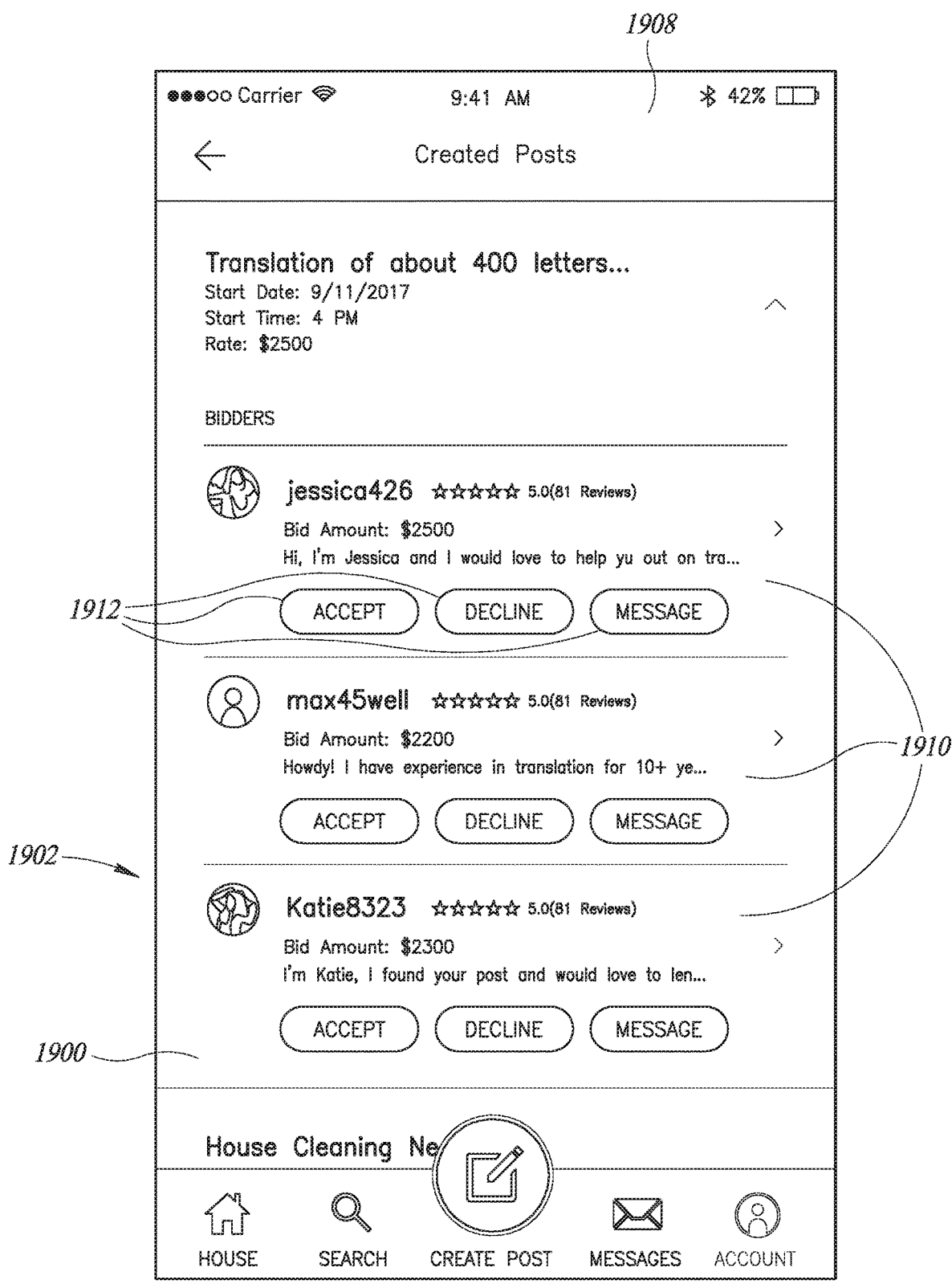
FIG. 19B is a plan view of an electronic device having a display on which a bid page is rendered for a user, in which one or more bids associated with a service that the user has posted for auction are displayed, according to at least one illustrated implementation.

FIG. 19B shows a bid page 1908 in which the user may view one or more bids 1910 that have been submitted by service providers to provide a service posted by the user. Each bid 1910 may include information regarding the service provider (e.g., name, location, rating), as well as a field in which the service provide may leave a personalized message. Each bid 1910 may include one or more action buttons 1912 that may be related to the displayed bids 1910. For example, the action buttons 1912 for at least one bid 1910 may include a button by which the user can accept the associated bid 1910, an action button 1912 by which the user can decline the associated bid 1910, and an action button 1912 by which the user can send a message to the associated service provider.

Figure 19C:
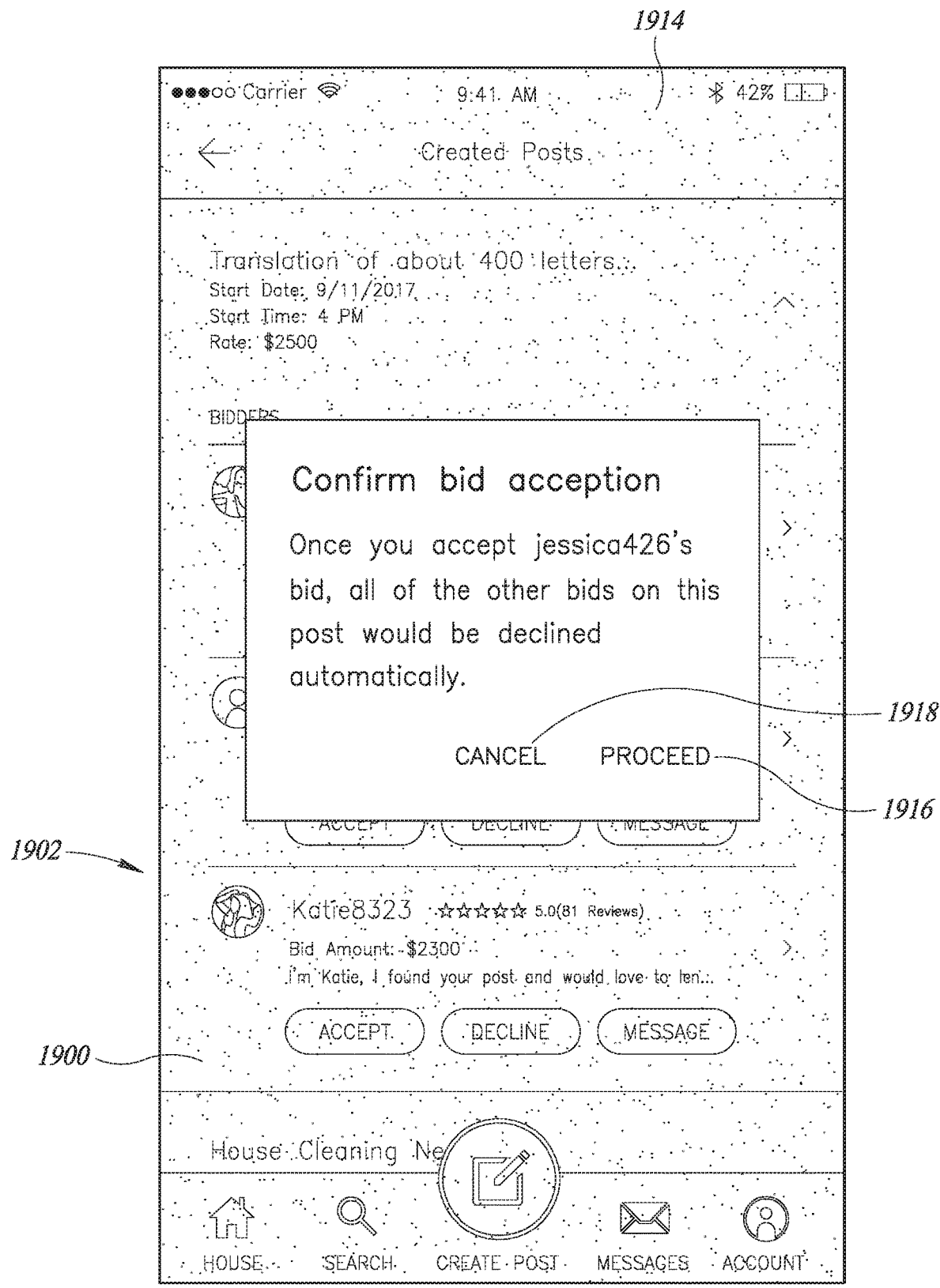
FIG. 19C is a plan view of an electronic device having a display on which a confirmation page is rendered for a user during an auction process, in which user has accepted a bid for services made during the auction process, according to at least one illustrated implementation.

FIG. 19C shows a confirmation page 1914 in which the user is prompted to confirm the acceptance of one of the bids for performing a requested service. The confirmation page 1914 may include a "Proceed" button 1916 to confirm the acceptance of the selected bid, and a "Cancel" button 1918 to cancel acceptance of the selected bid. Upon selection of the "Proceed" button 1916, the remaining bids 1910 may be automatically declined. In such a situation, an appropriate message may be transmitted to the service providers whose bids have been declined. An acceptance message may be transmitted to the service provider whose bid was accepted.

Figure 19D:
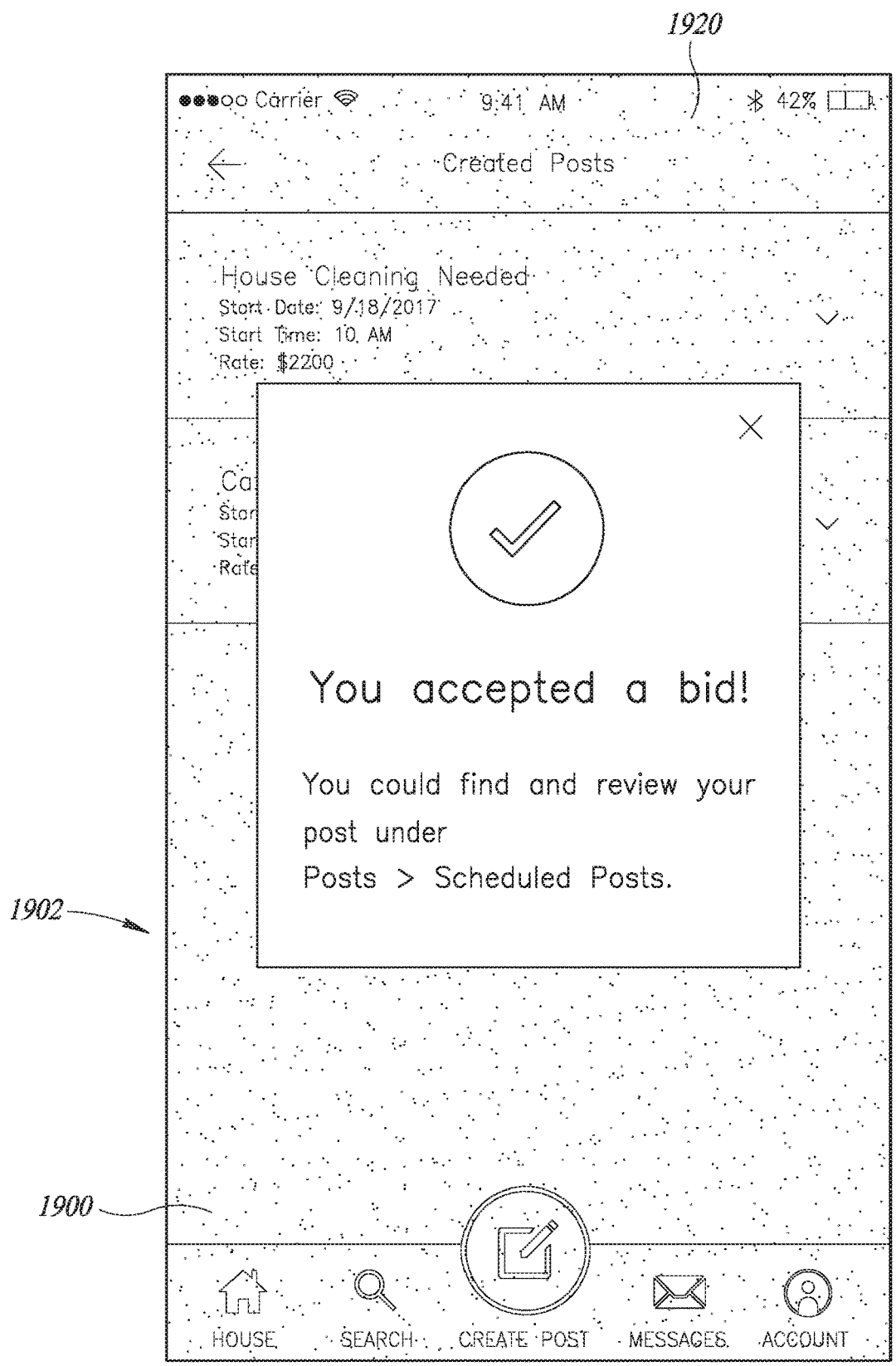
FIG. 19D is a plan view of an electronic device having a display on which an accepted page is rendered for a user during the auction process, according to at least one illustrated implementation.

FIG. 19D shows an accepted page 1920 that may be rendered upon the display 1900 when one of the bids 1910 has been selected and confirmed via the confirmation page 1914. As a result of confirming the accepted bid, the accepted bid may be listed within the post page 1904. In some implementations, the listing for the accepted bid may include a link that may be used to access additional information regarding the accepted bid (e.g., service provider, service provider location, accepted bid price).

Figure 19E:
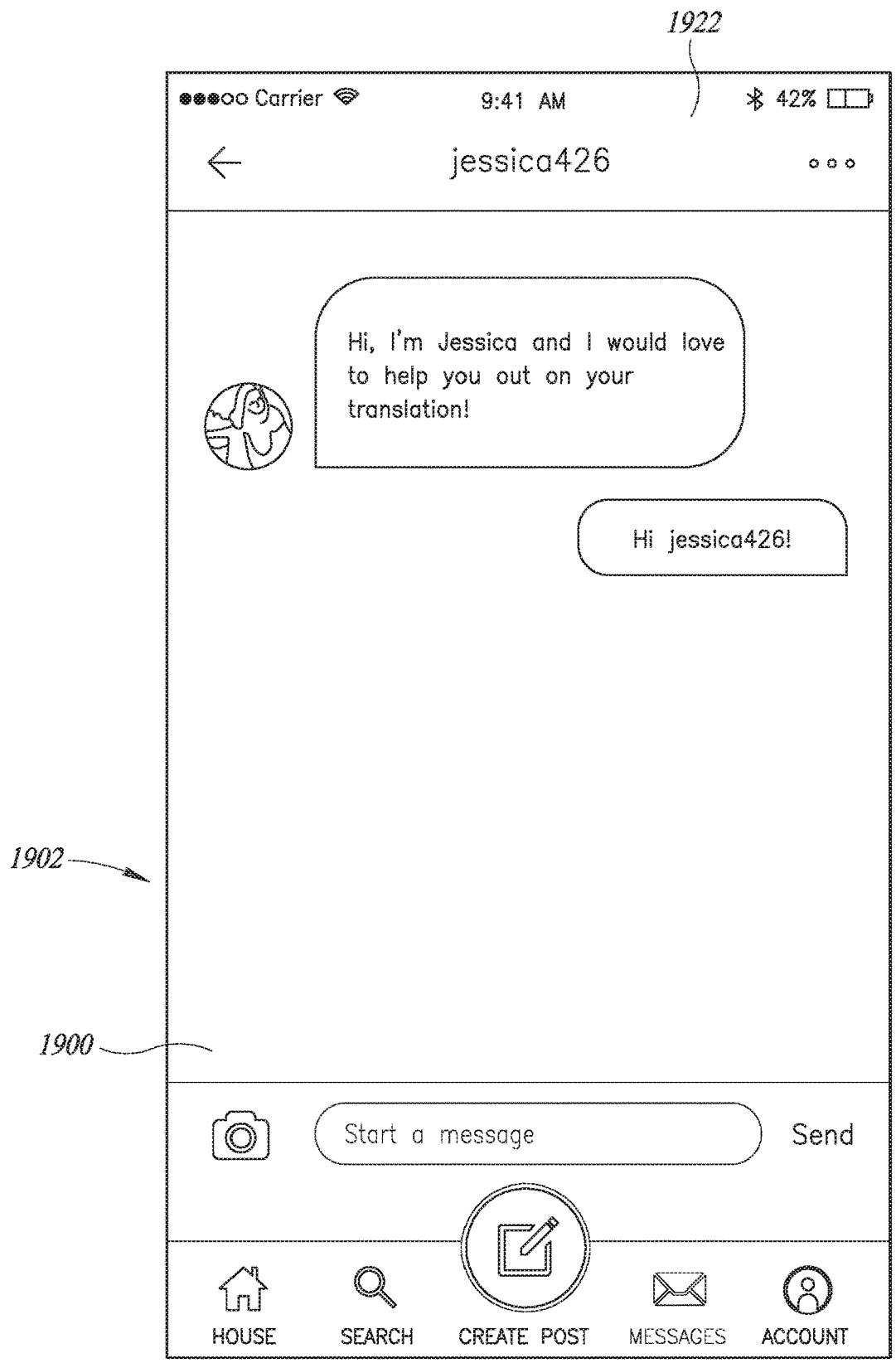
FIG. 19E is a plan view of an electronic device having a display on which a messaging page is rendered for a user, in which the messaging page provides the user with the ability to send and receive in-app messages with one or more service providers, according to at least one illustrated implementation.

FIG. 19E shows a messaging page 1922 in which the user may correspond with the service provider using, for example, instant messaging. The user can use the messaging page 1922 to send messages to other users with a text, and a topic and the message will be sent via in-app messaging to the receiver. In some implementations, the in-app messaging capability may be used to view received messages, to respond to those messages, to accept, and to reject a bid for services. In such implementations, bids for services can only be placed during the auction interval for a post and once a bid is rejected, the service provider may submit another bid as long as the service provider waits a defined period of time (e.g., 60 seconds).

In some implementations, the user can enter in a chat room using as a nickname the user ID of the user and as a password the personal password of the user. In the chat room can send message to all users or send private messages to only one user.

The mobile auction management platform may provide various user experiences and capabilities for business owners, consumers, and service providers.

User Story: Business Owner

A business owner, for example, may be looking to host a launch party for a business concept, and may want the ability to:

- Create a job post listing with the number of people attending this event, the date, the time, the venue, and the type of food/drinks desired;
- Have different service providers provide the desserts and drinks, such that separate job postings for each category for the same event may be created;
- Track the bids all in one place;
- Further communicate about with all service providers in the in-app messaging regarding each bid;
- Accept and/or reject bids; and/or
- Coordinate the arrival times of each service provider via in-app messaging after accepting the bids.

User Story: Coordinating Different Services as a Consumer

A consumer, such as a private individual, may be leaving to pick up a relative from the airport, and may want the ability to:

- Plan, schedule, and coordinate multiple jobs leading up to the day/time that the user is leaving, so that the user can have the house cleaned, lawn mowed and watered, groceries picked up and dropped off, and dog walked to save time;
- Manage at least three services per day so that the user does not have to spread the service across multiple days;
- Track the location of each provider;
- Receive notifications when a provider is on the way;
- Link up to Google Calendar so that all my daily activities are contained in the main calendar of the user to prevent conflicts;
- View in a calendar the jobs have been scheduled for the same day so that the user can stagger them in a way that makes sense for their order (e.g., that is dog walked first, house cleaned, groceries picked up and dropped off, and lawn mowed and watered).
- Have near real-time responsivity in the application, so that the user will not get frustrated and resort to using text message outside of the mobile auction management platform to coordinate with the service provider(s).

User Story: A provider

A provider may want to use the mobile auction management platform to:

- Manage bids in one place so that the provider can manage the income received for a variety of skills offered;
- Manage more than five bids under at least two categories at a time so that the provide may have options on what job are taken;
- Sort highest bid amounts under each category so that the provider is not dependent on one job where the provider may have to compromise on the amount the provider feels is due;
- Link up to Google Calendar so that the provider can have all daily activities in a main calendar;
- View in a calendar the scheduled jobs so that the provider can ensure that the threshold amount will be earned by a certain date to pay bills;

Have near real-time responsivity so that the provider will not get frustrated and resort to using text messages outside of the mobile auction management platform to coordinate; and Use the application on the current mobile phone (e.g., iPhone 7) of the provider so that the provider does not have to use any other device other than the primary one of the provider to schedule and manage requests.

In some implementations, the provider may want to use the mobile auction management platform to:

Bid on multiple jobs and be able to communicate regarding those jobs seamlessly within the in-app messaging;

Track and receive notifications when a bid is accepted by multiple service seekers for a variety of services;

Receive notifications and be able to discuss and communicate about a job on which the provider is bidding, but the provider may want the messaging to be seamless so that the provider can review, discuss, accept, or reject posts within the application.

User Story: As an Underemployed Provider:

In some implementations, an underemployed provider may want to use the mobile auction management platform to:

Plan, schedule, and coordinate multiple bids so that the provider is able to make monthly bill payments;

Manage at least six jobs with start dates in the same week so that the provider can have a steady source of income;

Filter by the highest suggested payment so that the provider can prioritize the highest paying jobs first;

Link up to Google Calendar so that the provider can have all my daily activities in my main calendar;

View in a calendar the jobs the provider has scheduled so that the provider can ensure that the provider I will make the threshold amount by a certain date to pay bills; and Have near real-time responsivity so that the provider will not get frustrated and resort to using another application (e.g., Facebook chat) to coordinate.

While sometimes discussed in terms of records, fields and flags, the various consumer information and, or service provider information, including favorite designation may be stored in any other form of data structure, including for example one or more databases (e.g., relational database), linked lists, trees, and, or graphs, etc.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. Those of skill in the art will recognize that many of the methods or algorithms set out herein may employ additional acts, may omit some acts, and/or may execute acts in a different order than specified.

The various implementations described above can be combined to provide further implementations. In addition, all of the U.S. patents, U.S. patent application publications, U.S. patent applications, foreign patents, foreign patent applications and non-patent publications referred to in this specification and/or listed in the Application Data Sheet, if any, including U.S. patent application Ser. No. 62/471,242, filed Mar. 14, 2017, are incorporated herein by reference, in their entirety. Aspects of the implementations can be modified, if necessary, to employ concepts of the various patents, applications and publications to provide yet further implementations. These and other changes can be made to the implementations in light of the above-detailed description.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of routing providers to destinations, the method comprising:

causing presentation, by a provider mobile electronic device operated by a first provider, of navigation information to an intermediary destination without identification of a final destination, the final destination which is a location at which at least one of services are to be performed or goods are to be delivered, wherein the intermediary destination is a first geofenced area that is larger than and encompasses the final destination and causing presentation of navigation information to an intermediary destination without identification of a final destination includes causing presentation of navigation information toward the first geofenced area without identification of the final destination;

wherein causing presentation, by a provider mobile electronic device operated by a first provider, of navigation information to an intermediary destination without identification of a final destination, includes:

receiving encrypted location information via a first application executing on the provider mobile electronic device at a first time, the encrypted location information specifying both the intermediary destination and the final destination;

at a first time, decrypting the encrypted location information that identifies the intermediary destination; and at a second time, decrypting the encrypted location information that identifies the final destination, the first time occurring before the second time, and the second time occurring at or after the provider reaches the intermediary destination:

in response to a signal indicative of the provider mobile electronic device reaching the first geofenced area, causing presentation, by the provider mobile electronic device, of navigation information to the final destination; and in response to a signal indicative of the provider mobile electronic device reaching the final destination, causing a notification to be provided to at least one electronic device logically associated with an entity that is not the first provider.

2. The method of claim 1 further comprising:

determining the intermediary destination based on the first geofenced area that is larger than and encompasses the final destination.

3. The method of claim 2 wherein determining the intermediary destination based on the first geofenced area includes:

determining the first geofenced area based on a distance form the final destination; and determining a specific location on a boundary of the determined geofenced area that is closest to a starting destination.

4. The method of claim 1, wherein causing presentation, by a provider mobile electronic device operated by a first provider, of navigation information to an intermediary destination without identification of a final destination, further includes:

decrypting the received encrypted location information via the first application executing on the provider mobile electronic device, the decrypted location information only accessible to the provider on reaching the intermediary destination.

5. The method of claim 1 wherein causing presentation, by a provider mobile electronic device operated by a first provider, of navigation information to an intermediary destination without identification of a final destination, further includes:

tracking a current location of the provider mobile electronic device via the first application.

6. The method of claim 5 wherein causing presentation, by a provider mobile electronic device operated by a first provider, of navigation information to an intermediary destination without identification of a final destination, further includes:

determining whether the current location of the provider mobile electronic device has reached the intermediary destination; and in response to determining that the current location of the provider mobile electronic device has reached the intermediary destination, causing decryption of the encrypted location information identifying the final destination by the first application.

7. The method of claim 1 wherein causing presentation, by a provider mobile electronic device operated by a first provider, of navigation information to an intermediary destination without identification of a final destination, further includes:

at the first time, providing the unencrypted location information specifying the intermediary destination by the first application to a second application executing on the provider mobile electronic device, the second application separate and distinct from the first application; and at the second time, providing the unencrypted location information specifying the final destination by the first application to the second application executing on the provider mobile electronic device.

8. The method of claim 7 wherein the second application is a navigation application executable by at least one of a smartphone, tablet computer, or head unit of a vehicle, and the first application makes a series of application programming interface (API) calls to the second application.

9. The method of claim 1 wherein causing presentation of navigation information to an intermediary destination without identification of a final destination includes at least one of causing a visual presentation of a first map with routing information to the intermediary destination without identification of the final destination or causing presentation of tur-by-turn routing information to the intermediary destination without identification of the final destination.

10. The method of claim 1 wherein causing a notification to be provided to at least one electronic device logically associated with an entity that is not the first provider includes causing an electronic notification to be provided to at least one electronic device logically associated with an entity that requested the services or goods.

11. The method of claim 1 wherein causing a notification to be provided to at least one electronic device logically associated with an entity that is not the first provider includes causing an electronic notification to be provided to at least one electronic device logically associated with an entity identified by an entity that requested the services or goods and different from the entity that requested the services or goods.

12. The method of claim 1 further comprising:

in response to a signal indicative of the provider mobile electronic device being within a specified proximity of an electronic device logically associated with an entity that requested the services or goods, causing a notification to be provided to at least one of the provider mobile electronic device and the electronic device logically associated with the entity that requested the services or goods.

13. The method of claim 1, further comprising:

determining an alternate location spaced from the final destination; and calculating a boundary of the first geofenced area based on the alternate location.

14. The method of claim 1, further comprising:

in response to both a receipt of: i) an indication that the requested service has been completed or requested goods delivered and ii) an indication that the provider has traveled a defined amount from the final destination, causing a notification to be provided to at least one electronic device logically associated with an entity that requested the services or goods.

\* \* \* \* \*